US007441858B2

(12) United States Patent
Hoshiyama et al.

(10) Patent No.: US 7,441,858 B2
(45) Date of Patent: Oct. 28, 2008

(54) PRINTING METHOD, PRINTING SYSTEM, AND STORAGE MEDIUM HAVING PROGRAM STORED THEREON

(75) Inventors: Yoshiko Hoshiyama, Nagano-ken (JP); Hirokazu Nunokawa, Nagano-ken (JP); Hitomi Shibata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 476 days.

(21) Appl. No.: 11/340,716

(22) Filed: Jan. 27, 2006

(65) Prior Publication Data

US 2006/0250431 A1 Nov. 9, 2006

(30) Foreign Application Priority Data

Jan. 27, 2005 (JP) ............................. 2005-019970
Feb. 24, 2005 (JP) ............................. 2005-049523

(51) Int. Cl.
*B41J 29/38* (2006.01)
*G06F 15/00* (2006.01)

(52) U.S. Cl. .......................................... 347/16; 358/1.8

(58) Field of Classification Search .................. 347/16; 358/1.8
See application file for complete search history.

(56) References Cited

U.S. PATENT DOCUMENTS 6,226,101 B1 * 5/2001 Sato ........................... 358/1.8
7,367,645 B2 * 5/2008 Nunokawa ................... 347/16

FOREIGN PATENT DOCUMENTS

JP 7-242025 A 9/1995
JP 2002-103584 A 4/2002

* cited by examiner

*Primary Examiner*—K. Feggins
*Assistant Examiner*—Jannelle M Lebron
(74) *Attorney, Agent, or Firm*—Sughrue Mion, PLLC

(57) ABSTRACT

A plurality of ejecting nozzles include nozzles opposed to a convex portion of a support in contact with the medium and a nozzle opposed to a concave portion of the support not in contact with the medium. By controlling carrying amounts in the proper circumstances, a dot line can be formed without the nozzle opposed to a convex portion of a supporting member.

15 Claims, 31 Drawing Sheets

PRINTING METHOD, PRINTING SYSTEM, AND STORAGE MEDIUM HAVING PROGRAM STORED THEREON

CROSS-REFERENCE TO RELATED APPLICATIONS

The present application claims priority on Japanese Patent Application No. 2005-019970 filed on Jan. 27, 2005 and Japanese Patent Application No. 2005-049523 filed on Feb. 24, 2005, which are herein incorporated by reference.

BACKGROUND

1. Field of the Invention

The present invention relates to a printing method, a printing system, and a storage medium storing a program.

2. Related Art

Examples of printing apparatuses such as a printer, a plotter, and a facsimile include an ink-jet type that prints an image on a medium (paper, cloth, OHP transparency film and the like) with an ink ejected from a nozzle. This type of printing apparatus alternately performs an ink ejecting operation for intermittently ejecting an ink while a head is moved and a carrying operation for carrying the medium in a direction crossing a movement direction of the head, thus printing the image on the medium.

In recent years, a printing apparatus that can perform "borderless printing" in which an image is printed on a medium without forming a margin has been increasing. This printing apparatus ejects ink to a wider range than the medium, thus achieving borderless printing. Moreover, in this printing apparatus, a convex portion and a concave portion are provided in a supporting member for supporting the medium in order to prevent ink from landing on the supporting member and making a reverse side of the medium dirty. The ink is ejected from the nozzle in such a manner that the ink that does not land on the medium lands on the concave portion (see Japanese Patent Laid-Open Publication No. 2002-103584, for example).

In borderless printing, ink may fall off the medium when printing is performed at an edge portion of the medium. Thus, during printing at the edge portion of the medium, a nozzle opposed to the concave portion is used so as to make the ink that does not land on the medium land on the concave portion. In the case when printing is performed at the edge portion of the medium in that manner, usable nozzles are limited and a number of usable nozzles are reduced. Therefore, a range in which dots can be formed during a dot forming operation is reduced.

On the other hand, when the range in which dots can be formed at the dot forming operation becomes narrower, it is necessary to reduce a carrying amount during the carrying operation. In other words, in the case where printing is performed at the edge portion of the medium, it is necessary to make the carrying amount in the carrying operation smaller, as compared with the case where printing is performed in a portion at a center of the medium.

However, when the carrying operation by the small carrying amount continues needlessly, printing time becomes longer.

Further, in this type of printing apparatus, some perform printing by varying carrying amounts. For example, a printing apparatus is known which performs printing by setting a carrying amount for a trailing edge portion of the medium to be smaller than that for an intermediate portion in order to enlarge a region in which an image is printed (see JP-A-7-242025, for example). In this printing apparatus, a timing of switching of the carrying amount is determined based on a size of the medium for which printing is to be performed. For example, the carrying amount is switched, on the condition that the number of passes from the start of printing (this number corresponds to the number of movements that a head is moved in a movement direction) reaches a defined number.

In this type of printing apparatus, some include a sensor for detecting a medium provided upstream of a head in a medium carrying direction. In this printing apparatus, when a trailing edge of the medium is detected by the sensor, printing is terminated after printing is performed for a predetermined number of passes, and then the medium is discharged. In this printing apparatus, control for the carrying amount does not work with detection of the trailing edge of a medium. Thus, a trouble may occur in the case where a length of the medium on which the printing is to be performed is different from a length of a medium that is specified for control. For example, when the medium on which printing is to be performed is shorter than the medium specified for control regarding the length in the medium carrying direction, the medium is discharged with unprinted portions that are long in the head movement direction left at several positions. Moreover, during borderless printing, when the medium on which printing is to be performed is longer than the medium specified for control, the number of carrying of the medium by a small carrying amount increases as compared with a normal case, and thus makes the printing time longer.

SUMMARY OF THE INVENTION

In view of the foregoing problems, a first object of the present invention is to carry a medium so as to make a carrying amount as large as possible, thus reducing a time required for printing.

Further, a second object of the present invention is to prevent occurrence of a trouble when a size of a medium specified for control is different from a size of a medium for which printing is to be performed.

A principal aspect of the invention for achieving the first object provides a printing method as follows.

The printing method including:

(A) performing a first printing process for alternately repeating a first carrying operation and a dot forming operation,

- the first carrying operation being an operation for carrying a medium by a first carrying amount in a carrying direction,
- the dot forming operation being an operation for forming a dot line on the medium by ejecting ink from a plurality of nozzles aligned in the carrying direction, a plurality of the nozzles including a nozzle opposed to a convex portion, of a supporting member, that is in contact with the carried medium and a nozzle opposed to a concave portion, of the supporting member, that is not in contact with the medium;

(B) performing a second printing process for alternately repeating a second carrying operation and the dot forming operation at the time of printing an image on an upstream edge portion of the medium in the carrying direction,

- the second carrying operation being an operation for carrying the medium by a second carrying amount that is smaller than the first carrying amount; and (C) performing a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion, the third carrying operation being an operation for carrying the medium by a third carrying amount that is larger than the second carrying amount.

A principal aspect of the invention for achieving the second object provides a printing method set forth below.

The printing method including:

(A) performing printing on the medium by making a medium be carried by a first carrying amount;

(B) determining a timing at which the first carrying amount is switched to a second carrying amount that is smaller than the first carrying amount, based on a detection signal from a sensor for detecting a trailing edge of the medium; and (C) performing printing on the medium by switching from the first carrying amount to the second carrying amount at the determined timing.

The features and objects of the present invention other than the above will become clear by reading the following description taken in conjunction with the accompanying drawings.

DESCRIPTION OF EXEMPLARY EMBODIMENTS

Figure 1:
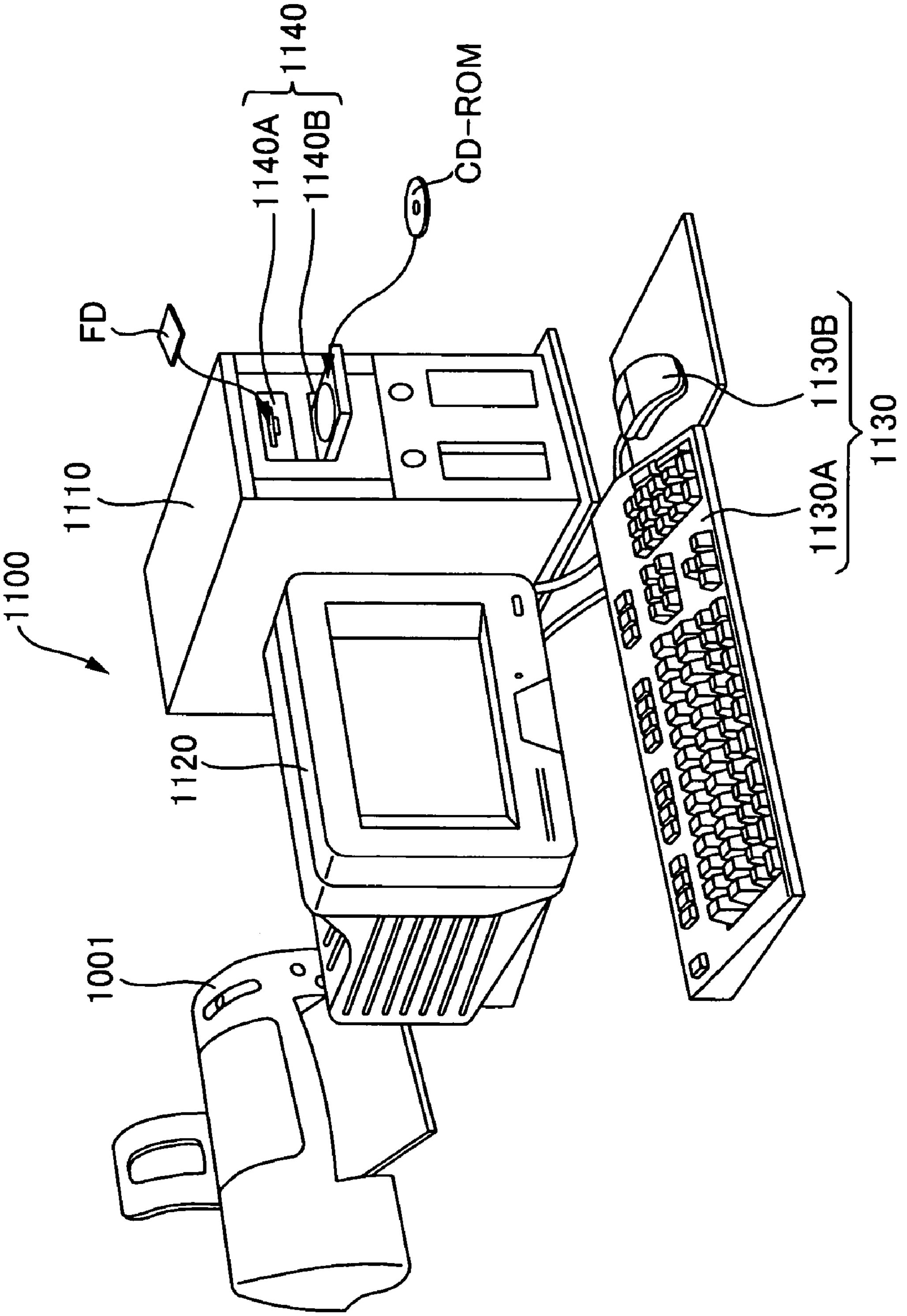
FIG. 1 is a diagram describing an entire structure of a printing system of a first embodiment of the present invention.

The description of the present specification and the accompanying drawings make at least the following apparent.

A printing method including: (A) performing a first printing process for alternately repeating a first carrying operation and a dot forming operation, the first carrying operation being an operation for carrying a medium by a first carrying amount in a carrying direction, the dot forming operation being an operation for forming a dot line on the medium by ejecting ink from a plurality of nozzles aligned in the carrying direction, a plurality of the nozzles including a nozzle opposed to a convex portion, of a supporting member, that is in contact with the carried medium and a nozzle opposed to a concave portion, of the supporting member, that is not in contact with the medium; (B) performing a second printing process for alternately repeating a second carrying operation and the dot forming operation at the time of printing an image on an upstream edge portion of the medium in the carrying direction, the second carrying operation being an operation for carrying the medium by a second carrying amount that is smaller than the first carrying amount; and (C) performing a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion, the third carrying operation being an operation for carrying the medium by a third carrying amount that is larger than the second carrying amount.

According to this printing method, printing can be finished faster.

In the printing method described above, it is desirable that after the edge portion is detected based on a detection result of a sensor for detecting the edge portion, the carrying operation for carrying the medium in the carrying direction and the dot forming operation are repeated a predetermined number of times and a printing process is finished.

Therefore, printing can be finished faster.

In the printing method described above, it is desirable that the third carrying operation is performed after the certain dot forming operation in the case the nozzle opposed to the convex portion after the third carrying operation is positioned away from the lower edge's most-downstream position downstream in the carrying direction by more than a total carrying amount from when the edge portion is detected to when the printing process is finished.

Therefore, printing can be finished faster.

In the printing method described above, it is desirable that the sensor is a sensor for detecting the presence or absence of the medium, and detects that the edge portion is positioned downstream in the carrying direction than the sensor when the sensor is unable to detect the presence of the medium based on the detection result of the sensor in the dot forming operation.

Therefore, it is possible to detect a lower edge of the medium by a simple sensor.

In the printing method described above, it is desirable that a dot line to be formed downstream in the carrying direction than a position of the sensor at the time the sensor detects the edge portion is formed by the predetermined number of times of the dot forming operation.

Therefore, it is possible to print an image without forming a margin at the lower edge.

In the printing method, it is desirable that the sensor is provided at the same position as the most-upstream nozzle with respect to the carrying direction.

Therefore, it is possible to reflect the detection result of the lower edge on the dot forming operation.

In the printing method described above, it is desirable that a dot line to be formed between a lower edge's most-upstream position that is a position of the edge portion when the medium is carried to a most upstream side in the carrying direction, and the lower edge's most-downstream position is formed without using the nozzle opposed to the convex portion.

Therefore, printing can be performed without ink landing on the convex portion.

In such printing method, it is desirable that the third carrying amount is equal to the first carrying amount.

Therefore, an image quality of a print image is made entirely uniform.

In such printing method, it is desirable that a fourth carrying operation for carrying the medium by a fourth carrying amount that is larger than the second carrying amount is performed after the third carrying operation and before the second carrying operation.

Therefore, printing can be finished faster.

In such printing method, it is desirable that the third carrying amount is equal to the fourth carrying amount.

Therefore, the image quality of the print image is made entirely uniform.

In such printing method, it is desirable that the third carrying amount is larger than the fourth carrying amount.

Therefore, a difference of image quality between a printed image printed by the first printing process and a printed image printed by the second printing process becomes unnoticeable.

In such printing method, it is desirable that when it is assumed that an interval of the dot lines formed on the medium is D, a nozzle interval is $k \times D$, the first carrying amount is $n1 \times D$, and the second carrying amount is $n2 \times D$, a remainder obtained by dividing n1 by k is equal to a remainder obtained by dividing n2 by k.

Therefore, the image quality of the print image can be improved.

In such printing method, it is desirable that when it is assumed that the third carrying amount is n3×D, a remainder obtained by dividing n3 by k is equal to the remainder obtained by dividing n1 by k.

Therefore, the image quality of the printing image can be improved.

A printing method includes: (A) performing printing on the medium by making a medium be carried by a first carrying amount; (B) determining a timing at which the first carrying amount is switched to a second carrying amount that is smaller than the first carrying amount, based on a detection signal from a sensor for detecting a trailing edge of the medium; and (C) performing printing on the medium by switching from the first carrying amount to the second carrying amount at the determined timing.

According to this printing method, the timing at which the first carrying amount is switched to the second carrying amount is determined in accordance with the detection result of the trailing edge of the medium by the sensor, and switching of the first carrying amount to the second carrying amount is performed at this determined timing. Thus, even if a size of the medium of which printing is to be performed is different from a size of a medium that is specified for control, printing can be performed appropriately.

It is desirable that the printing method further includes: obtaining a position of the trailing edge of the medium based on a detection result of the trailing edge of the medium by the sensor; and causing the printing on the medium to stop in the case where the obtained position of the trailing edge of the medium goes over a position to be printed by a part of nozzles positioned upstream in the carrying direction of a plurality of the nozzles arranged in a carrying direction of the medium, the part of the nozzles being provided at positions facing an ink receiving section for receiving ink that does not land on the medium.

Therefore, printing time can be shortened.

It is desirable that the printing method further includes:

obtaining the position of the trailing edge of the medium based on the detection result of the trailing edge of the medium by the sensor; and switching the first carrying amount to the second carrying amount at a timing that the obtained position of the trailing edge of the medium reaches a carrying amount switching position determined in advance.

Therefore, the timing at which the first carrying amount is switched to the second carrying amount can be optimized.

In such printing method, it is desirable that the carrying amount switching position is determined based on a carrying amount required for printing by the second carrying amount a portion left unprinted by printing by the first carrying amount.

Therefore, a printing range by the second carrying amount can be optimized, and therefore printing time can be reduced.

In such printing method, it is desirable that the carrying amount switching position is determined to be in a range from a most-downstream switching position to a most-upstream switching position, the most-downstream switching position being a position positioned upstream in the carrying direction of a base point by a carrying amount required for printing in printing by the second carrying amount, the base point being a most-downstream nozzle in the carrying direction of a part of nozzles positioned upstream in the carrying direction of a plurality of the nozzles arranged in the carrying direction of the medium, the part of the nozzles being provided at positions facing an ink receiving section for receiving ink that does not land on the medium, the most-upstream switching position being a position upstream in the carrying direction than the most-downstream switching position by the first carrying amount.

Therefore, a trouble of an unprinted position being left at the trailing edge portion of the medium can be surely prevented.

In such printing method, it is desirable that the position of the trailing edge of the medium is obtained based on a control signal to a carrying motor serving as a driving source when carrying the medium and the detection result of the trailing edge of the medium by the sensor.

Therefore, the position of the trailing edge of the medium can be obtained with high precision without adding any special structure.

In such printing method, it is desirable that the second carrying amount is determined based on a number of a part of nozzles positioned upstream in the carrying direction of a plurality of nozzles arranged in a carrying direction of the medium, the part of the nozzles being provided at positions facing an ink receiving section for receiving ink that does not land on the medium.

Therefore, the second carrying amount can be optimized, thus reducing the printing time.

In such printing method, it is desirable that the sensor includes a light-emitting element and a light-receiving element and is configured to vary an amount of light received by the light-receiving element based on the present or absent of the medium.

Therefore, the trailing edge of the medium can be detected with high precision.

A printing system includes: (A) a supporting member having a convex portion that contacts a medium to be carried in a carrying direction and a concave portion that does not contact the medium; (B) a plurality of nozzles aligned in the carrying direction, and including a nozzle opposed to the convex portion and a nozzle opposed to the concave portion; and (C) a controller for performing a first printing process for alternately repeating a first carrying operation for carrying the medium by a first carrying amount and a dot forming operation for forming a dot line on the medium by ejecting ink from the nozzles, and for performing a second printing process for alternately repeating a second carrying operation for carrying the medium by a second carrying amount smaller than the first carrying amount and the dot forming operation at the time of printing an image on an upstream edge portion of the medium in the carrying direction, wherein the controller performs a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation for carrying the medium by a third carrying amount larger than the second carrying amount and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion.

According to this printing system, printing can be finished earlier.

A printing system includes: (A) a carrying mechanism for carrying a medium; (B) a nozzle row including a plurality of nozzles arranged in a carrying direction of the medium; (C) a sensor for detecting a trailing edge of the medium that is arranged upstream than the nozzle row in the carrying direction; and (D) a controller for controlling carrying of the medium by the carrying mechanism and ejection of an ink from the nozzle row, wherein the controller makes printing on the medium be performed by making the medium be carried by a first carrying amount, and then makes printing on the medium be performed by making the medium be carried by a second carrying amount that is smaller than the first carrying amount, and determines a timing at which the first carrying amount is switched to the second carrying amount in accordance with a detection result of the trailing edge of the medium by the sensor.

According to this printing system, printing can be performed appropriately even if a size of the medium for which printing is to be performed differs from a size of a medium that is specified for control.

As a storage medium storing a program, the program includes the following codes: (A) a code for making a printer perform a first printing process for alternately repeating a first carrying operation and a dot forming operation, the first carrying operation being an operation for carrying a medium by a first carrying amount in a carrying direction, the dot forming operation being an operation for forming a dot line on the medium by ejecting ink from a plurality of nozzles aligned in the carrying direction, a plurality of the nozzles including a nozzle opposed to a convex portion, of a supporting member, that is in contact with the carried medium and a nozzle opposed to a concave portion, of the supporting member, that is not in contact with the medium; (B) a code for making the printer perform a second printing process for alternately repeating a second carrying operation and the dot forming operation at the time of printing an image on an upstream edge portion of the medium in the carrying direction, the second carrying operation being an operation for carrying the medium by a second carrying amount smaller than the first carrying amount; and (C) a code for making the printer perform a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion, the third carrying operation being an operation for carrying the medium by a third carrying amount that is larger than the second carrying amount.

According to the storage medium storing such program, printing by a printer can be finished earlier.

A storage medium stores a program, the program including the following codes: (A) a code for making a printer perform printing on the medium by making a medium be carried by a first carrying amount; (B) a code for making the printer determine a timing at which the first carrying amount is switched to a second carrying amount that is smaller than the first carrying amount, based on a detection signal from a sensor for detecting a trailing edge of the medium; and (C) a code for making the printer perform printing on the medium by switching the first carrying amount to the second carrying amount at the determined timing.

According to the storage medium storing that program, even if a size of the medium for which printing is performed is different from a size of a medium that is specified for control, it is possible to make the printer perform printing appropriately.

First Embodiment

<Configuration of Printing System>

Next, an embodiment of a printing system (a computer system) is described with reference to the drawings. However, the description of the embodiment set forth below contains an embodiment related to a printing apparatus, a printing method, a computer program, and a storage medium storing the computer program.

FIG. 1 is an explanatory diagram showing an external configuration of a printing system 1100. The printing system 1100 is provided with an ink-jet printer 1001 (hereinafter, simply referred to as a printer 1001), a computer 1110, a display device 1120, an input device 1130, and a recording and reproducing unit 1140. The printer 1001 is a printing apparatus that prints an image on a medium such as a paper (a sheet of paper), cloth, and a film. The computer 1110 is communicably connected to the printer 1001, and outputs print data in accordance with an image to be printed to the printer 1001 in order to make the printer 1001 print the image. The display device 1120 has a display, and displays an user interface of an application program, a printer driver or the like. The input device 1130 is a keyboard 1130A or a mouse 1130B, for example, and is used for operating the application program, setting the printer driver or the like, in accordance with the user interface displayed on the display device 1120. A flexible disk drive unit 1140A or a CD-ROM drive unit 1140B is used as the recording and reproducing unit 1140, for example.

The printer driver is installed in the computer 1110. The printer driver is a program not only for realizing a function of displaying the user interface on the display device 1120, but also for realizing a function of converting image data output from the application program into print data. The printer driver is stored in a storage medium (computer-readable storage medium) such as a flexible disk FD or CD-ROM. Alternatively, the printer driver can be downloaded into the computer 1110 via the Internet. Further, this program is formed by codes for realizing various functions.

Printer Driver

<Regarding Printer Driver>

Figure 2:
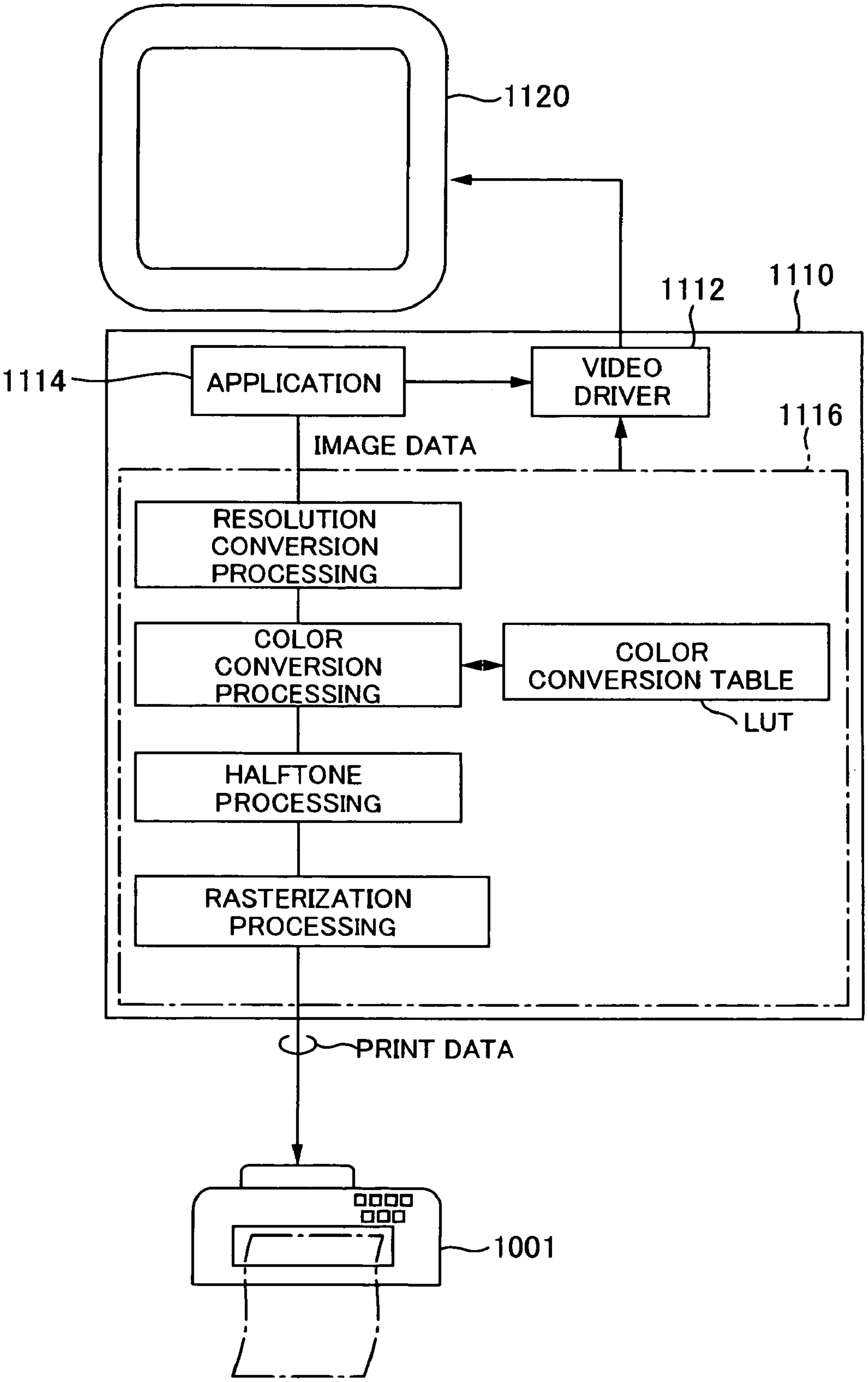
FIG. 2 is an explanatory diagram of processes performed by a printer driver.

FIG. 2 is a schematic explanatory diagram of basic processes performed by the printer driver. The components already described are labeled with the same reference numerals and therefore the description is omitted.

On the computer 1110, computer programs such as a video driver 1112, an application program 1114, and a printer driver 1116 run under an operating system installed in the computer. The video driver 1112 has, for example, a function of displaying a user interface or the like on the display device 1120 in accordance with a display command from the application program 1114 or the printer driver 1116. The application program 1114 has a function of, for example, editing an image, and creates data related to an image (image data). A user can give an instruction to print the image edited by the application program 1114 via the user interface of the application program 1114. Upon receiving the printing instruction, the application program 1114 outputs the image data to the printer driver 1116.

The printer driver 1116 receives the image data from the application program 1114, converts the image data into print data, and outputs the print data to the printer 1001. Here, the print data is a data in a format that can be interpreted by the printer 1001 and contains various types of command data and pixel data. Here, the command data is data for instructing the printer 1001 to perform a specific operation. Further, the pixel data is data related to a pixel configuring an image to be printed (a printing image), and is, for example, data related to a dot formed at a position on paper that corresponds to a certain pixel (data of a color, a size, or the like of the dot).

The printer driver 1116 performs a resolution conversion processing, a color conversion processing, a halftone processing, a rasterization processing and the like in order to convert the image data output from the application program 1114 into the print data. Various processes performed by the printer driver 1116 are described below.

The resolution conversion processing is a process for converting image data (text data, image data or the like) output from the application program 1114 into resolution when printing on a paper. When the resolution at printing an image on paper is specified as 720×720 dpi, for example, the image data received from the application program 1114 is converted into image data with resolution of 720×720 dpi. Further, the image data after resolution conversion processing is RGB data having a multilevel (for example, 256-level) gradation value represented in the RGB color space. Hereinafter, the RGB data obtained by performing the resolution conversion processing on the image data is referred to as RGB image data.

The color conversion processing is a process of converting RGB data into CMYK data represented in the CMYK color space. Further, the CMYK data is data corresponding to colors of ink included in the printer 1001. The color conversion processing is performed by the printer driver 1116 referring to a table (color conversion look-up table LUT) in which a gradation value of RGB image data corresponds to a gradation value of CMYK image data. By this color conversion processing, the RGB data for each pixel is converted into the CMYK data corresponding to colors of ink. Further, data obtained by the color conversion processing is 256-gradation CMYK data represented in the CMYK color space. Hereinafter, the CMYK data obtained by the color conversion processing of the RGB image data is referred to as CMYK image data.

The halftone processing is a process of converting data having a large number of gradations into data having a number of gradations that can be formed by the printer 1001. For example, the halftone processing converts data representing 256 gradations into 1-bit data representing 2 gradations or 2-bit data representing 4 gradations. In the halftone processing, pixel data is created by using a dither method, γ correction, an error diffusion method or the like, so that the printer 1001 can form dots in a dispersed manner. In the halftone processing, the printer driver 1116 refers to a dither table in case of performing the dither method, refers to a gamma table in case of performing γ correction, and refers to an error memory for storing a diffused error in case of performing the error diffusion method. Data obtained by the halftone processing has resolution that is comparable to that of the aforementioned RGB data (720×720 dpi, for example). The data obtained by the halftone processing is formed by 1-bit or 2-bit data for each pixel, for example. Hereinafter, the 1-bit data in the data obtained by the halftone processing is called binary data and the 2-bit data is called multilevel data.

The rasterization processing is a process for changing a data order of image data arranged in a matrix into an order of transfer to the printer 1001. Data obtained by the rasterization processing is output to the printer 1001 as pixel data included in the print data. Note that, as described later, it is determined in advance when and to which pixel each nozzle is to eject ink. The rasterization processing changes the order of the image data arranged in a matrix into such an order that each nozzle can eject ink to a pixel that is determined.

Configuration of Printer

<Regarding Configuration of Printer>

Figure 3:
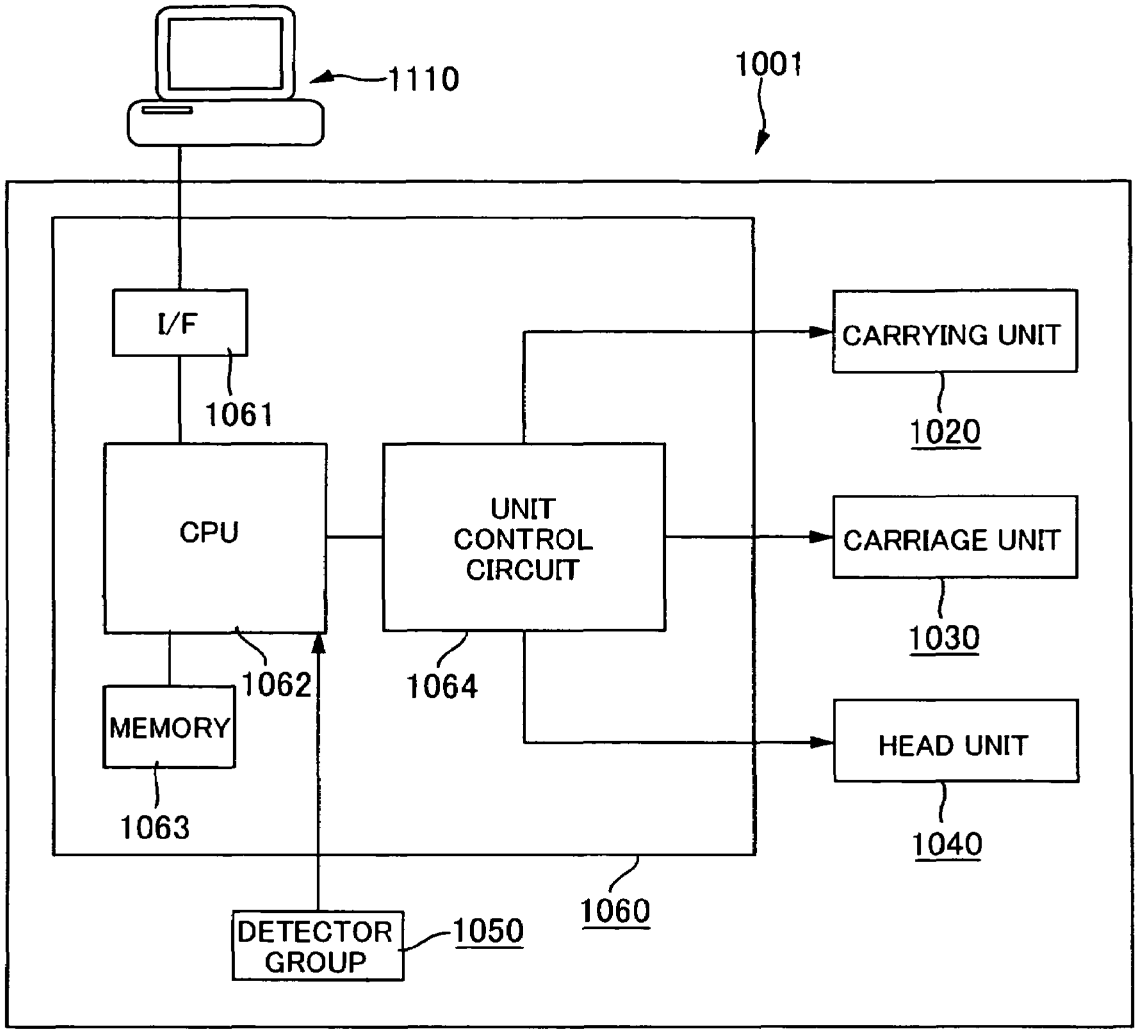
FIG. 3 is a block diagram showing an entire structure of the printer.
Figure 4:
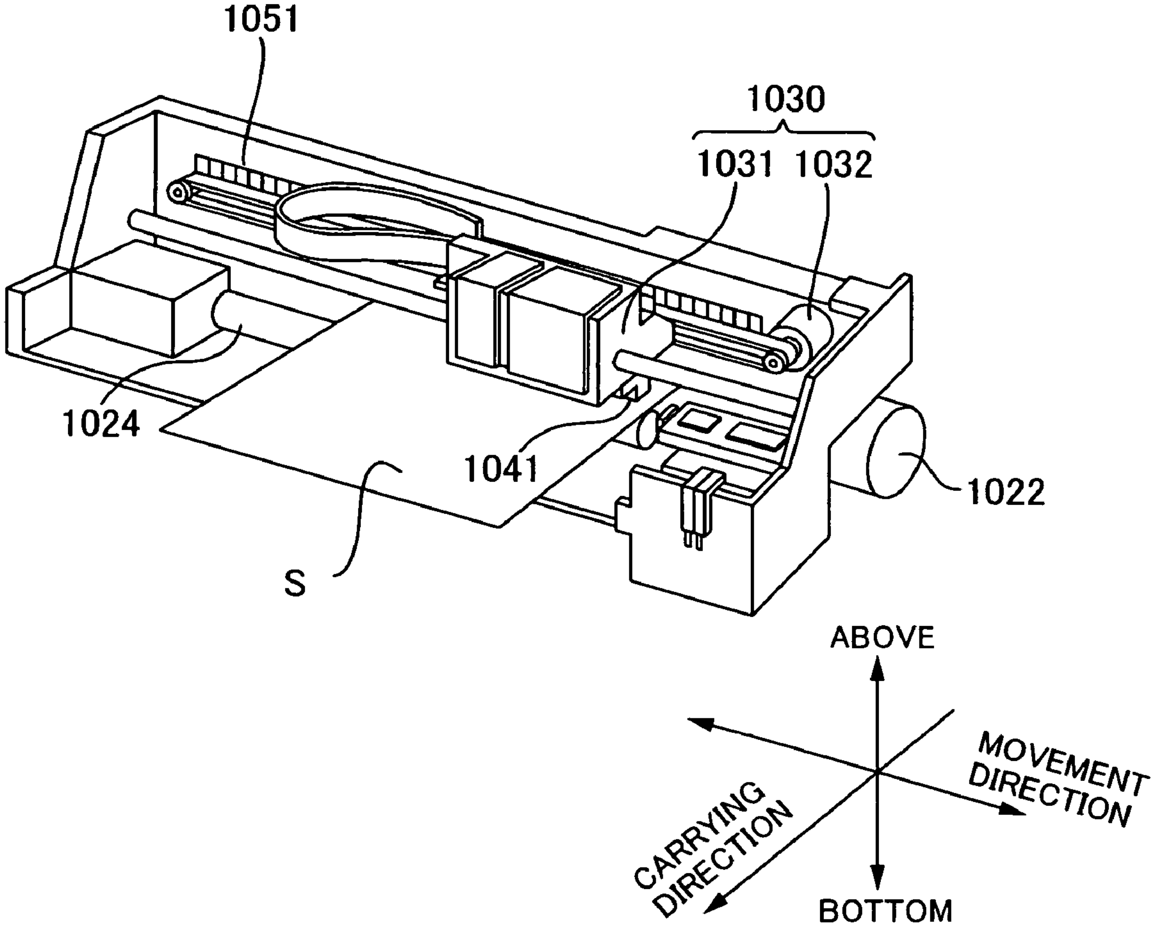
FIG. 4 is a schematic diagram of the entire structure of the printer.
Figure 5:
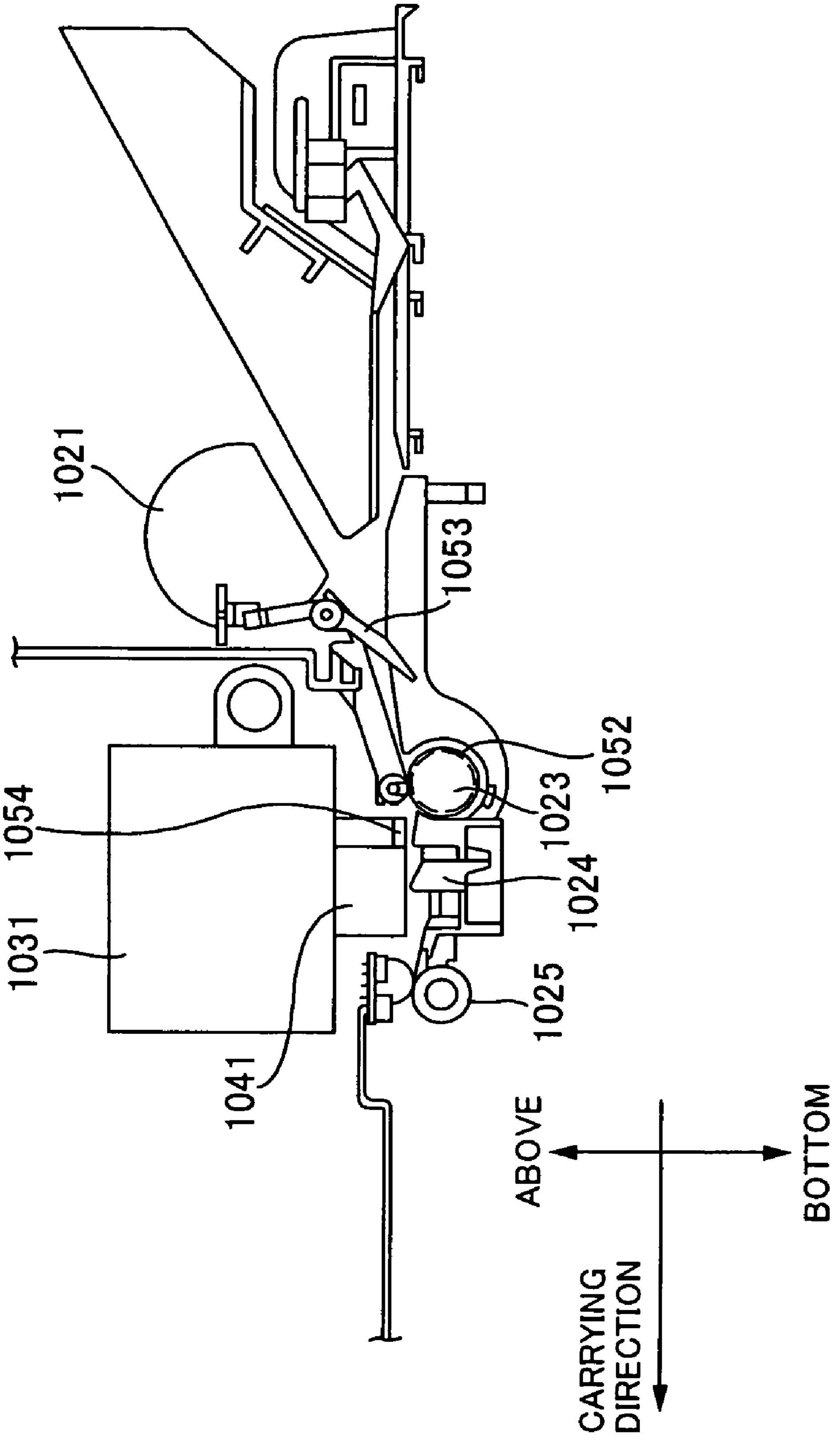
FIG. 5 is a side view of the entire structure of the printer.

FIG. 3 is a block diagram of an entire configuration of the printer 1001 of this embodiment. Further, FIG. 4 is a schematic diagram of the entire configuration of the printer 1001 of this embodiment. Further, FIG. 5 is a side view of the entire configuration of the printer 1001 of this embodiment. A basic configuration of the printer 1001 of this embodiment is described below.

The printer 1001 of this embodiment includes a carry unit 1020, a carriage unit 1030, a head unit 1040, a detector group 1050, and a controller 1060. When receiving print data from the computer 1110 serving as an external device, the printer 1001 controls each of the units (the carry unit 1020, the carriage unit 1030, and the head unit 1040) by the controller 1060. The controller 1060 controls each of the units based on the print data received from the computer 1110 so as to print an image on paper S. The detector group 1050 monitors a status inside the printer 1001 and the detector group 1050 outputs a detection result to the controller 1060. The controller 1060 controls each of the units based on the detection result output from the detector group 1050.

The carry unit 1020 is for sending a medium (for example, paper S) to a printable position and carrying a paper S by a predetermined carrying amount in a predetermined direction (hereinafter, referred to as a carrying direction) during printing. That is, the carry unit 1020 serves as a carrying mechanism (carrying section) for carrying the paper S. The carry unit 1020 includes a paper supplying roller 1021, a carry motor 1022 (Also called as a PF motor), a carry roller 1023, a platen 1024, and a paper-discharge roller 1025. However, the carry unit 1020 does not always have to include all of these components in order to function as the carrying mechanism. The paper supplying roller 1021 is a roller for supplying paper S inserted into a paper insert opening into the printer. The carry motor 1022 is a motor for carrying paper S in the carrying direction and is configured by a DC motor, for example. The carry roller 1023 is a roller for carrying paper S supplied by the paper supplying roller 1021 up to a printable region and is driven by the carry motor 1022. The platen 1024 supports the paper S during printing. The paper-discharge roller 1025 is a roller that discharges the paper S to the outside of the printer 1001 and is provided downstream of the printable region in the carrying direction. The paper-discharge roller 1025 rotates in synchronization with the carry roller 1023.

The carriage unit 1030 is for moving (hereinafter, Also referred to as "scanning") a carriage 1031 in a predetermined direction (hereinafter, referred to as a movement direction). The carriage unit 1030 includes a carriage 1031 and a carriage motor (Also called as a CR motor) 1032. The carriage 1031 can move back and forth in the movement direction (thus, a head 1041 moves along the movement direction.). Further, the carriage 1031 holds an ink cartridge that contains ink so as to be attachable and detachable. The carriage motor 1032 is a motor for making the carriage 1031 move in the movement direction and is configured by a DC motor, for example.

The head unit 1040 is for ejecting ink to paper S. The head unit 1040 includes the head 1041. The head 1041 includes a plurality of nozzles and intermittently ejects ink from each nozzle. The head 1041 is provided in the carriage 1031. Therefore, when the carriage 1031 moves in the movement direction, the head 1041 Also moves in the movement direction. The head 1041 intermittently ejects the ink while moving in the movement direction, thus forming a dot line (a row of dots, a raster line) along the movement direction on the paper S.

The detector group 1050 includes a linear encoder 1051, a rotary encoder 1052, a paper detection sensor 1053, and an optical sensor 1054 and so forth. The linear encoder 1051 is for detecting a position of the carriage 1031 in the movement direction. The rotary encoder 1052 is for detecting an amount of rotation of the carry roller 1023. The paper detection sensor 1053 is for detecting a position of a leading edge of paper S which is to be printed. This paper detection sensor 1053 is provided at a position where the paper detection sensor 1053 can detect the position of the leading edge of the paper S while a paper S is being supplied by the paper supplying roller 1021 to the carry roller 1023. The optical sensor 1054 is attached to the carriage 1031. The optical sensor 1054 detects the presence or absence of paper S by a light-receiving portion detecting reflected light of light emitted toward the paper S from a light-emitting portion. A method for detecting an edge portion of the paper S by the optical sensor 1054 is described later.

The controller 1060 is a control unit (control section) for controlling the printer 1001. The controller 1060 includes an interface section 1061, a CPU 1062, a memory 1063, and a unit control circuit 1064. The interface section 1061 is for transmitting and receiving data between the printer 1001 and the computer 1110 as an external device. The CPU 1062 is an arithmetic processing unit for controlling the entire printer. The memory 1063 is for securing an area storing a program for the CPU 1062, a work area, and the like, and includes storing means such as RAM or EEPROM. The CPU 1062 controls each of the units via the unit control circuit 1064 in accordance with the program stored in the memory 1063.

The controller 1060 controls the carry unit 1020, the carriage unit 1030, and the like in accordance with command data included in the print data. Further, the controller 1060 controls the head unit 1040 in accordance with pixel data included in the print data, thus making each nozzle eject the ink in accordance with the pixel data.

<Regarding the Nozzle>

Figure 6:
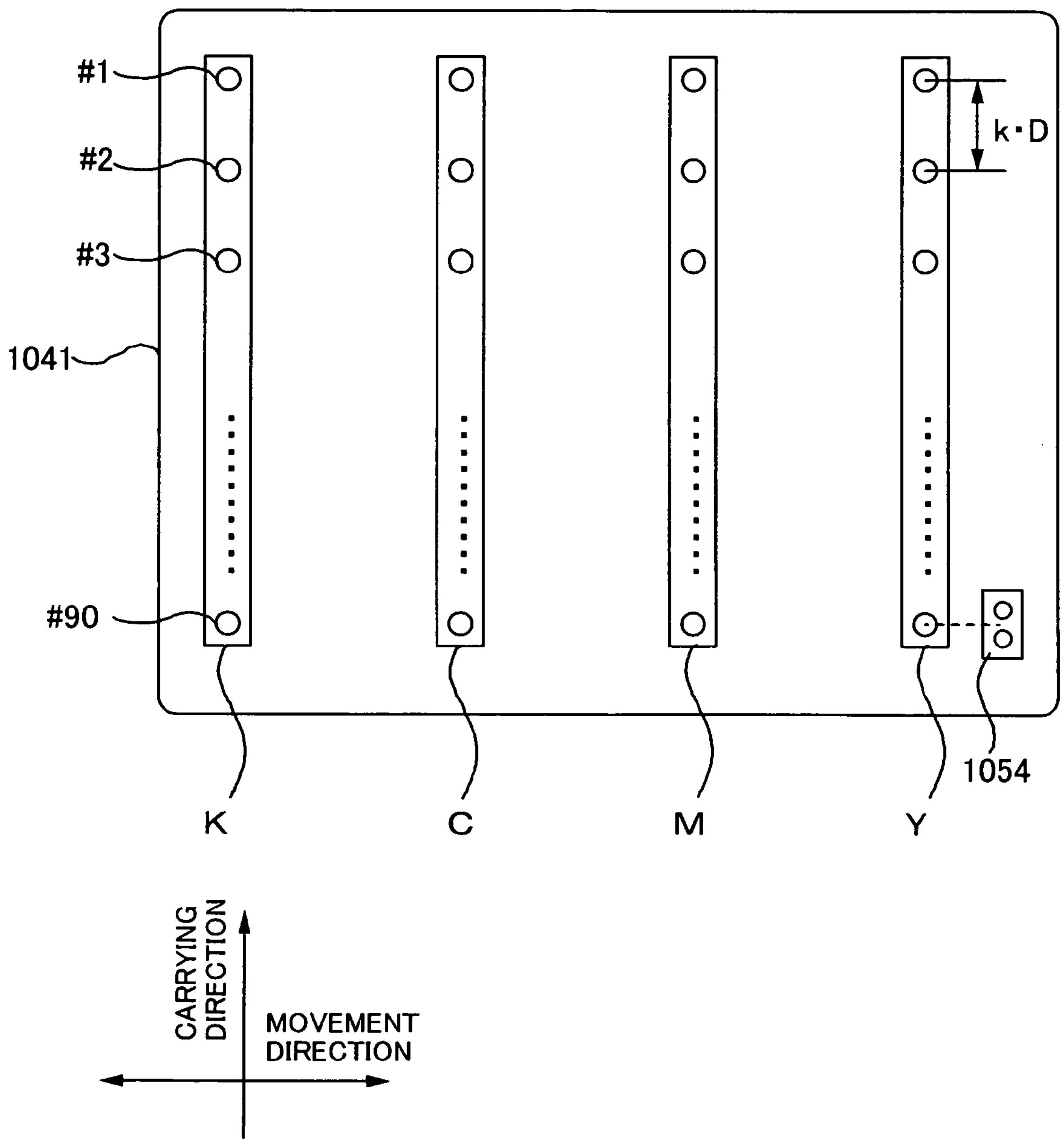
FIG. 6 is an explanatory diagram of arrangement of nozzles.

FIG. 6 is an explanatory diagram showing an arrangement of nozzles on a lower surface of the head 1041. A black ink nozzle group K, a cyan ink nozzle group C, a magenta ink nozzle group M, and a yellow ink nozzle group Y are formed on the lower surface of the head 1041. Each nozzle group includes a plurality of (90 in this embodiment) nozzles for ejecting a corresponding color of ink. Each nozzle includes an ink chamber (a pressure chamber, not shown) and a piezo element. When the piezo element is driven, the ink chamber contracts and expands, and an ink droplet is ejected from the nozzle.

A plurality of nozzles in each nozzle group are aligned at a regular interval (nozzle pitch: $k \cdot D$) in the carrying direction, where D is a dot pitch (that is, an interval between dots formed on paper S) in the carrying direction and k is an integer of 1 or more. For example, in the case where the nozzle pitch is 180 dpi ($1/180$ inches) and the dot pitch in the carrying direction is 720 dpi ($1/720$ inches), k=4.

Nozzles in each nozzle group are numbered in such a manner that the number becomes smaller the more downstream the nozzles are positioned (#1 to #90). That is, nozzle #1 is positioned downstream of nozzle #90 in the carrying direction. Note that, the optical sensor 1054 described above is positioned at approximately the same position as nozzle #90 that is positioned most upstream in regards to the position in the paper carrying direction.

<Regarding Optical Sensor 1054>

Figure 7A:
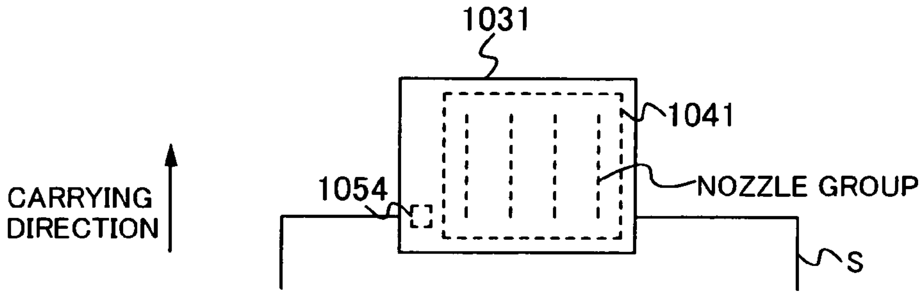
FIG. 7A is an explanatory diagram of detection of an upper edge of a paper by an optical sensor.
Figure 7B:
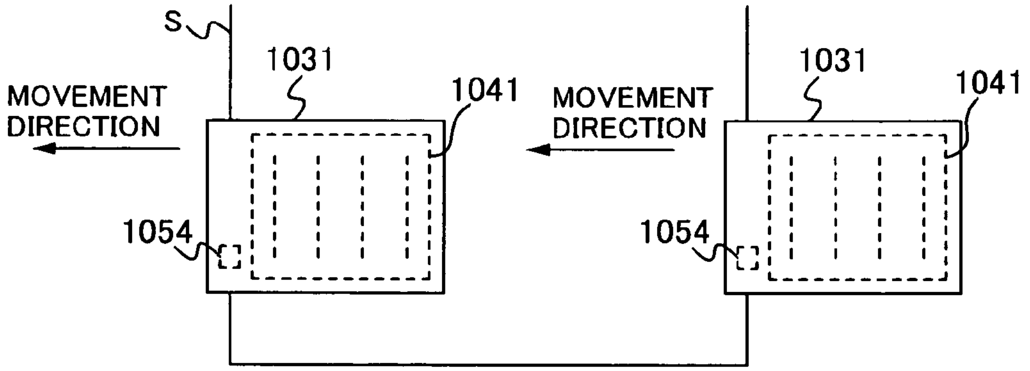
FIG. 7B is an explanatory diagram of detection of a side edge of the paper by the optical sensor.
Figure 7C:
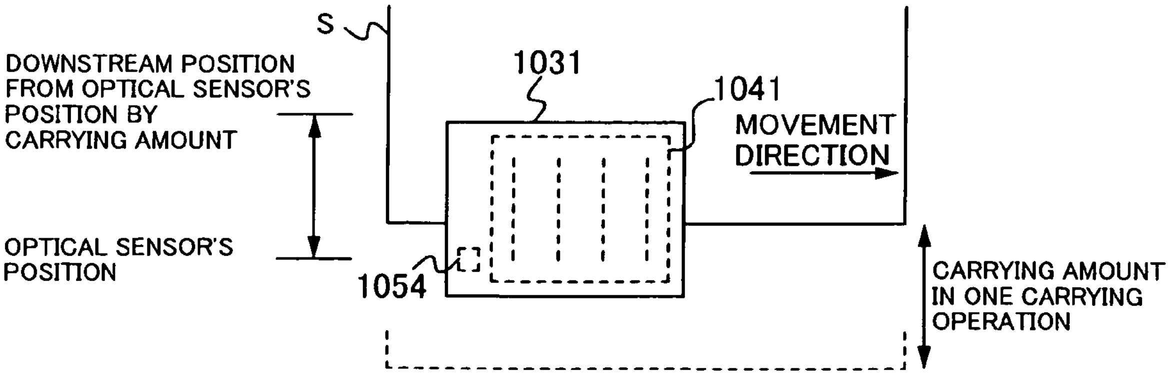
FIG. 7C is an explanatory diagram of detection of a lower edge of the paper by the optical sensor.

FIGS. 7A to 7C are explanatory diagrams of detection of edge portions of paper S by the optical sensor 1054. The figures are views when seen from above. Positions of the head 1041 and the optical sensor 1054 provided on the lower surface of the carriage 1031 are shown by the dotted lines in the figures.

FIG. 7A is an explanatory diagram showing detection of an upper edge of paper S by the optical sensor 1054. Before the paper S is supplied, the controller 1060 moves the carriage 1031 to a position shown in FIG. 7A with respect to the paper S. After moving the carriage 1031, the controller 1060 carries the paper S in the carrying direction. While carrying the paper S in the carrying direction, the controller 1060 detects the presence or absence of the paper S by the optical sensor 1054. When a detection result of the optical sensor 1054 changes from a "no-paper" state to a "paper-present" state, the controller 1060 detects that the upper edge of the paper S is positioned at the position of the optical sensor 1054 (the position of the most-upstream nozzle (nozzle #90) in the carrying direction in this embodiment).

FIG. 7B is an explanatory diagram showing detection of side edges of paper S by the optical sensor 1054. Before an ink is ejected from the nozzles, the carriage 1031 is positioned at a position that is not opposed to the paper S (the right side in FIG. 7B in this explanatory diagram). The controller 1060 moves the carriage 1031 toward the paper S, and causes ejection of ink from the nozzles to form dots on the paper S when the head 1041 is opposed to the paper S. While moving the carriage 1031 in the movement direction, the controller 1060 detects the presence or absence of the paper S by the optical sensor 1054. When the detection result of the optical sensor 1054 changes from the "no-paper" state to the "paper-present" state, the controller 1060 detects that the side edge of the paper S (the right edge of the paper S in FIG. 7B) is positioned at the position of the optical sensor 1054. Further, when the detection result of the optical sensor 1054 changes from the "paper-present" state to "no-paper" state, the controller 1060 detects that the side edge of the paper S (the left edge of the paper S in FIG. 7B) is positioned at the position of the optical sensor 1054.

FIG. 7C is an explanatory diagram showing detection of a lower edge of paper S by the optical sensor 1054. The printer 1001 alternately repeats a carrying operation for carrying the paper S in the carrying direction and a dot forming operation for ejecting ink from the moving nozzles, when printing on the paper S. At the time of the dot forming operation, the side edge of the paper S is detected, as shown in FIG. 7B. However, in the case where the lower edge of the paper S is positioned downstream of the optical sensor 1054 in the carrying direction, as shown in FIG. 7C, as a result of the carrying operation after the dot forming operation, the side edge of the paper S cannot be detected when performing the dot forming operation. As described above, in the case where the side edge of the paper S can be detected in the previous dot forming operation but cannot be detected in the next dot forming operation, the controller 1060 detects that the lower edge of the paper S is positioned between the position of the optical sensor 1054 and a position that is positioned downstream of the optical sensor 1054 by the carrying amount. Thus, precision of the detection of the position of the lower edge of the paper S varies in accordance with the carrying amount.

Basic Printing Operation

<Interlace Printing>

Figure 8A:
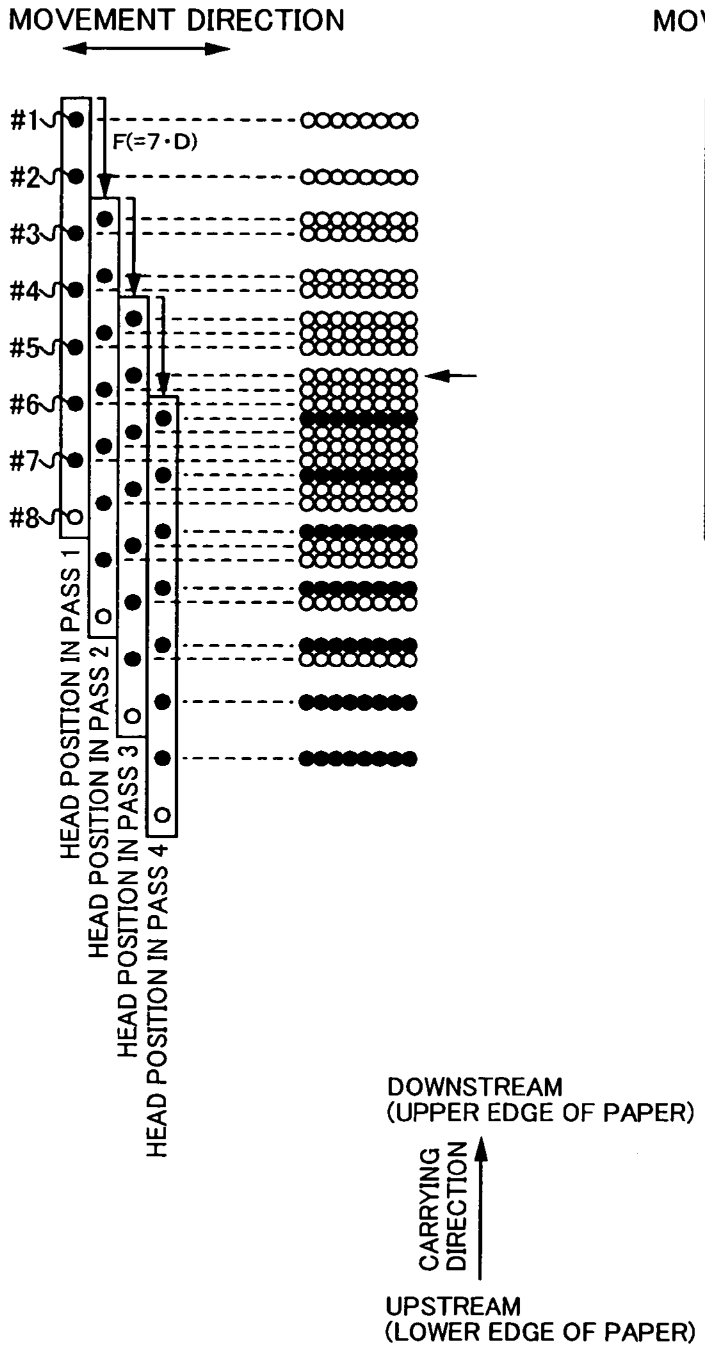
FIG. 8A is an explanatory diagram of interlace printing and is a diagram showing the position of a head (or a nozzle group) and the manner of dot formation in pass 1 to pass 4.
Figure 8B:
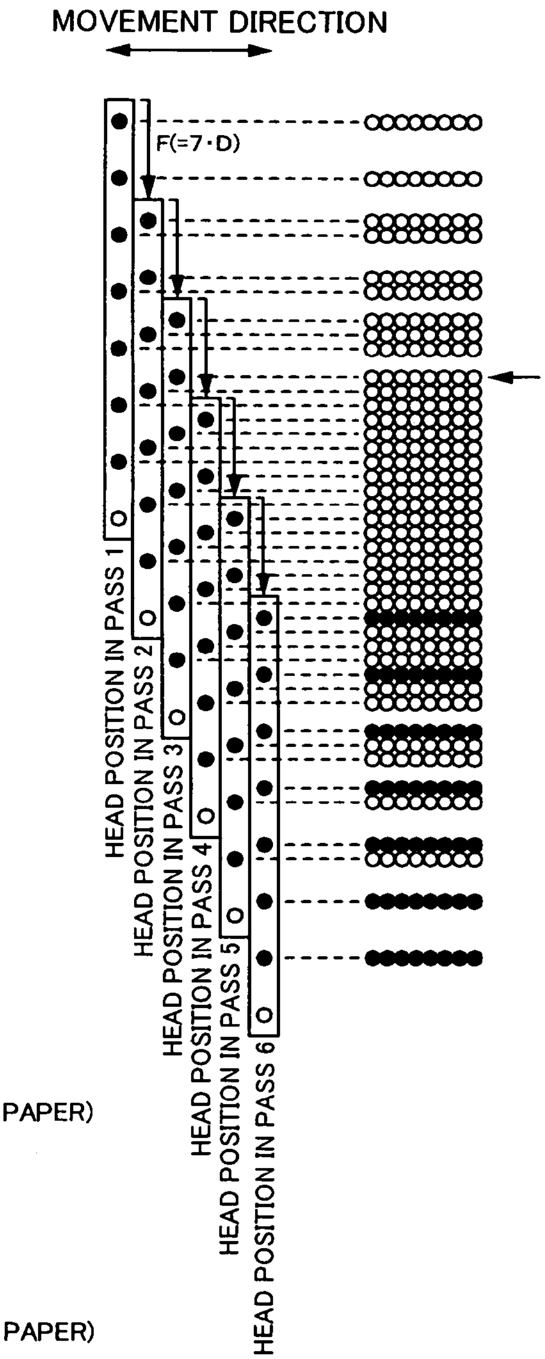
FIG. 8B is an explanatory diagram of interlace printing and is a diagram showing the position of the head (or the nozzle group) and the manner of dot formation in pass 1 to pass 6.

FIGS. 8A and 8B are explanatory diagrams of interlace printing. FIG. 8A shows the position of the head 1041 (or nozzle group) and dot formation in pass 1 to pass 4, and FIG. 8B shows the position of the head 1041 and the manner of dot formation in pass 1 to pass 6.

For the sake of convenience in explanation, only one nozzle group of a plurality of nozzle groups is shown, and the number of nozzles in the nozzle group is reduced (eight nozzles in this example). Nozzles shown with black circles in FIGS. 8A and 8B are nozzles that can eject an ink. On the other hand, the nozzles shown with empty circles are nozzles that cannot eject ink. Further, for the sake of convenience in explanation, although the head 1041 (or nozzle group) is shown as if it moves with respect to the paper S, the figures merely show a relative position of the head 1041 and the paper S, and actually the paper S is actually moved in the carrying direction. Further, for the sake of convenience in explanation, the figures show that each nozzle forms only several dots (shown with circles in the figure), but actually ink droplets are intermittently ejected from the nozzles moving in the movement direction, and thus multiple dots are aligned in the movement direction. This row of dots (dot row) is referred to as a raster line. The dots shown with black circles are dots which are formed in the last pass, while the dots shown with empty circles are dots which are formed in previous passes. Note that, "pass" means an operation for forming a dot (dot forming operation) by ejecting ink from a moving nozzle. Each pass and an operation for carrying the paper S in the carrying direction (carrying operation) are alternately performed.

"Interlace printing" means a printing method in which k is 2 or more, and an unrecorded raster line is interposed between raster lines recorded in one pass. For example, in the printing method shown in FIGS. 8A and 8B, three raster lines are interposed between raster lines formed in the one pass.

In interlace printing, every time the paper S is carried by a fixed carrying amount F in the carrying direction, each nozzle records a raster line immediately above a raster line recorded in an immediately preceding pass. In order to perform recording by a fixed carrying amount as above, it is necessary that (1) the number N (an integer) of nozzles that can eject an ink and k are coprime and (2) the carrying amount F is set to ND.

In FIGS. 8A and 8B, each nozzle group contains eight nozzles aligned in the carrying direction. Since the nozzle pitch k of the nozzle group is 4, in order to satisfy the conditions for the interlaced mode printing which is "N and k are coprime", not all the nozzles are used. Instead the seven nozzles (nozzle #1 to nozzle #7) are used. Since seven nozzles are used, the paper S is carried by a carrying amount of 7·D. Therefore, dots are formed on the paper S at a dot interval of 720 dpi (=D) by using the nozzle group having a nozzle pitch of 180 dpi (4·D). Further, the actual number (90) of nozzles is more than 7, and thus the actual carrying amount (89·D) is larger than 7·D.

In case of the interlace printing, k times of passes are required for completion of continuous raster lines in the width of the nozzle pitch. For example, four passes are required for completion of four continuous raster lines at the dot pitch of 720 dpi by using the nozzle group with the nozzle pitch of 180 dpi. FIGS. 8A and 8B show that continuous raster lines are formed at the dot interval D upstream of a raster line formed by nozzle #2 in the pass 3 (the raster line shown with an arrow in FIGS. 8A and 8B) in the carrying direction.

<Full-Overlap Printing>

Figure 9A:
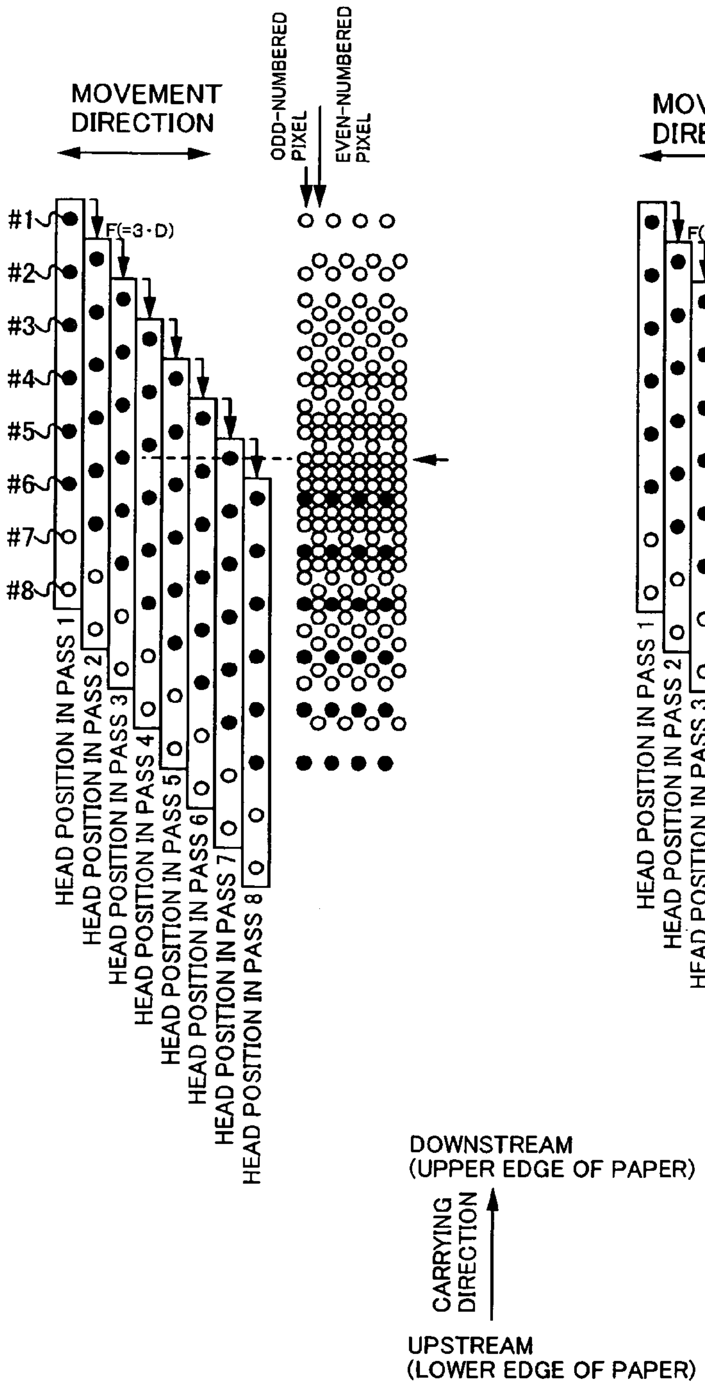
FIG. 9A is an explanatory diagram of full-overlap printing, and shows the position of the head (or the nozzle group) and the manner of dot formation in pass 1 to pass 9.
Figure 9B:
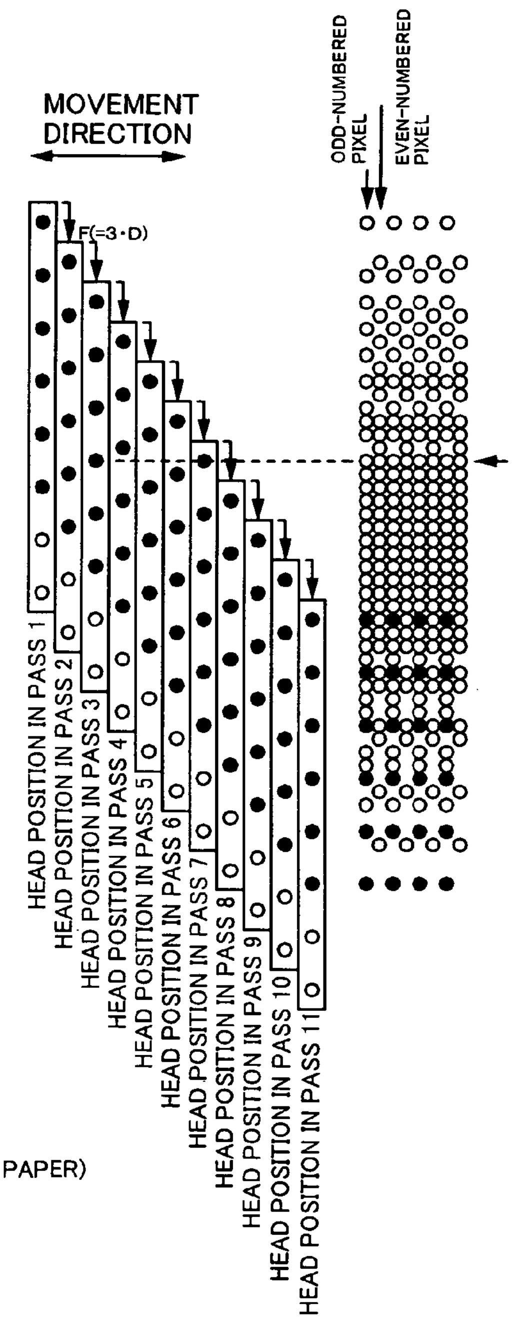
FIG. 9B is an explanatory diagram of full-overlap printing, and shows the position of the head (or the nozzle group) and the manner of dot formation in pass 1 to pass 11.

FIGS. 9A and 9B are explanatory diagrams of full-overlap printing. FIG. 9A shows the position of the head 1041 and the state of dot formation in pass 1 to pass 8, and FIG. 9B shows the position of the head 1041 and the state of dot formation in pass 1 to pass 11.

"Full-overlap printing" refers to a printing method in which a raster line is formed by a plurality of nozzles. For example, in the printing method shown in FIGS. 9A and 9B, each raster line is formed by two nozzles.

In full-overlap printing, each nozzle intermittently forms dots at several dots interval, every time the paper S is carried by the fixed carrying amount F in the carrying direction. Then, another nozzle forms dots in another pass so as to complement the intermittent dots already formed (so as to fill spaces between the dots), thus forming one raster line by a plurality of nozzles. In a case where one raster line is formed by M times of passes as described above, an "overlapping number" is defined to be M.

In FIGS. 9A and 9B, each nozzle intermittently forms dots on every other pixel. Thus, dots are formed on odd-numbered pixels or even-numbered pixels in each pass. Moreover, since a single raster line is formed by two nozzles, the overlapping number M=2.

In order to perform recording by a fixed carrying amount in overlap printing, the necessary conditions are: (1) N/M is an integer, (2) N/M and k are coprime, and (3) the carrying amount F is set to (N/M)·D.

In FIGS. 9A and 9B, the nozzle group contain eight nozzles aligned in the carrying direction. However, the nozzle pitch k in the nozzle group is 4. Therefore, all the nozzles cannot be used in order to satisfy the condition for overlap printing that "N/M and k are coprime". For this reason, six nozzles of the eight nozzles are used for overlap printing. Since six nozzles are used, the paper S is carried by a carrying amount of 3·D. As a result, dots are formed on the paper S at a dot interval of 720 dpi (=D) by using the nozzle group having a nozzle pitch of 180 dpi (4·D), for example.

In the case where one raster line is formed by M nozzles, k×M passes are required for completion of raster lines having a total width corresponding to the nozzle pitch. For example, in FIGS. 9A and 9B, two nozzles form one raster line. Thus, eight passes are required for completion of four raster lines. FIGS. 9A and 9B show that continuous raster lines are formed at a dot interval D further upstream in the carrying direction than a raster line formed by nozzle #4 in the pass 3 and nozzle #1 in the pass 7 (a raster line shown with an arrow in FIGS. 9A and 9B).

In FIGS. 9A and 9B, each nozzle forms dots on odd-numbered pixels in pass 1, each nozzle forms dots on even-numbered pixels in pass 2, each nozzle forms dots on odd-numbered pixels in pass 3, and each nozzle forms dots on even-numbered pixels in pass 4. That is, in the first four passes, dots are formed in order of odd-numbered pixels, even-numbered pixels, odd-numbered pixels, and even-numbered pixels. Further, in the last four passes (pass 5 to pass 8), dots are formed in a reverse order to the former four passes, such as, on even-numbered pixels, odd-numbered pixels, even-numbered pixels, and odd-numbered pixels. Note that, the order of dot formation in pass 9 and the following passes is same as the order of dot formation in pass 1 and the following passes.

<Partial-Overlap Printing>

Figure 10A:
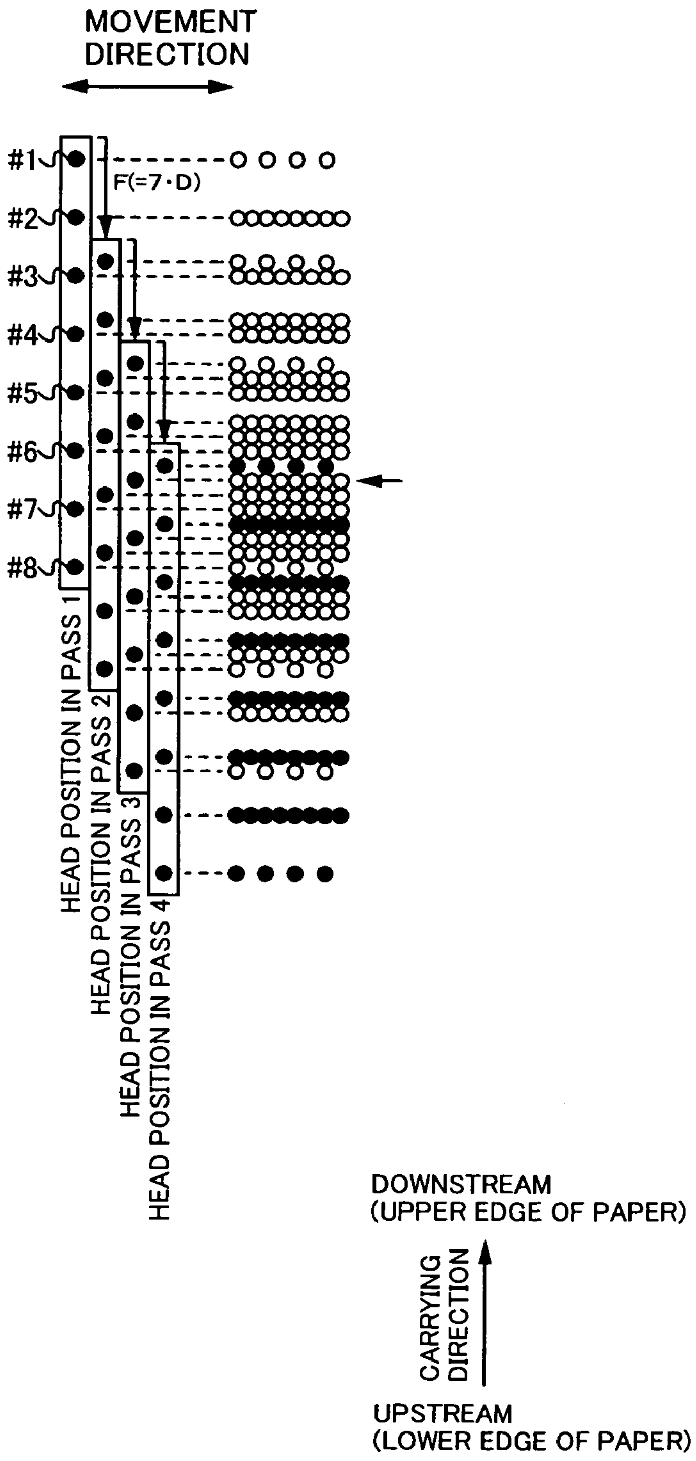
FIG. 10A is an explanatory diagram of partial-overlap printing, and shows the position of the head (or the nozzle group) and the manner of dot formation in pass 1 to pass 4.
Figure 10B:
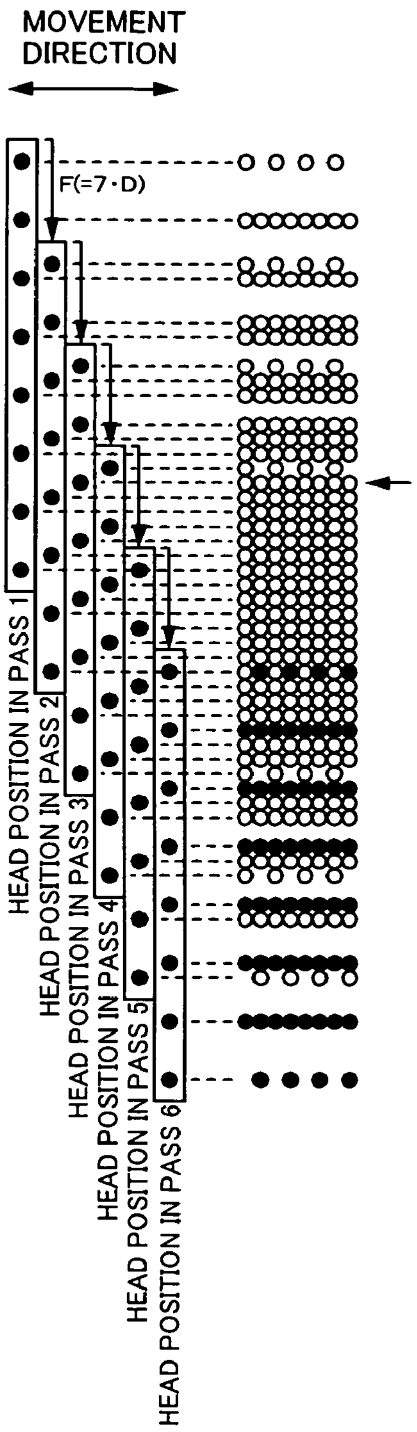
FIG. 10B is an explanatory diagram of partial-overlap printing, and shows the position of the head (or the nozzle group) and the manner of dot formation in pass 1 to 6.

FIGS. 10A and 10B are explanatory diagrams of partial-overlap printing. FIG. 10A shows the position of the head 1041 and the state of dot formation in pass 1 to pass 4. FIG. 10B shows the position of the head 1041 and the state of dot formation in pass 1 to pass 6.

In partial-overlap printing, two nozzles of a nozzle positioned at an upstream end in the carrying direction of the nozzle group and a nozzle positioned at a downstream end in the carrying direction of the nozzle group have the same function as one nozzle positioned at a center of the nozzle group. For example, in FIGS. 10A and 10B, the number of dots formed by each of nozzle #1 and nozzle #8 is half the number of dots formed by each of nozzle #2 to nozzle #7. However, the number of nozzles that can eject ink in FIGS. 10A and 10B is more than the number of nozzles that can eject ink in FIGS. 8A and 8B.

In partial-overlap printing, the nozzle positioned at the upstream end in the carrying direction intermittently forms dots. Further, in another pass, the nozzle positioned at the downstream end in the carrying direction forms dots so as to complement the intermittent dots already formed (so as to fill spaces between the dots). Thus, the two nozzles positioned at the ends have the same function as one nozzle positioned at the center. For example, in FIGS. 10A and 10B, nozzle #8 forms dots for every other dot in a certain pass, and thereafter nozzle #1 forms dots in another pass so as to fill the spaces between the dots. Thus, one raster line is completed.

The carrying operation by the fixed carrying amount F and each of the passes are alternately performed in partial-overlap printing, as in the interlace printing described above. In order to perform printing by the fixed carrying amount as above, the necessary conditions are, (1) a total nozzle number N' and k are coprime and (2) the carrying amount F is set to N'·D. Here, "total nozzle number N'" is a total number of nozzles when the nozzles at the center portion is counted as "1", and the nozzles that form only half the dot is counted as "0.5". For example, in FIGS. 10A and 10B, the total nozzle number N' is "7".

Partial-overlap printing described above is a modification of interlace printing described above. However, full-overlap printing described above may be modified to achieve partial-overlap printing.

Figure 11A:
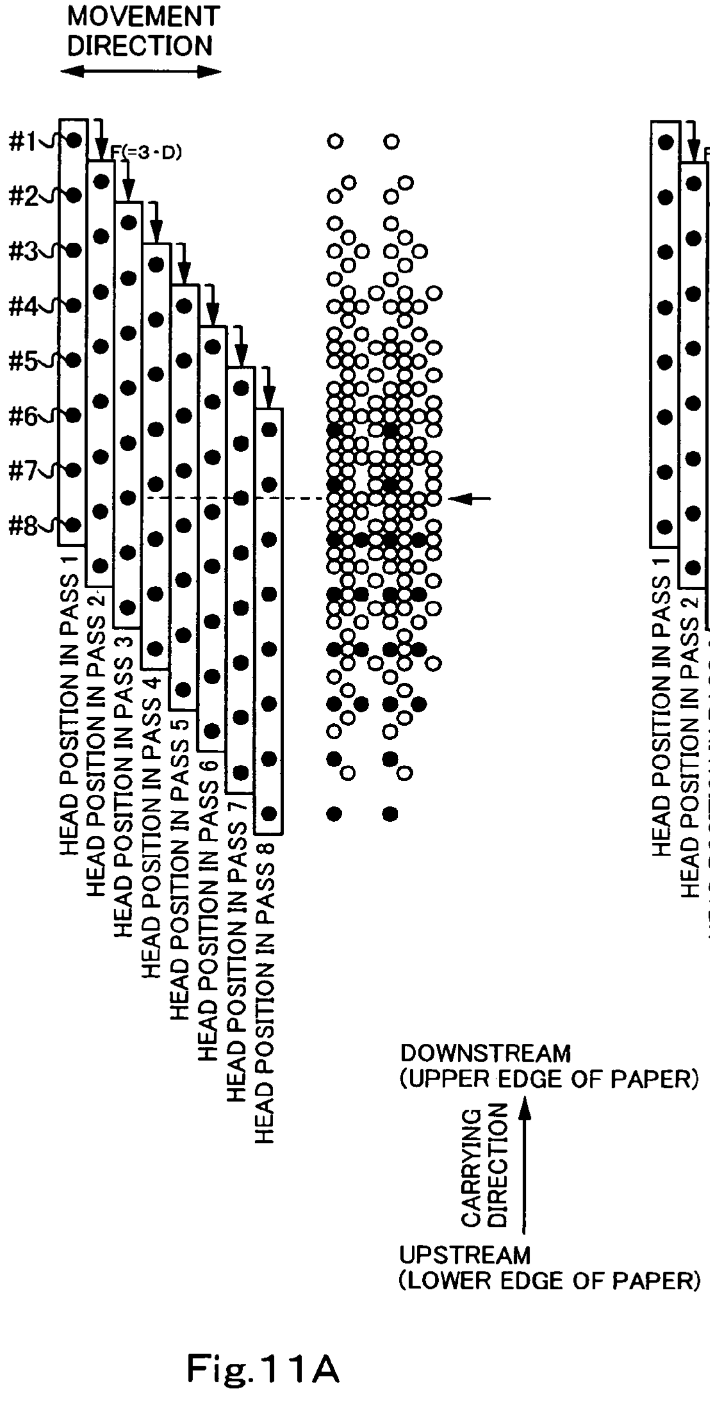
FIG. 11A is an explanatory diagram of another partial-overlap printing and shows the position of the head (or the nozzle group) and the manner of dot formation in pass 1 to 8.
Figure 11B:
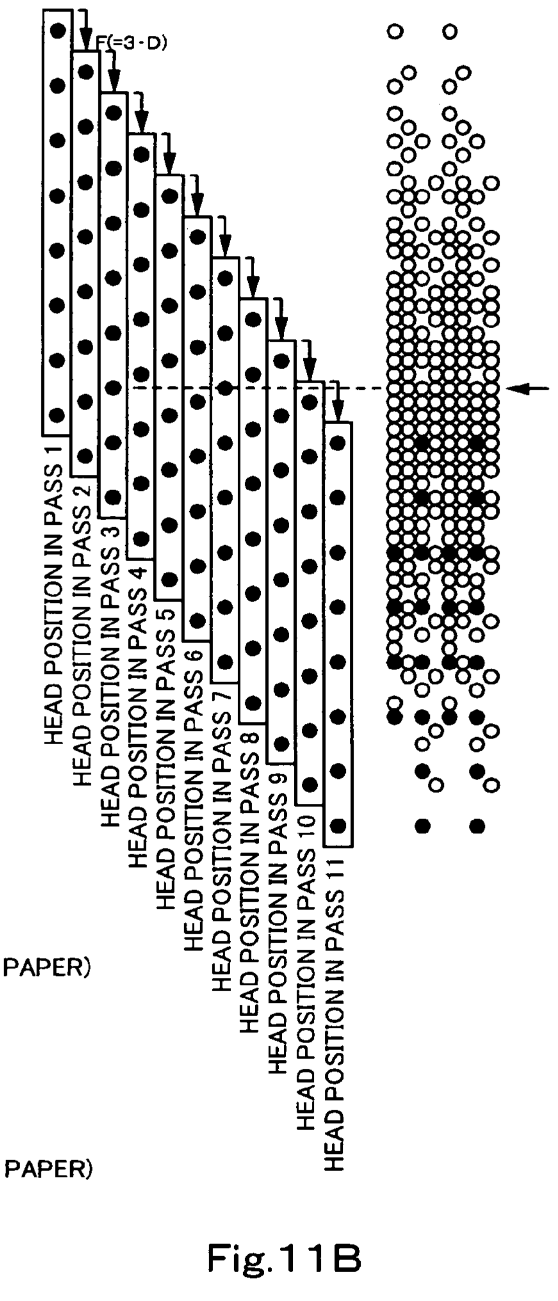
FIG. 11B is an explanatory diagram of the another partial-overlap printing and shows the position of the head (or the nozzle group) and the manner of dot formation in pass 1 to 11.

FIGS. 11A and 11B are explanatory diagrams of another partial-overlap printing. In this example, nozzle #3 to nozzle #6 that are positioned at the center portion of the nozzle group form dots in the same manner as in full-overlap printing described above. On the other hand, the nozzles positioned at end portions of the nozzle group (nozzle #1, nozzle #2, nozzle #7, and nozzle #8) form only half the dots formed by the nozzles positioned at the center portion. Moreover, all the nozzles (nozzle #1 to nozzle #8) eject ink, as is different from the case of full-overlap printing described above.

In order to perform partial-overlap printing in full-overlap printing as described above, the necessary conditions are: (1) N'/M is an integer, (2) N'/M and k are coprime, and (3) the carrying amount F is set to (N'/M)·D. Note that, in FIGS. 11A and 11B, the total nozzle number N' is "6".

<Manner of Representation of Printing Method>

Figure 12:
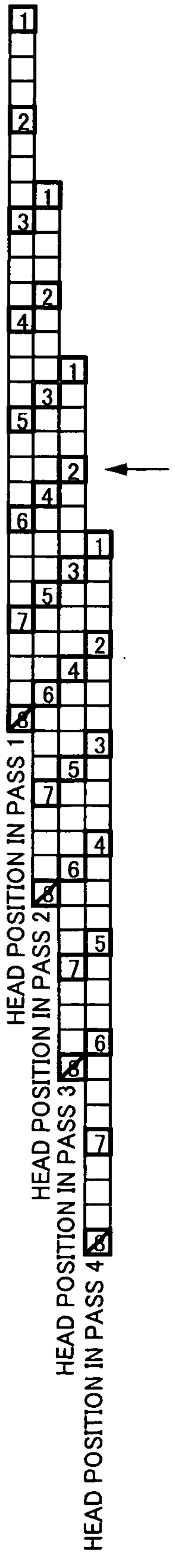
FIG. 12 is a diagram of interlace printing in FIG. 8A described in a different way of representation.

FIG. 12 is a diagram describing the interlace printing shown in FIG. 8A in another representation manner. A square surrounded with bold lines in FIG. 12 represents a position of a nozzle. Further, a number in the square represents a number of a nozzle corresponding to that position. The raster line shown with an arrow in FIG. 8A is formed by nozzles positioned at a position shown with an arrow in FIG. 12.

From the following description of the embodiment, the printing method is represented in as above because of space limitations.

Borderless Printing

<Regarding Printing Region>

There is a printing method referred to as "borderless printing" that performs printing without forming a margin at an edge portion of paper S. Borderless printing has become popular in recent years because it can print an image on an entire area of the paper S.

Figure 13:
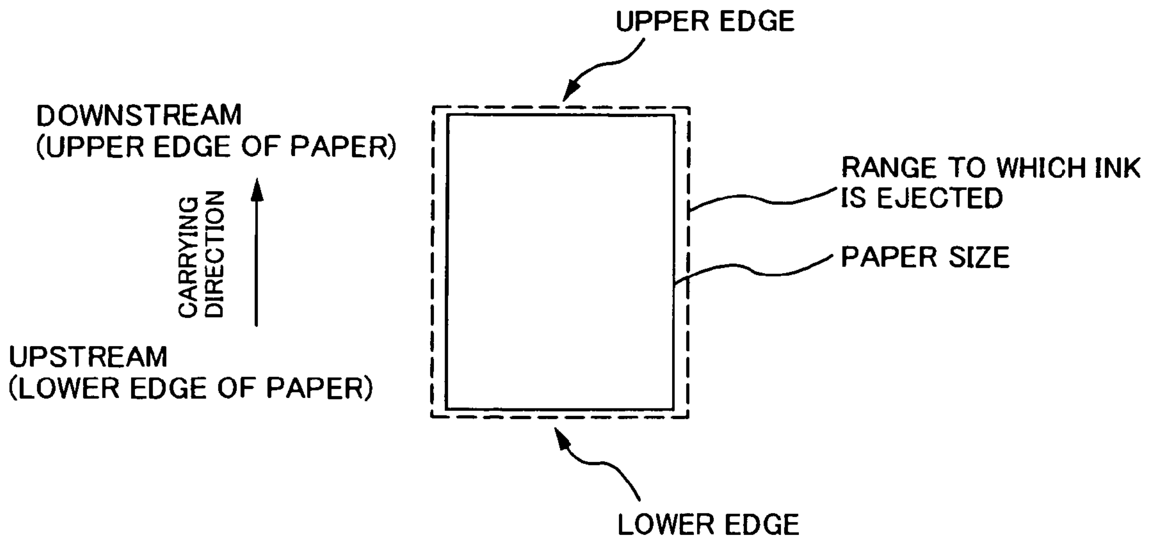
FIG. 13 a schematic explanatory diagram of borderless printing.

FIG. 13 is a schematic diagram explaining borderless printing. In FIG. 13, an inner quadrangle shown with solid line represents a size of the paper S. Further, an outer quadrangle shown by the dotted line represents a region to which ink is ejected. It is possible to print an image on the paper S without forming a margin by ejecting ink to the region wider than the paper S.

But, since the range to which ink is ejected (square shown by the dotted line) is wider than the size of the paper S (square shown with the solid line), there is some ink does not land on the paper S (hereinafter, referred to as "ink landing out of paper") when borderless printing is performed. If the ink landing out of the paper lands on the platen 1024, that ink will make a reverse side of next paper S dirty when the next paper S is carried.

Accordingly, in the printer 1001 that performs the borderless printing, a groove is provided in the platen 1024 so that the ink landing out of the paper lands in this groove.

<Borderless Printing at a Side Edge of Paper>

Figure 14A:
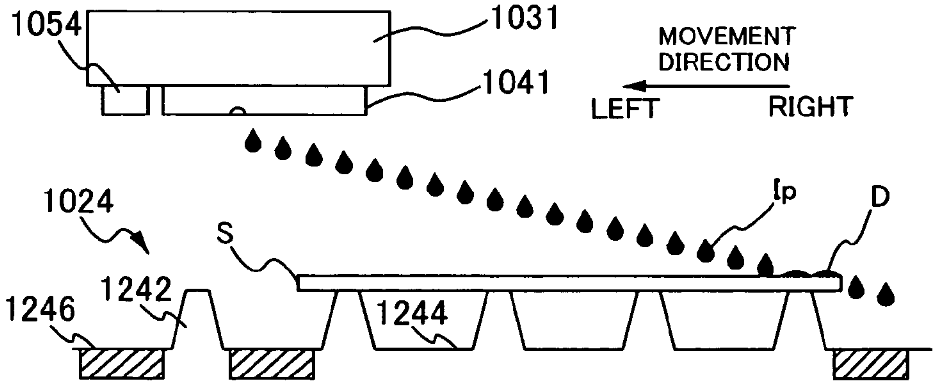
FIG. 14A is an explanatory diagram of ink ejection in borderless printing.
Figure 14B:
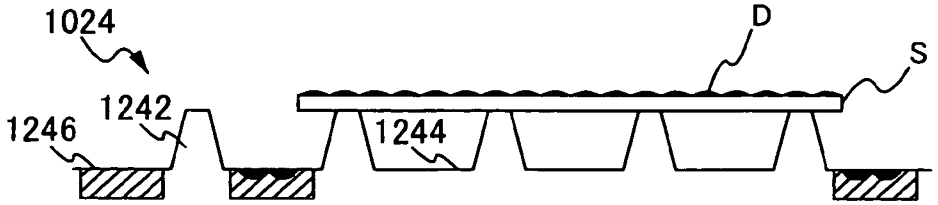
FIG. 14B is an explanatory diagram of ink landing in borderless printing.

FIG. 14A is an explanatory diagram showing ejection of ink when borderless printing is performed. FIG. 14B is an explanatory diagram showing landing of ink when borderless printing is performed. Both of FIGS. 14A and 14B are views seen from the carrying direction. For convenience of description, only one nozzle group of a plurality of nozzle groups is shown.

The platen 1024 in the printer 1001 performing borderless printing includes a projection 1242 (that may be called as a convex portion or a rib), a groove 1244 (that may be called as a concave portion), and an absorbing member 1246.

The projection 1242 is a member that contacts paper S when the platen 1024 supports the paper S. The projection 1242 is structured to prevent the paper S from coming into contact with the groove 1244. Further, the projection 1242 is provided so as not to be positioned at a side edge of the paper S having a defined size.

The groove 1244 is a dent provided in the platen 1024. Since the groove 1244 is concave with respect to the projection 1242, a reverse side of the paper S does not become dirty even if ink makes the groove 1244 dirty. Thus, even if ink is ejected to a region wider than a paper width in borderless printing, the ink landing out of paper lands in the groove 1244, and does not make the reverse side of the paper S dirty.

The absorbing member 1246 is a member for absorbing ink and is formed by a water-absorbing sponge, for example. The absorbing member 1246 is provided in the groove 1244, and absorbs the ink that does not land on the paper that lands in the groove 1244 during borderless printing. Dispersion of the ink that does not reach the paper is prevented by the absorbing member 1246 absorbing the ink. Moreover, the printer 1001 can perform printing to a plurality of types of paper S that are different in width. Thus, the absorbing member 1246 is provided, in accordance with the width of printable paper having a defined size, in a region where the ink landing out of paper lands that corresponds to the paper S.

As shown in FIGS. 14A and 14B, by ejecting ink to the wider range than the paper width, it is possible to print an image on the paper S without leaving a margin at the side edge of the paper S. Moreover, the ink landing out of the paper lands on the absorbing member 1246 in the groove 1244. Therefore, it is possible to prevent the ink landing out of paper from making the reverse side of the paper S dirty.

<Borderless Printing at an Upper Edge of Paper>

Figure 15A:
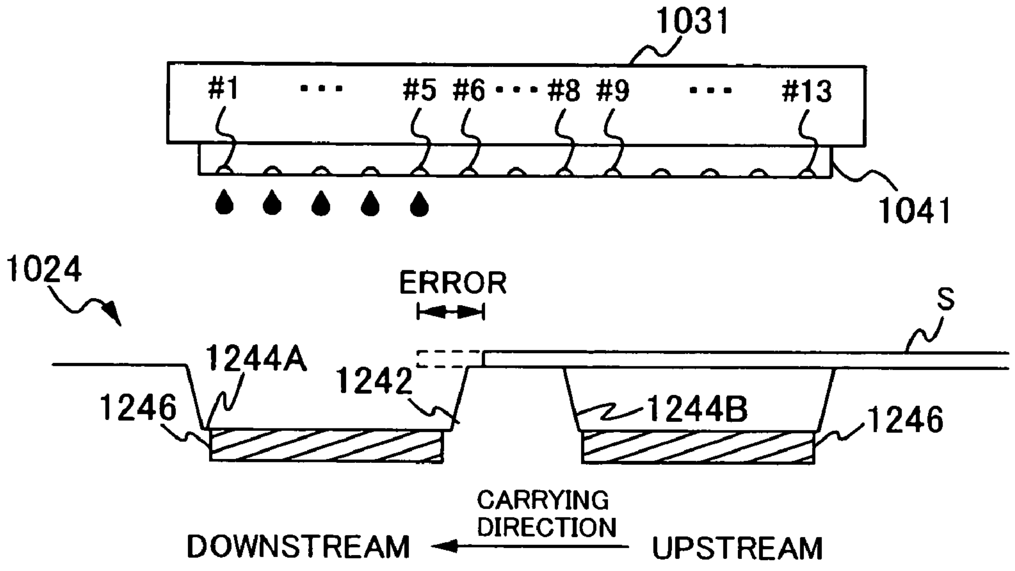
FIG. 15A is an explanatory diagram of ink ejection in borderless printing at an upper edge of the paper, showing a case where the upper edge of the paper is positioned on a projection.
Figure 15B:
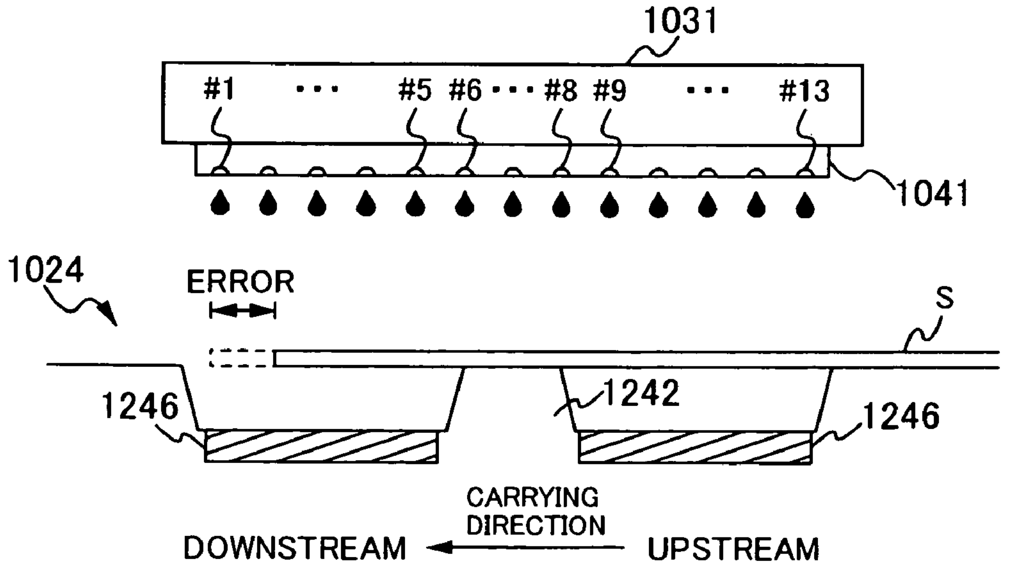
FIG. 15B is an explanatory diagram of ink ejection in borderless printing at the upper edge of paper, showing a case where the upper edge of the paper is positioned above a groove.

FIGS. 15A and 15B are explanatory diagrams of ink ejection when performing borderless printing at an upper edge of paper S. Both of FIGS. 15A and 15B are views seen from the movement direction of the carriage 1031. Here, the number of nozzles in the nozzle group is reduced (thirteen nozzles are shown here) for the convenience of explanation.

Nozzle #1 to nozzle #5 are provided at positions opposed to a groove 1244A at the downstream side in the carrying direction. Thus, the ink ejected from nozzle #1 to nozzle #5 lands on the groove 1244A, even if it does not land on the paper S. Nozzle #6 to nozzle #8 are provided at positions opposed to the projection 1242. Thus, the ink ejected from nozzle #6 to nozzle #8 may land on the projection 1242 if it does not land on the paper S. Nozzle #9 to nozzle #13 are provided at positions opposed to the groove 1244B at the upstream side in carrying direction. Thus, the ink ejected from nozzle #9 to nozzle #13 lands on the groove 1244B even if it does not land on the paper S.

Incidentally, when the paper S is carried, an error occurs in a position of the upper edge of paper S because of inclination of the paper S, structural variations, and the like. In FIGS. 15A and 15B, the position of the paper S when the paper S is positioned most downstream in the carrying direction is shown by the dotted line, and the position of the paper S when the paper S is positioned most upstream in the carrying direction is shown with the solid line.

In the case there is the possibility that the upper edge of the paper S is positioned above the projection 1242 in consideration of the carrying error (the state shown in FIG. 15A), there is the possibility that ink will land on the projection 1242 if ink is ejected from all of the nozzles. Thus, in this case, the printer 1001 performs borderless printing at the upper edge of the paper S by ejecting the ink only from nozzle #1 to nozzle #5. Further, when the number of the nozzles that can eject ink is reduced, the carrying amount becomes smaller when printing with interlace printing.

On the other hand, in the case the upper edge of the paper S is positioned above the groove 1244A (or downstream of the groove 1244A in the carrying direction) even in consideration of the carrying error (the state shown in FIG. 15B), no ink lands on the projection 1242 even when ink is ejected from all the nozzles. Thus, in this case, the printer 1001 can perform borderless printing at the upper edge of the paper S by ejecting the ink from all the nozzles. Therefore, the number of the nozzles that can eject ink become large, and the carrying amount can be made large.

By the way, in order to prevent a margin from being formed at the upper edge of the paper S even when the carrying error occurs, ink is ejected to a region from the upper edge of the paper S shown by the dotted line in the figure to the upper edge of the paper S shown with the solid line in the figure. Further, nozzles which eject ink to that region are nozzle #1 to nozzle #5 only. This is because there is the possibility that the ink may land on the projection 1242 when nozzle #6 to nozzle #8 eject the ink to that region.

<Borderless Printing at a Lower Edge of Paper>

Figure 16A:
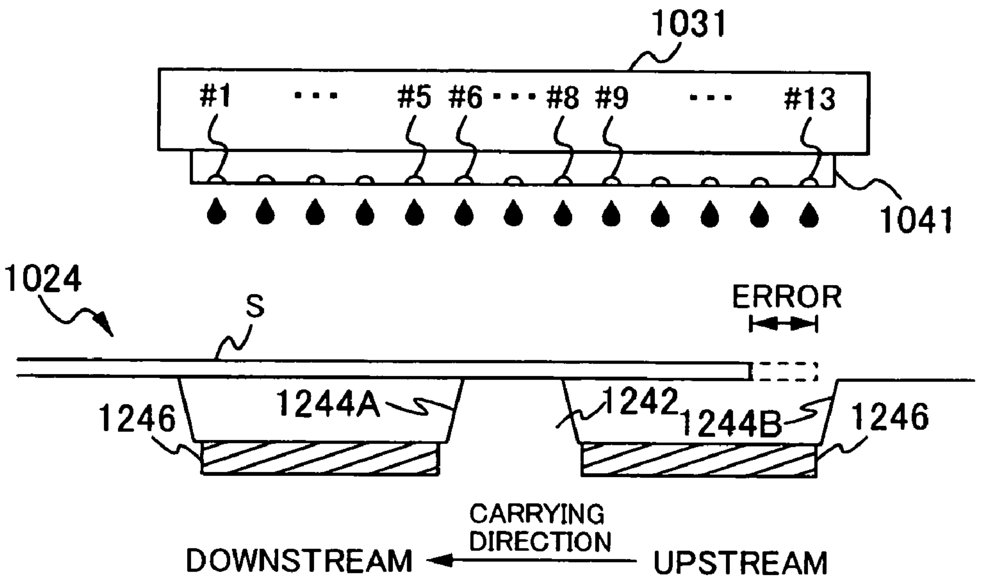
FIG. 16A is an explanatory diagram of ink ejection in borderless printing at a lower edge of paper, showing a case where the lower edge of the paper is positioned above the groove.
Figure 16B:
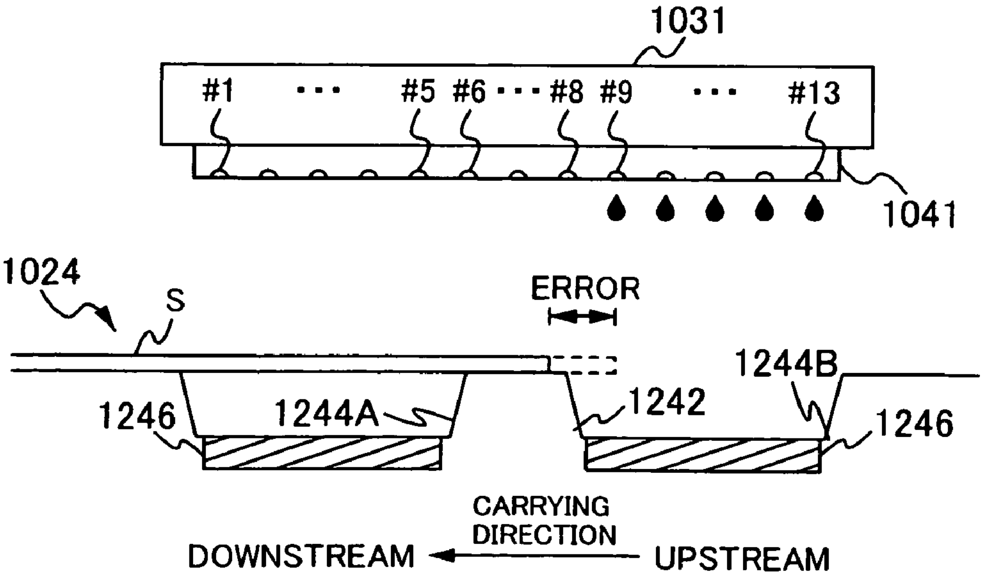
FIG. 16B is an explanatory diagram of ink ejection in borderless printing at the lower edge of paper, showing a case where the lower edge of the paper is positioned on the projection.

FIGS. 16A and 16B are explanatory diagrams of ejection of ink when borderless printing is performed at a lower edge of paper S. FIGS. 16A and 16B are views seen from the movement direction of the carriage 1031. In this example, the number of the nozzles in the nozzle group is reduced for convenience of description (thirteen nozzles in this example). Note that, an error occurs in a position of the lower edge of the paper S because of inclination of the paper S, structural variations, and the like, when the paper S is carried. In FIGS. 16A and 16B, the position of the paper S when the paper S is positioned most downstream in the carrying direction is shown with the solid line, and the position of the paper S when the paper S is positioned most upstream in the carrying direction is shown by the dotted line.

In the case where the lower edge of the paper S is positioned above the groove 1244B (or upstream of the groove 1244B in the carrying direction) even if the carrying error is considered (the state shown in FIG. 16A), no ink lands on the projection 1242 when all the nozzles eject the ink. Thus, in this case, the printer 1001 can perform borderless printing at the lower edge of the paper S by ejecting the ink from all the nozzles.

On the other hand, in the case there is a possibility that the lower edge of the paper S may be positioned above the projection 1242 in consideration of the carrying error (the state shown in FIG. 16B), there is possibility that the ink may land on the projection 1242 when all the nozzles eject the ink. Thus, in this case, the printer 1001 performs the borderless printing at the lower edge of the paper S by ejecting the ink only from nozzle #9 to nozzle #13. Note that, when the number of nozzles that can eject ink is reduced, the carrying amount is reduced when printing with interlace printing.

By the way, in order to prevent a margin from being formed at the lower edge of the paper S even if the carrying error occurs, the ink is ejected to a range from the lower edge of the paper S shown by the dotted line in the figure to the lower edge of the paper S shown by the solid line in the figure. Further, nozzles that eject ink to this range are nozzle #9 to nozzle #13 only. This is because there is the possibility that the ink may land on the projection 1242, if nozzle #6 to nozzle #8 eject the ink in this range.

Start Timing 1 of Lower Edge Printing (Model Example)

Figures 17A, 17B, 17C:
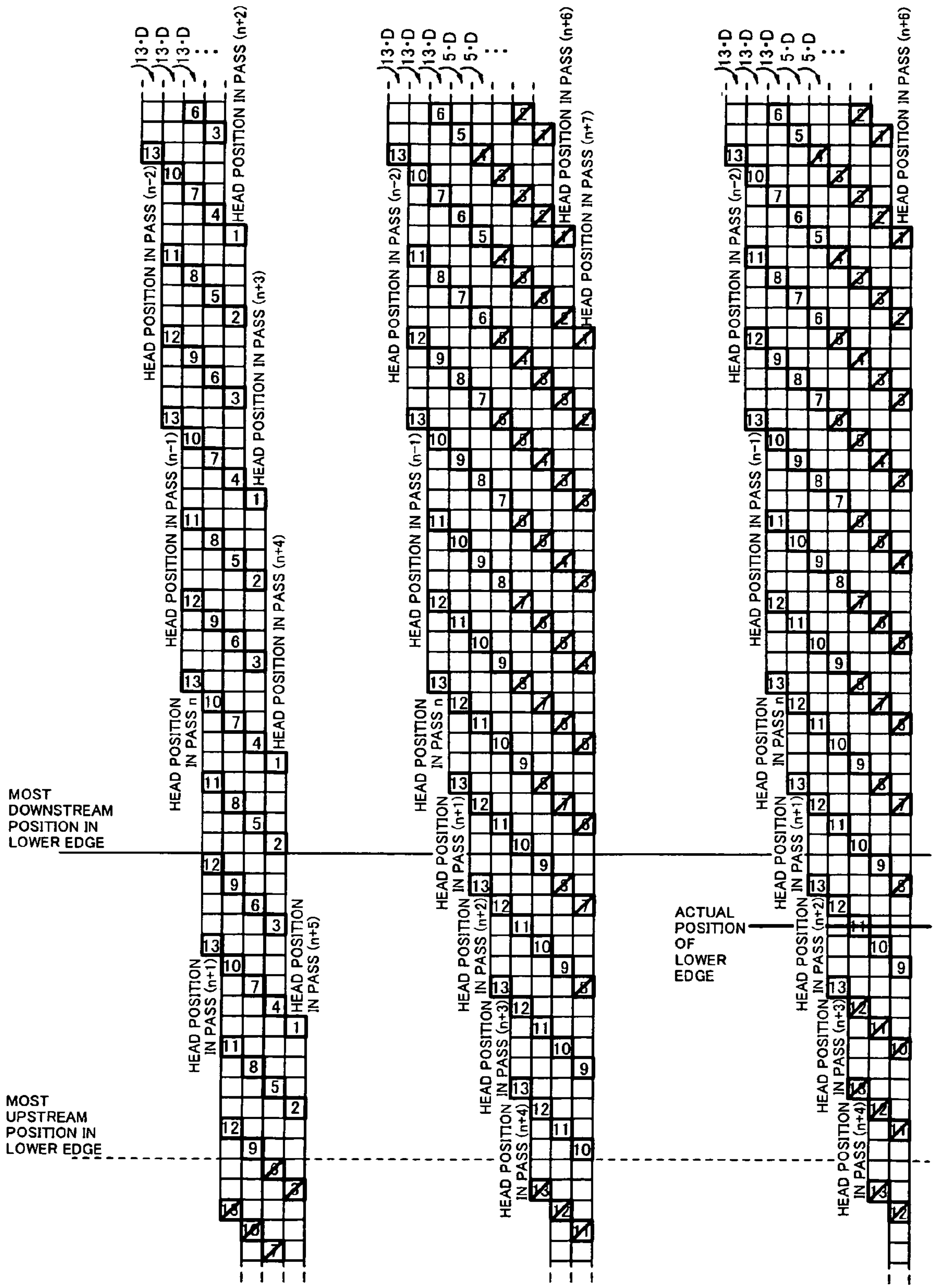
FIG. 17A is an explanatory diagram of a printing method of a reference example.
FIG. 17B is an explanatory diagram of a printing method of a first comparative example.
FIG. 17C is an explanatory diagram of a printing method of a second comparative example.

FIGS. 17A to 17C show a relative positional relationship of positions of nozzles in each of the passes with respect to a position of a lower edge of paper S in three types of printing methods. The solid line drawn in a horizontal direction in FIGS. 17A to 17C represents a position of a lower edge of a paper S when the lower edge of the paper S is positioned most downstream in the carrying direction. That is, this solid line represents the position of the lower edge of the paper S shown by the solid line in FIGS. 16A and 16B. Hereinafter, the position of the solid line is referred to as a "lower edge's most-downstream position". Further, the dotted line drawn in the horizontal direction in FIGS. 17A to 17C represents the position of the lower edge of the paper S when the lower edge of the paper S is positioned most upstream in the carrying direction. That is, this dotted line represents the position of the lower edge of the paper S shown by the dotted line in FIGS. 16A and 16B. Hereinafter, the position shown with the solid line is referred to a "lower edge's most-upstream position".

In other words, the lower edge of the paper S is positioned somewhere between the lower edge's most-downstream position and the lower edge's most-upstream position. Thus, the paper S is surely present downstream of the lower edge's most-downstream position in the carrying direction (i.e., an upper side in FIGS. 17A to 17C) even when the carrying error is taken into consideration. That is, in the case where ink is ejected upstream of the lower edge's most-downstream position in the carrying direction, even if the ink is ejected from any nozzle, the ink will land on the paper S (the ink can be ejected from any nozzle). Further, in between the lower edge's most-downstream position and the lower edge's most-upstream position, there is a place that the paper S is present and a place that the paper S is not present, in accordance with the carrying error. Thus, in the case where ink is ejected towards the region between the lower edge's most-downstream position and the lower edge's most-upstream position, only nozzle #9 to nozzle #13 that are opposed to the groove 1244B are used. Further, the paper S is surely not present upstream of the lower edge's most-upstream position in the carrying direction (i.e., a lower side in FIGS. 17A to 17C) even when the carrying error is taken into consideration. That is, it is not necessary to eject ink upstream of the lower edge's most-upstream position in the carrying direction.

<Reference Example>

FIG. 17A is an explanatory diagram of a printing method of a reference example. In the printing method of the reference example, borderless printing is performed at a lower edge of paper S by normal interlace printing. In this case, since the number of nozzles that can eject ink is thirteen, the carrying amount is 13·D (=13/720 inches). However, in this printing method, since nozzle #6 to nozzle #8 eject ink toward the region between the lower edge's most-downstream position and the lower edge's most-upstream position, there is the possibility that the ink landing out of paper may land on the projection 1242 and the reverse side of the paper S may become dirty.

<First Comparative Example>

FIG. 17B is an explanatory diagram of a printing method of a first comparative example. In the printing method of the first comparative example, the printer 1001 performs interlace printing in which all nozzles eject ink in principle. However, if a most-upstream nozzle in the nozzle group is positioned upstream of the lower edge's most-downstream position in the carrying direction when paper S is carried by a normal carrying amount, the printer 1001 does not carry the paper S by the normal carrying amount but carries the paper S by a carrying amount at lower edge printing. In the carrying operations hereafter, the paper S is carried by the carrying amount for lower edge printing.

More specifically, until pass n, nozzle #13 that is a most-upstream nozzle is positioned downstream of the lower edge's most-downstream position in the carrying direction. Thus, the printer 1001 carries the paper S by the normal carrying amount (13·D (=13/720 inches)) until pass n. However, when the paper S is carried by the normal carrying amount (13·D (=13/720 inches)) after pass n is finished, nozzle #13 is positioned upstream of the lower edge's most-downstream position in the carrying direction (the same state as pass n+1 in FIG. 17A). Thus, the printer 1001 carries the paper S by a carrying amount of 5·D (=5/720 inches) in the carrying operation performed between pass n and pass n+1. Then, the printer 1001 carries the paper S by the carrying amount of 5·D in the carrying operations hereafter.

According to the printing method of the comparative example, only nozzle #9 to nozzle #13 which are opposed to the groove 1244B are nozzles that eject ink toward the region between the lower edge's most-downstream position and the lower edge's most-upstream position. Thus, ink landing out of paper does not land on the projection 1242 and does not make the reverse side of the paper S dirty.

<Second Comparative Example>

FIG. 17C is an explanatory diagram of a printing method of a second comparative example. The printing method of the second comparative example is performed in a similar manner to the aforementioned first comparative example. However, in the second comparative example, the controller 1060 changes the region to which the ink is ejected and the number of passes, in accordance with the detection result of the lower edge by the optical sensor 1054. Here, it is assumed that the lower edge of the paper S is positioned at a position shown by the bold line in FIG. 17C.

In the second comparative example, the optical sensor 1054 detects the side edge of the paper S in pass n+2 but does not detect the side edge of the paper S in pass n+3. Therefore, the controller 1060 detects that the lower edge of the paper S is positioned downstream of the position of the optical sensor 1054 (the position of nozzle #13) in pass n+3.

Thus, the controller 1060 controls ejection of ink so as not to form a raster line positioned upstream of the position of nozzle #13 in pass n+3 in the carrying direction. For example, the controller 1060 performs control so as not to allow nozzle #12 and nozzle #13 to eject ink in pass n+4. Due to this, the amount of ink landing out of paper can be reduced.

Moreover, when the lower edge of the paper S is detected, the controller 1060 finishes printing in four passes including a pass in which the lower edge is detected. More specifically, after detecting the lower edge of the paper S in pass n+3, the controller 1060 finishes printing when pass n+6 is finished without performing pass n+7. This is because printing at the lower edge of the paper S is finished without performing pass n+7. Further, by not performing pass n+7, printing on the paper S can be finished earlier.

Note that, in this second comparative example, the printer 1001 performs the carrying operation three times after detecting the lower edge of the paper S. In other words, after the lower edge of the paper S is detected, the printer 1001 carries the paper S with a total amount of 15·D (=5·D×three times). The total carrying amount of the three carrying operations is hereinafter referred to as a "necessary carrying amount for a lower edge process".

Embodiment 1

In the aforementioned comparative examples, the paper S is carried by the carrying amount for lower edge printing (5·D), from the carrying operation of pass n and thereafter. However, since the carrying amount for lower edge printing is smaller than the carrying amount for normal printing (13·D), it takes a long time to finish printing.

In particular, as in the second comparative example, in the case where a pass with which printing is finished is determined by detection of the lower edge of the paper S by the optical sensor 1054, it takes a long time until the optical sensor 1054 detects the lower edge of the paper S if the carrying operation by a small carrying amount is repeated until the optical sensor 1054 detects the lower edge of the paper S. Thus, it takes a long time to finish printing.

Therefore, in this embodiment, printing at the lower edge of the paper S is performed in the following manner.

Figures 18A, 18B, 18C:
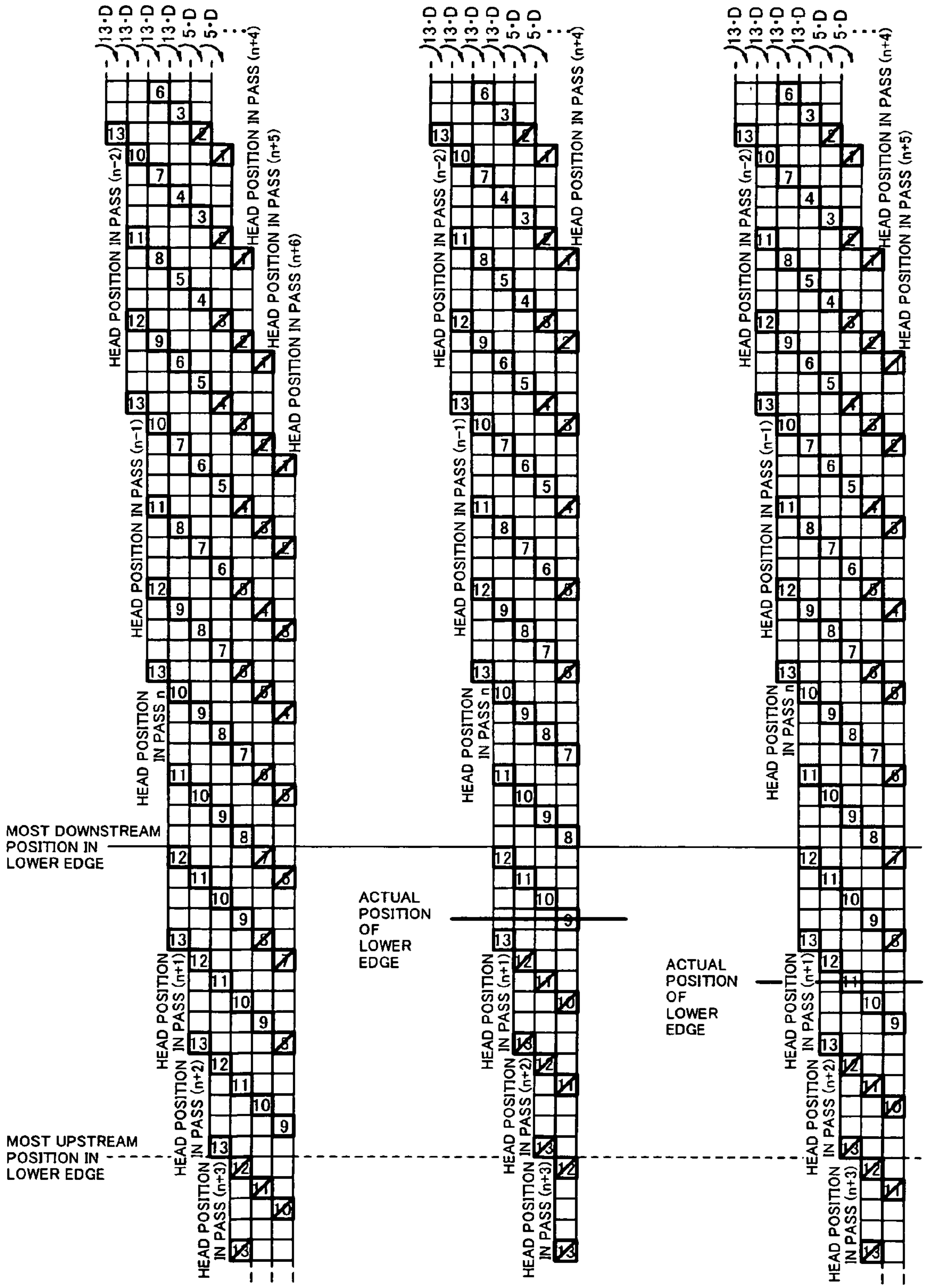
FIG. 18A is a first explanatory diagram of this embodiment.
FIG. 18B is a second explanatory diagram of this embodiment.
FIG. 18C is an explanatory diagram of this embodiment when a position of the lower edge of the paper varies.

FIG. 18A is a first explanatory diagram of this embodiment. When comparing the first comparative example described above and this embodiment, the carrying amount in the carrying operation performed between pass n and pass n+1 differs.

In this embodiment, the printer 1001 performs normal interlace printing in which the carrying amount is 13·D. However, in the case where a distance between most-upstream nozzle of nozzles that are opposed to the projection 1242 and the lower edge's most-downstream position is shorter than the necessary carrying amount for a lower edge process if the paper S is carried by the normal carrying amount, the printer 1001 does not carry the paper S by the normal carrying amount but carries the paper S by the carrying amount for lower edge printing. Further, the paper S is carried by the carrying amount for lower edge printing in the carrying operations hereafter.

Hereinafter, description is given in detail. Here, the nozzles opposed to the projection 1242 are nozzle #6 to nozzle #8 and the most-upstream nozzle of these nozzles is nozzle #8. Further, the necessary carrying amount for a lower edge process is 15·D (total carrying amount of three carrying operations for lower edge printing).

In pass n, nozzle #8 is positioned away from the lower edge's most-downstream position by 28·D to 29·D. That is, in pass n, nozzle #8 is positioned away from the lower edge's most-downstream position by a distance larger than 28·D. Thus, even if the paper S is carried by the normal carrying amount (13·D) in the carrying operation between pass n and pass n+1, a distance between nozzle #8 and the lower edge's most-downstream position (15·D to 16·D) is larger than the necessary carrying amount for a lower edge process (15·D). Therefore, the printer 1001 carries the paper S by the normal carrying amount (13·D) in the carrying operation performed between pass n and pass n+1.

Then, in pass n+1, nozzle #8 is positioned away from the lower edge's most-downstream position by 15·D to 16·D. Thus, if the paper S is carried by the normal carrying amount in a carrying operation between pass n+1 and pass n+2, the distance between nozzle #8 and the lower edge's most-downstream position become smaller than the necessary carrying amount for a lower edge process. Therefore, the printer 1001 carries the paper S by the carrying amount for lower edge printing (5·D) in the carrying operation performed between pass n+1 and pass n+2.

When comparing FIG. 18A (this embodiment) and FIG. 17B (first comparative example), this embodiment can finish a printing process for the region between the lower edge's most-downstream position and the lower edge's most-upstream position faster. That is, it is necessary to perform printing until pass n+7 in the first comparative example, but it is enough to perform printing until pass n+6 in this embodiment. Therefore, this embodiment can end printing earlier by one pass than the first comparative example.

FIG. 18B is a second explanatory diagram of this embodiment. In this embodiment, as similarly to the second comparative example, the controller 1060 changes the region to which an ink is ejected and the number of the passes in accordance with the detection result of the lower edge by the optical sensor 1054. However, when comparing this embodiment with the second comparative example, the start timing of lower edge printing in this embodiment differs from that in the second comparative example. Thus, the carrying amount in the carrying operation performed between pass n and pass n+1 is different.

In this embodiment, the optical sensor 1054 detects the side edge of the paper S in pass n but does not detect the side edge of the paper S in pass n+1. Therefore, the controller 1060 detects that the lower edge of the paper S is positioned downstream of the position of the optical sensor 1054 (the position of nozzle #13) in pass n+1.

Thus, the controller 1060 controls ejection of ink so as not to form a raster line positioned upstream of the position of nozzle #13 in pass n+1 in the carrying direction. More specifically, the controller 1060 controls nozzle #12 and nozzle #13 not to eject ink in pass n+2, controls nozzle #11 to nozzle #13 not to eject an ink in pass n+3, and controls nozzle #10 and nozzle #11 not to eject ink in pass n+4. In this manner, the amount of ink landing out of paper can be reduced.

Then, the controller 1060 finishes printing in four passes including the pass in which the lower edge of the paper S is detected. More specifically, after detecting the lower edge of the paper S in pass n+1, the controller 1060 finishes printing when pass n+4 is finished. Thus, printing on the paper S can be finished earlier.

When comparing FIG. 18B (this embodiment) and FIG. 17C (second comparative example), this embodiment can finish printing at the lower edge of the paper S earlier. In other words, though printing has to be performed up to pass n+6 in the second comparative example, in this embodiment, it is enough to perform printing up to pass n+4. Therefore, this embodiment can finish printing earlier than the second comparative example by two passes.

As described above, in this embodiment, the printer 1001 carries the paper S by the normal carrying amount (13·D) in the carrying operation between pass n and pass n+1, instead of using the small carrying amount (5·D) for lower edge printing. Therefore, it is not necessary to repeat the carrying operation by the small carrying amount until the optical sensor 1054 detects the lower edge of the paper S. As a result, depending on the position of the lower edge of the paper S, printing can be finished dramatically earlier. For example, when FIG. 18A (this embodiment) is compared with FIG. 17B (first comparative example), printing can be finished earlier by one pass. However, when FIG. 18B (this embodiment) is compared with FIG. 17C (second comparative example), printing can be finished earlier by two passes. Note that, in the case where the lower edge of the paper S is positioned at a position shown in FIG. 18C, this embodiment can finish printing earlier by one pass, as compared with the second comparative example.

By the way, in this embodiment, when the normal carrying amount is assumed to be n1·D (n1=13), a remainder obtained by dividing n1 by k (=4) is 1. Thus, in the normal printing process, a position of a nozzle in a next pass is positioned upstream of a position of a nozzle in a previous pass in the carrying direction by one raster line. For example, FIG. 18A shows that nozzle #10 in pass n−1 is positioned upstream of nozzle #13 in pass n−2 by one raster line in the carrying direction and nozzle #7 to nozzle #10 in pass n are positioned upstream of nozzle #10 to nozzle #13 in pass n−1 by one raster line in the carrying direction. Similarly, in this embodiment, when the carrying amount for a lower edge process is assumed to be n2·D (n2=5), a remainder obtained by dividing n2 by k is 1.

As described above, the remainder obtained by dividing n1 by k (=4) is equal to the remainder obtained by dividing n2 by k in this embodiment. As a result, an order of forming raster lines when performing lower edge printing becomes approximately the same as an order of forming raster lines when performing normal printing. Due to this, a difference of image quality between a print image formed by normal printing and a print image formed by lower edge printing becomes small, and image quality of an entire print image improves.

Moreover, in this embodiment, when the carrying amount in the carrying operation between pass n and pass n+1 is assumed to be n3·D (n3=13), a remainder obtained by dividing n3 by k is equal to the remainder obtained by dividing n1 by k. Due to this, the image quality of the entire printed image is improved.

It should be noted that even if the carrying amount in the carrying operation between pass n and pass n+1 is set to 7·D, for example, and not 13·D, the carrying amount is larger than the carrying amount for lower edge printing 5·D. Thus, the effect that printing can be finished earlier can be obtained. However, if the carrying amount in this carrying operation is set to 7·D, the remainder obtained by dividing n3 by k is 3. Therefore, a positional relationship among nozzles between before and after this carrying operation is different from that in the aforementioned examples. As a result, the difference of the image quality between the printed image formed by normal printing and the printed image formed by lower edge printing becomes larger, thus degrading the image quality of the entire printed image.

Start Timing 2 of Lower Edge Printing (Specific Example)

In the above description, the model example in which the number of nozzles is small is used in order to simplify the description. However, the actual number of nozzles is 90. Thus, the following description uses the actual number of nozzles.

In the following specific examples, a nozzle pitch is 1/180 inches. But since a dot pitch is 1440 dpi, k=8. Further, in principle, one raster line is formed by two nozzles. However, in the case of performing partial-overlap printing, there is a raster line formed by three nozzles. In other words, in the case where two or more nozzles are assigned to a certain raster line, ink ejection from an excess nozzle is prevented in full-overlap printing and the number of dots formed by the excess nozzle is reduced in partial-overlap printing.

Moreover, a distance between the lower edge's most-downstream position and the lower edge's most-upstream position is 48·D (=approximately 1.5 mm) in the following specific examples.

In the following specific examples, the carrying amount in the carrying operation during normal printing is 43·D. When the printing method during normal printing is full-overlap printing, 86 nozzles (nozzle #5 to nozzle #90) are used. However, when partial-overlap printing is performed, 88 or 90 nozzles may be used. Further, the carrying amount for lower edge printing is 3·D in the following specific examples. Note that, in the case where the number of nozzles is 90, nozzle #73 to nozzle #90 are opposed to the groove 1244B of the platen 1024.

The optical sensor 1054 is positioned at approximately the same position as nozzle #90 in the carrying direction. Further, in the specific examples, after the optical sensor 1054 detects the lower edge of the paper S, the carrying operation and the dot forming operation are repeated a predetermined number of times so as to form a raster line to be formed downstream of the position of the optical sensor 1054 at that time in the carrying direction, and printing is then finished.

In the following specific examples, the paper S is carried by the carrying amount for normal printing (43·D (=43/1440 inches)) until pass 84. After pass 84, if the paper S is carried by the carrying amount for normal printing 43·D, nozzle #90 is to be positioned upstream of the lower edge's most-downstream position. According to the aforementioned comparative examples, in the carrying operations after pass 84, the paper S is carried by the carrying amount 3·D for lower edge printing.

In any of the specific examples, printing can be finished earlier as compared with the case where the paper S is carried by the carrying amount of 3·D in the carrying operations after pass 84. Moreover, in any of the specific examples, when it is assumed that the carrying amount for normal printing is n1·D (=43·D) and the carrying amount for lower edge printing is n2·D (=3·D), a remainder obtained by dividing n1 by k (=8) is equal to a remainder obtained by dividing n2 by k. Thus, an arrangement of nozzles in the drawings is regular. Further, after pass 84, when it is assumed that the carrying amount before performing lower edge printing is n3·D, a remainder obtained by dividing n3 by k is equal to the remainder obtained by dividing n1 by k, in any of the specific examples. As a result, the image quality of the printed image is improved.

<Specific Example 1>

Figure 19:
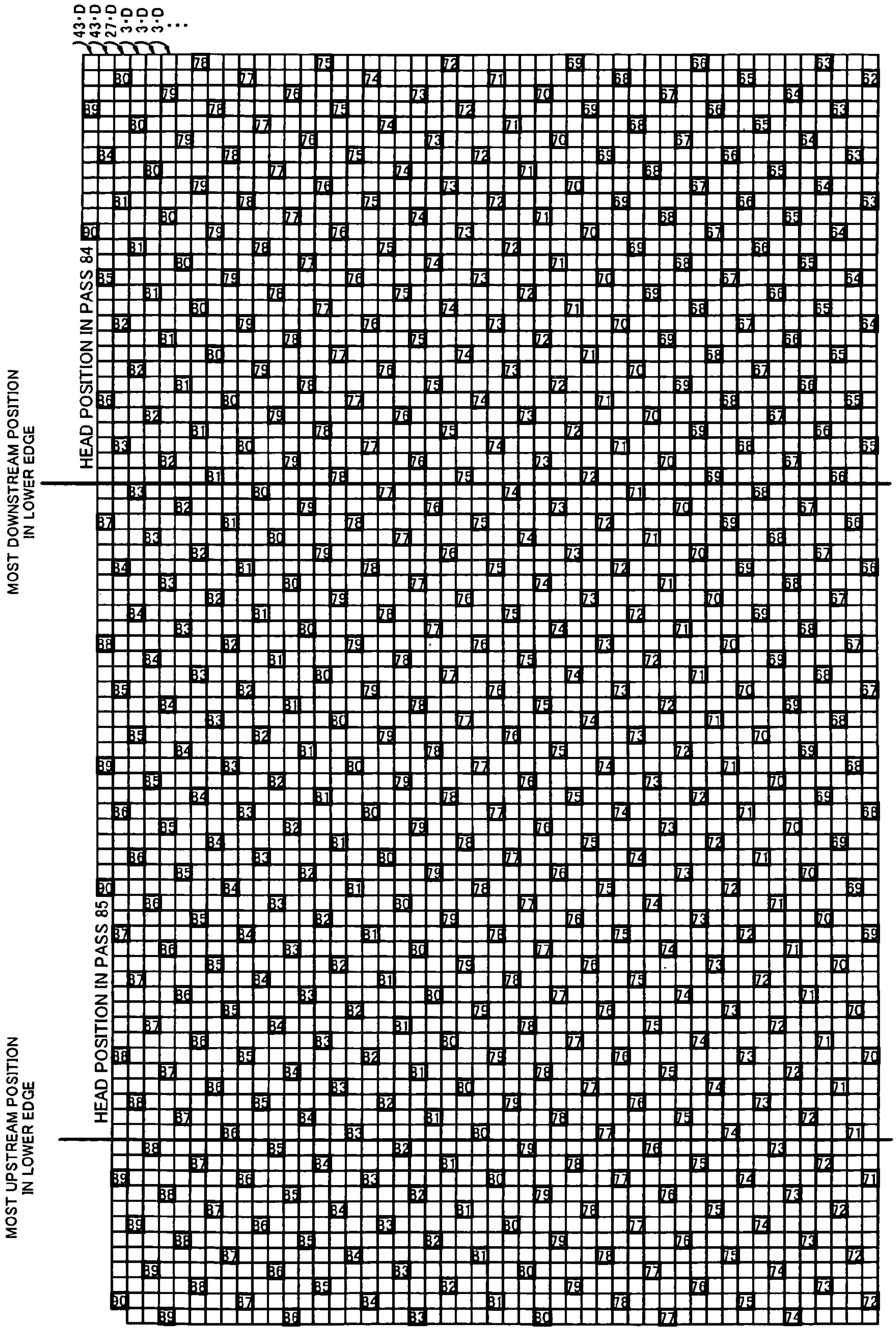
FIG. 19 is an explanatory diagram of a first specific example.

FIG. 19 is an explanatory diagram of a first specific example.

In the first specific example, paper S is carried by the carrying amount for normal printing 43·D and pass 85 is performed. Further, after pass 85, the paper S is carried by a carrying amount of 27·D. Further, after finishing pass 86, lower edge printing (the printing method in which carrying by the carrying amount 3·D for lower edge printing, and the dot forming operation are alternately repeated) is started.

Specific Example 2>

Figure 20:
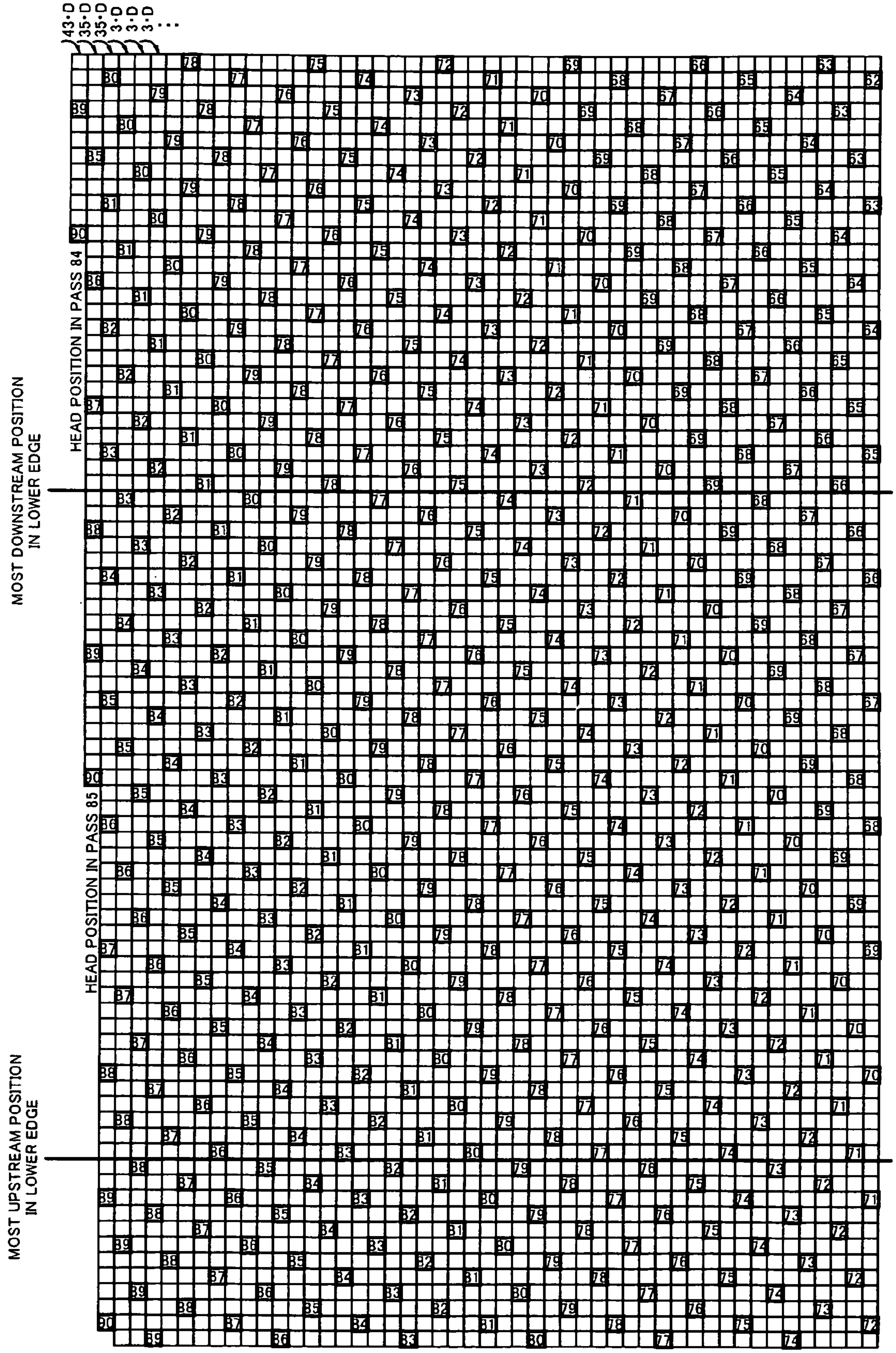
FIG. 20 is an explanatory diagram of a second specific example.

FIG. 20 is an explanatory diagram for a second specific example.

In the second specific example, pass 85 is performed by carrying the paper S by a carrying amount (35·D) that is smaller than the carrying amount for normal printing and that is larger than the carrying amount for lower edge printing. Further, after pass 85, the paper S is carried by the same carrying amount (35·D). Then, after pass 86 is finished, lower edge printing (the printing method in which carrying by the carrying amount 3·D for lower edge printing, and the dot forming operation are alternately repeated) is started.

Specific Example 3>

Figure 21:
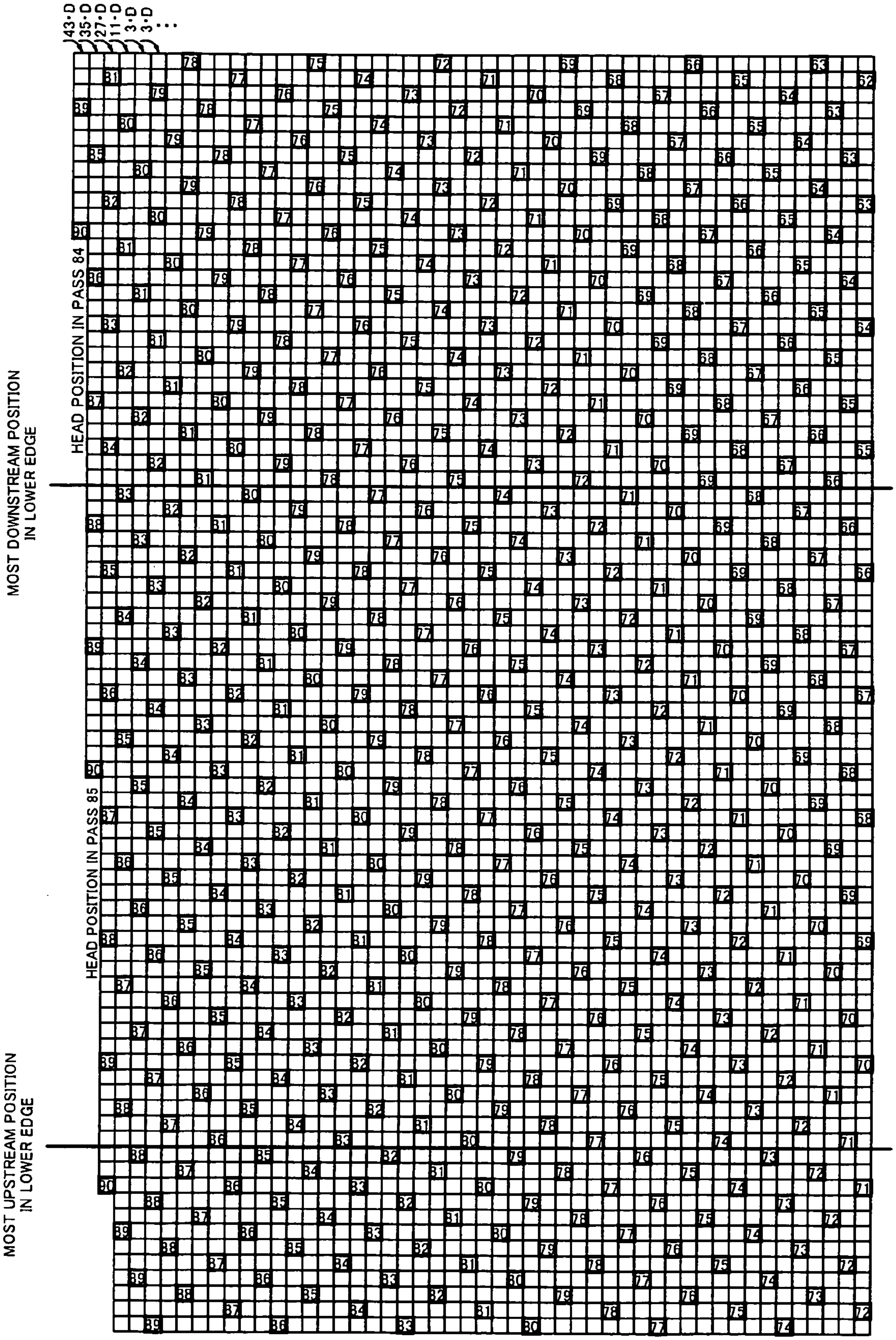
FIG. 21 is an explanatory diagram of a third specific example.

FIG. 21 is an explanatory diagram of a third specific example.

In the third specific example, the carrying amount is gradually reduced. In other words, in the carrying operation performed between pass 84 and pass 85, the paper S is carried by a carrying amount of 35·D. Further, in the carrying operation performed between pass 85 and pass 86, the paper S is carried by a carrying amount of 27·D. In the carrying operation performed between pass 86 and pass 87, the paper S is carried by a carrying amount of 11·D.

Others

The printer 1001 and the like are described as one embodiment. However, the above embodiment intends to facilitate understanding of the present invention but does not intend to limit the present invention. It goes without saying that changes and modification could be made to the present invention without departing from the spirit of the present invention and the present invention encompasses equivalents thereof.

<Summary>

(1) The aforementioned printing system 1100 includes the printer 1001 and the computer 1110. The printer includes the platen 1024 (an example of supporting member), a plurality of nozzles, and the controller 1060.

The platen 1024 has a hprojection (an example of a convex portion) that contacts with a paper S (an example of medium) carried in the carrying direction and a groove (an example of a concave portion) that do not contact with the paper S.

A plurality of the nozzles are aligned in the carrying direction (refer to FIG. 6), and contain nozzles opposed to the convex portion (nozzle #6 to nozzle #8 in FIGS. 16A and 16B) and nozzles opposed to the concave portion (nozzle #1 to nozzle #5 and nozzle #9 to nozzle #13 in FIGS. 16A and 16B).

According to the aforementioned model example, the controller 1060 performs a normal printing process (an exemplary first printing process) that repeats a normal carrying operation (an example of a first carrying operation) for carrying the paper S by a carrying amount of 13·D (an example of a first carrying amount) and a dot forming operation for forming a raster line (an example of a dot line) on the paper S by ejecting ink from the nozzles based on print data from the computer 1110.

Further, the controller performs a lower edge printing process (an example of a second printing process) that alternately repeats a carrying operation (an example of a second carrying operation) for carrying the paper S by a carrying amount 5·D (an example of a second carrying amount) and the dot forming operation based on the print data from the computer 1110, when printing an image at a lower edge (an upstream edge portion of a medium in the carrying direction).

In the comparative examples (refer to FIG. 17B), in the case where, if the carrying operation by the carrying amount of 13·D is performed after pass n (an example of a certain dot forming operation), nozzle #13 (an example of a most-upstream nozzle) that is positioned most upstream in the carrying direction of a plurality of the nozzles is positioned upstream of a lower edge's most-downstream position in the carrying direction, the carrying operation by the carrying amount of 5·D is performed.

However, it takes a long time to finish printing if the paper S is carried by the carrying amount of 5·D in the carrying operations after pass n.

On the other hand, in this embodiment (refer to FIG. 18A), even if a carrying operation for carrying the paper S by a carrying amount of 13·D (an example of a third carrying amount) is performed in pass n+1 after pass n, and lower edge printing is performed after that, a raster line to be formed upstream of the lower edge's most-downstream position in the carrying direction can be formed only by nozzle #9 to nozzle #13. Thus, in this case, the controller 1060 performs the carrying operation for carrying the paper S by the carrying amount of 13·D after pass n based on the print data in this embodiment. Due to this, the present embodiment can finish printing earlier as compared with the comparative examples.

(2) The aforementioned printing system further includes the optical sensor 1054 (an example of a sensor) for detecting the lower edge. After detecting the lower edge based on a detection result of the optical sensor 1054 (see FIG. 7C), the controller 1060 finishes printing in four passes including a pass in which the lower edge is detected (see FIG. 18B).

In this embodiment, the carrying operation by the small carrying amount is not repeated before the optical sensor 1054 detects the lower edge. Therefore, this embodiment can finish printing earlier as compared with the comparative example (see FIG. 17C).

(3) In the aforementioned model example (see FIGS. 18A to 18C), nozzle #8 is positioned away from the lower edge's most-downstream position by 28·D to 29·D in pass n. In other words, nozzle #8 is positioned away from the lower edge's most-downstream position by a distance larger than 28·D in pass n. Therefore, even if the paper S is carried by the normal carrying amount (13·D) in the carrying operation between pass n and pass n+1 (corresponding to the third carrying operation), nozzle #8 is positioned bidirectionally downstream of the lower edge's most-downstream position by a distance larger than 15·D that is the necessary carrying amount for a lower edge process (a total carrying amount from detection of the lower edge to finish of printing).

In this case, even if the paper S is carried by the 13·D after pass n, a raster line to be formed upstream of the lower edge's most-downstream position in the carrying direction can be formed only by nozzle #9 to nozzle #13. Therefore, in this embodiment, the controller 1060 performs the carrying operation for carrying the paper S by the carrying amount 13·D after pass n based on the print data in this case. Due to this, in this embodiment the printing can be finished earlier as compared with the comparative example.

(4) The aforementioned optical sensor 1054 is not a sensor that directly detects the lower edge of the paper S, but can merely detect the presence or absence of the paper S. However, the controller 1060 can detect that the lower edge of the paper S is positioned downstream of the optical sensor 1054 in the carrying direction, if an output of the sensor indicates a "no-paper" state during the dot forming operation (refer to FIG. 7C). Due to this, the lower edge of the paper S can be detected by a simple sensor.

(5) In the aforementioned printing system, a raster line downstream of the position of the optical sensor 1054 in the carrying direction at the time of detection of the lower edge (the same position as nozzle #13) is formed by performing dot forming operation three times. For example, in FIG. 18B, the lower edge is detected in pass n+1. A raster line downstream of the position of nozzle #13 in pass n+1 in the carrying direction is formed by nozzle #11 in pass n+2, nozzle #10 in pass n+3, and nozzle #9 in the pass (n+4).

Due to this, a printed image can be printed without forming a margin at the lower edge.

(6) In the aforementioned printing system, the optical sensor 1054 is provided at the same position in the carrying direction as nozzle #13. If the optical sensor 1054 is provided at the same position as nozzle #1, the lower edge has already passed through the printing region at the time of detection of the lower edge. Thus, the result of detection of the lower edge cannot be reflected on the dot forming operation. For this reason, it is better to provide the optical sensor 1054 as upstream as possible in the carrying direction. However, the position of the optical sensor 1054 is not limited to the aforementioned position. For example, the optical sensor 1054 may be provided upstream of nozzle #13 in the carrying direction. However, a size of the carriage 1031 in the carrying direction increases when the optical sensor 1054 is provided upstream of the most-upstream nozzle (see FIG. 6).

(7) In the aforementioned printing system, a raster line to be formed between the lower edge's most-upstream position and the lower edge's most-downstream position is formed only by nozzle #9 to nozzle #13 that are opposed to the groove 1244B without using the nozzle opposed to the projection 1242. The reason for this is for performing borderless printing without allowing ink to land on the projection 1242 in a state in which it is unclear where the lower edge is positioned between the lower edge's most-upstream position and the lower edge's most-downstream position because of the carrying error.

(8) In the aforementioned model example (refer to FIGS. 18A to 18C), the carrying amount after pass n is as same as the normal carrying amount, 13·D. Moreover, in the aforementioned specific example 1 (refer to FIG. 19), the carrying amount after pass 84 is the same as the normal carrying amount, 43·D.

As described above, when the paper S is carried by the normal carrying amount, printing can be performed in the same condition as normal printing. Thus, the image quality of the printed image can be made entirely uniform.

(9) In the specific example 2 (refer to FIG. 20) and the specific example 3 (refer to FIG. 21) that are described above, after the carrying operation by the carrying amount of 35·D after pass 84 and before performing the carrying operation by the carrying amount of 3·D (an example of a second carrying operation), a carrying operation (an example of a fourth carrying operation) by a carrying amount larger than 3·D (35·D in the specific example 2 and 27·D or 11·D in the specific example 3) is performed.

As described above, if it is possible to perform the carrying operation by the carrying amount that is larger than the carrying amount in the carrying operation for lower edge printing, it is preferable to perform the carrying operation by the larger carrying amount in order to finish the printing earlier.

(10) In the aforementioned specific example 2 (refer to FIG. 20), the carrying amount after pass 84, 35·D (corresponding to the third carrying amount) is equal to the carrying amount after pass 85, 35·D (corresponding to the fourth carrying amount). As described above, when the carrying amount is made the same between the two carrying operations, a region in which printing is performed under the same condition is increased. Therefore, the image quality of the printed image can be made uniform entirely.

(11) In the aforementioned specific example 3 (refer to FIG. 21), the carrying amount after pass 84 (corresponding to the third carrying amount) is larger than the carrying amount 27·D after pass 85 and the carrying amount 11·D after pass 86. As described above, by gradually reducing the carrying amount, a difference of image quality between a printed image printed by normal printing and a printed image printed by lower edge printing becomes unnoticeable, and the image quality of the entire print image is improved.

(12) When an interval of raster lines is assumed to be D (=1/720 inches), a nozzle interval can be represented by k·D, a carrying amount for normal printing by n1·D, and a carrying amount for lower edge printing by n2·D. Further, according to the aforementioned model example (refer to FIGS. 18A to 18C), k=4, n1=13, and n2=5. Further, according to the aforementioned specific examples 1 to 3, k=8, n1=43, and n2=3. In any of those cases, a remainder obtained by dividing n1 by k is equal to a remainder obtained by dividing n2 by k. Due to this, the image quality of the printed image can be improved.

(13) Further, the carrying amount after pass n in the model example (FIGS. 18A to 18C) can be represented by n3·D (n3=13). Moreover, the carrying amount after pass 84 in the aforementioned specific examples can be represented by n3·D (n3=43). In any of those cases, a remainder obtained by dividing n3 by k equals to the remainder obtained by dividing n1 by k. Due to this, the image quality of the print image can be improved.

(14) It goes without saying that it is not necessary to include all the components in the above description. However, it is preferable that the components are provided because corresponding effects can be achieved when each of the components are provided.

(15) The aforementioned printing method includes: a step for preparing the printer 1001; a step for performing normal printing (an example of a first printing process); and a step for performing lower edge printing (an example of a second printing process). Further, according to the printing method of the model example (refer to FIGS. 18A to 18C), a step of performing a carrying operation by a carrying amount larger than a carrying amount during lower edge printing (an example of a third carrying operation) after pass n is included. Due to this, printing can be finished earlier.

(16) The aforementioned printer driver transmits print data to the printer 1001, and the printer 1001 realizes printing in the aforementioned model example or printing in the specific examples 1 to 3, based on this print data. In other words, the aforementioned printer driver can control the printer 1001 so as to finish printing earlier.

Second Embodiment

<Configuration of Printing System>

Figure 22:
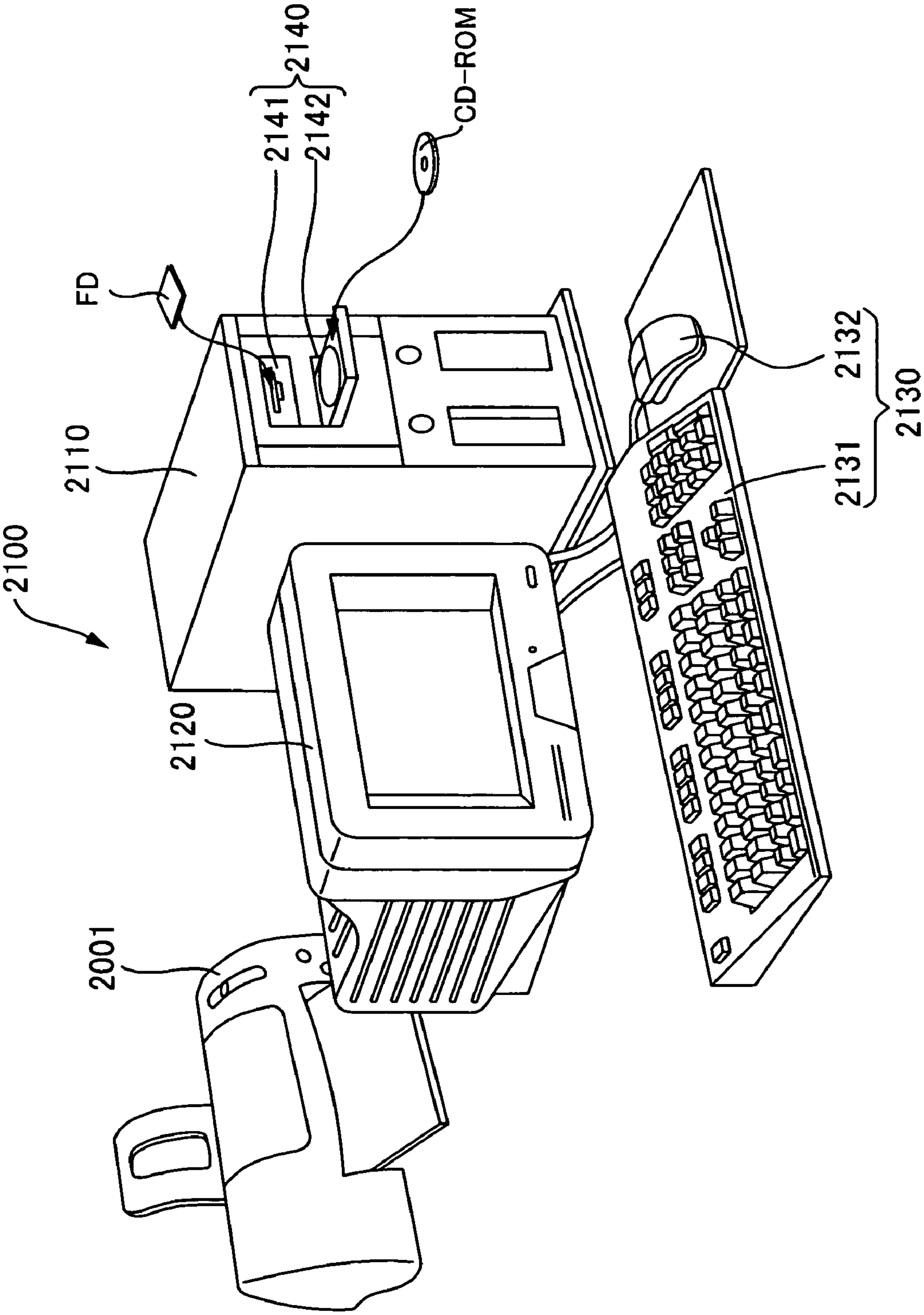
FIG. 22 describes an entire structure of a printing system of a second embodiment.

Next, a best mode for carrying out the present invention is described. Further, in the following description, a printing system including a printing apparatus and a print controlling device is described as an example. Here, FIG. 22 is an explanatory diagram of the configuration of a printing system 2100.

The printing system 2100 includes a printer 2001 as the printing apparatus and a computer 2110 as the print controlling device. More specifically, the printing system 2100 includes the computer 2110, a display device 2120, an input device 2130, and a recording and reproduction device 2140. The printer 2001 prints an image on a medium such as a paper, a cloth and a film. As for the medium, in the following description, a paper S (that can be called as a sheet of paper, see FIG. 24A) that is a typical medium is described as an example of the medium. The computer 2110 is communicably connected to the printer 2001. In order to make the printer 2001 print an image, the computer 2110 outputs print data in accordance with the image to the printer 2001. A computer program such as an application program and a printer driver is installed in the computer 2110. The display device 2120 has a display. The display device 2120 is used for displaying a user interface of the computer program, for example. The input device 2130 is a keyboard 2131 or a mouse 2132, for example. The record and play device 2140 is a flexible disk drive 2141 or a CD-ROM drive 2142, for example.

Computer

<Configuration of Computer>

Figure 23:
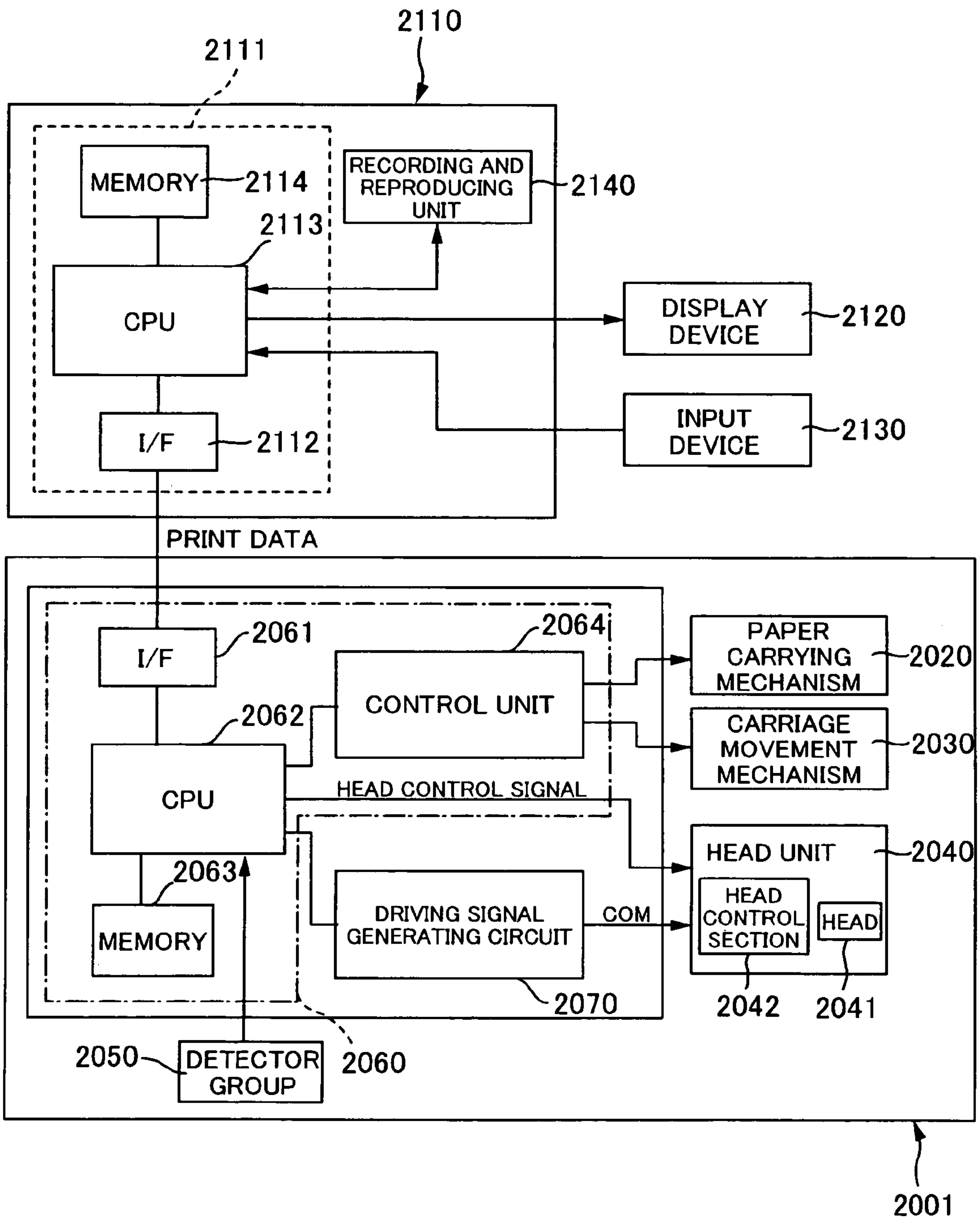
FIG. 23 is a block diagram describing a structure of a computer and a printer.

Next, a configuration of the computer 2110 is described. Here, FIG. 23 is a block diagram that describes the configuration of the computer 2110 and the printer 2001.

The computer 2110 includes the aforementioned record and play device 2140 and a host-side controller 2111. The record and play device 2140 is connected to the host-side controller 2111 to be communicatable therewith and is attached to a housing of the computer 2110, for example. The host-side controller 2111 performs various types of control in the computer 2110. The display device 2120 and the input device 2130 described above are also connected to the host-side controller 2111 so as to be communicatable therewith. The host-side controller 2111 includes an interface section 2112, a CPU 2113, and a memory 2114. The interface section 2112 intervenes between the computer 2110 and the printer 2001, and sends and receives data to or from the printer 2001. The CPU 2113 is an arithmetic processing unit for performing overall control of the computer 2110. The memory 2114 is used for securing an area storing a computer program used by the CPU 2113, a work area, and the like, and is formed by a RAM, an EEPROM, a ROM, or a magnetic disk device, for example. The computer program stored in the memory 2114 is an application program and a printer driver, as described above. The CPU 2113 performs various types of control in accordance with the computer program stored in the memory 2114.

The printer driver makes the computer 2110 realize a function of converting image data output from the application program into print data. The printer 2001 performs printing on paper S by receiving the print data from the computer 2110. In other words, it can be said that the computer 2110 controls an operation of the printer 2001 via the print data. Therefore, the computer 2110 functions as a print controlling device by the printer driver. Further, the printer driver includes a code for realizing a function of converting image data into print data.

Figure 28:
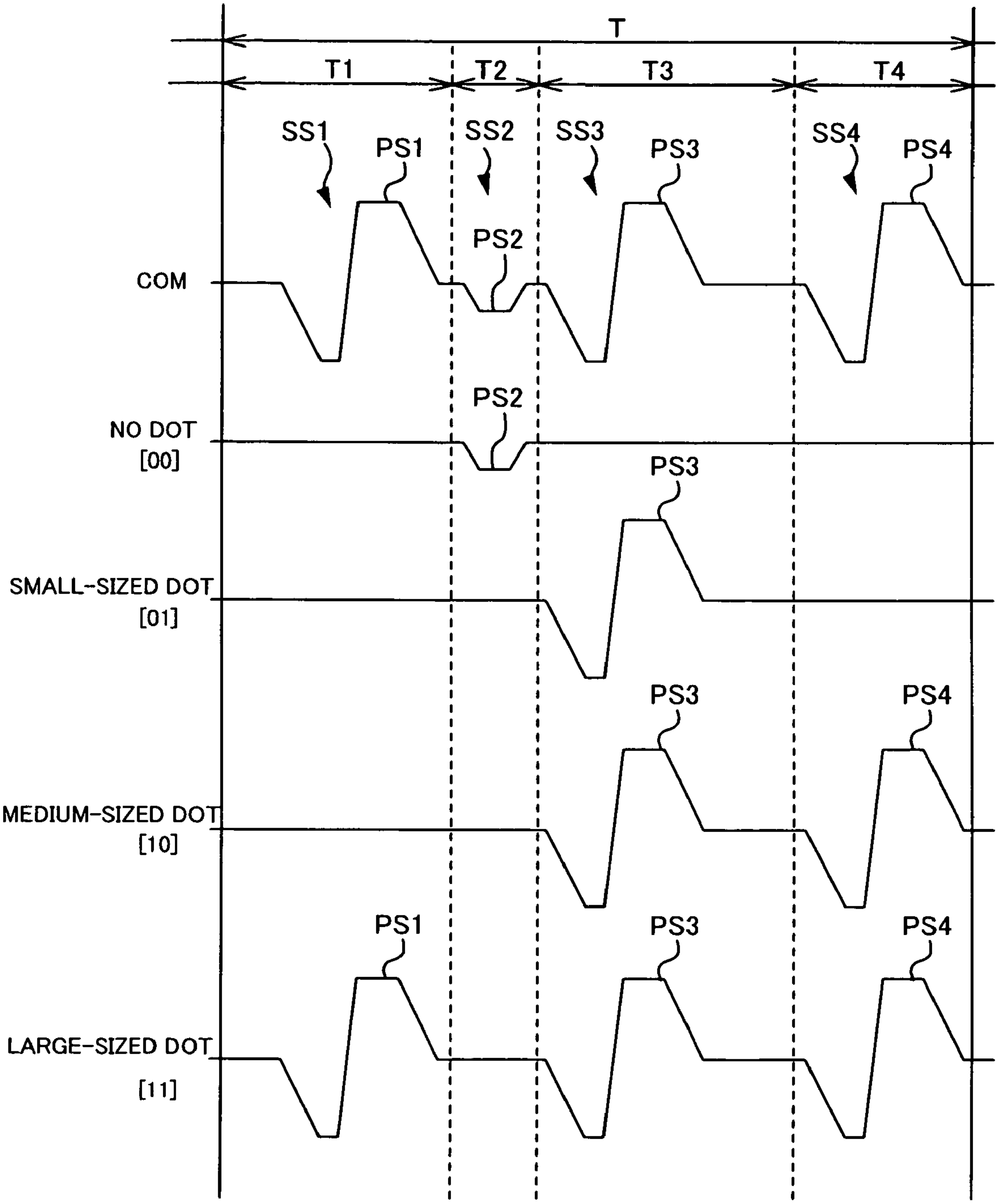
FIG. 28 is for describing a driving signal and an application control of the driving signal.

The print data is data in a form that can be interpreted by the printer 2110, and includes various types of command data and pixel data. The command data is data for instructing the printer 2001 to execute a specific operation. As the command data, for example, there are command data that instructs the printer to supply paper, command data indicating a carrying amount, and command data that instructs the printer to discharge paper. Further, the pixel data is data related to a pixel of an image to be printed. Here, the pixel means a square region virtually determined on a paper in which a dot is formed. The pixel data in the print data is data related to a dot formed on the paper (for example, data of a dot size). In this embodiment, the pixel data is 2-bit data. For example, as shown in FIG. 28, data [00] corresponding to a pixel in which no dot is formed, data [01] corresponding to a small-sized dot, data [10] corresponding to a medium-sized dot, and data [11] corresponding to a large-sized dot are used as the pixel data, for example. Thus, the printer 2001 can represent four gradations in one pixel. The printer driver performs a resolution conversion processing, a color conversion processing, a halftone processing, a rasterization processing, and the like in order to convert the image data output from the application program into the print data (described later).

Printer

<Configuration of Printer>

Figure 24A:
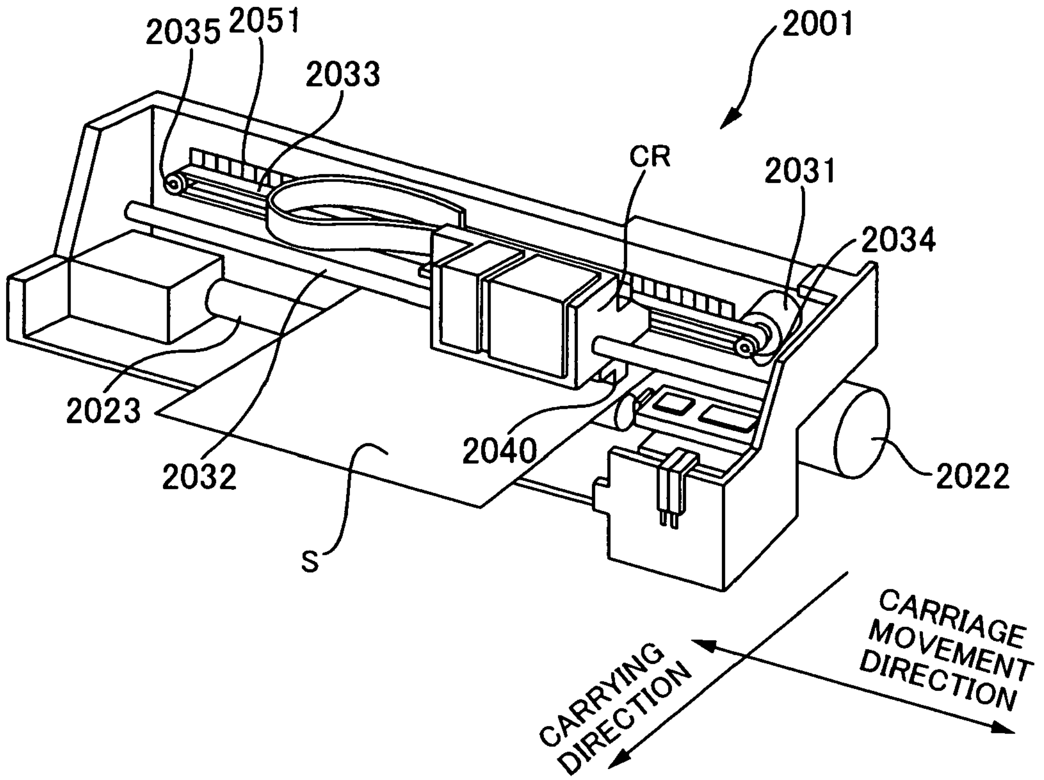
FIG. 24A is a perspective view explaining a structure of the printer of this embodiment.
Figure 24B:
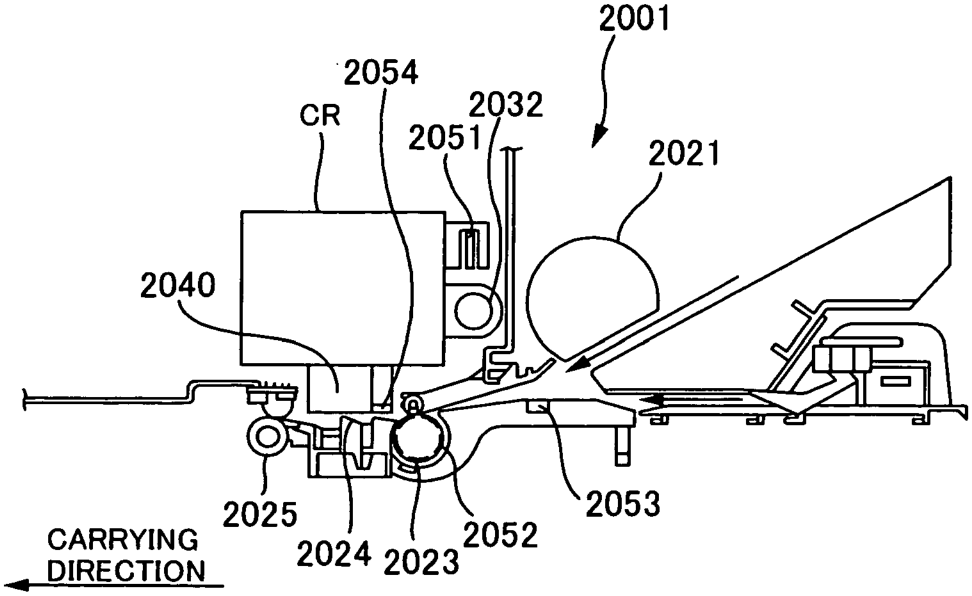
FIG. 24B is a side view explaining a structure of the printer of this embodiment.

Next, the configuration of the printer 2001 is described. Here, FIG. 24A is a perspective view describing the configuration of the printer 2001 of this embodiment. FIG. 24B is a side view describing the configuration of the printer 2001 of this embodiment. It should be noted that the following description refers also to FIG. 23.

As shown in FIG. 23, the printer 2001 includes a paper carrying mechanism 2020, a carriage movement mechanism 2030, a head unit 2040, a detector group 2050, a printer-side controller 2060, and a driving signal generating circuit 2070. In the printer 2001, the printer-side controller 2060 controls sections to be controlled, such as the paper carrying mechanism 2020, the carriage movement mechanism 2030, the head unit 2040, and the driving signal generating circuit 2070. Thus, the printer-side controller 2060 causes an image to be printed on paper S based on print data received from the computer 2110. Further, each of the detectors in the detector group 2050 monitors a status in the printer 2001. The detectors output the result of this detection to the printer-side controller 2060. When receiving the detection result from each detector, the printer-side controller 2060 controls the various sections to be controlled based on that detection result.

<Paper Carrying Mechanism>

The paper carrying mechanism 2020 corresponds to a carrying mechanism for carrying a medium. The paper carrying mechanism 2020 carries a paper (a sheet of paper) S in a carrying direction by a predetermined carrying amount. The carrying direction is a direction that intersects a carriage movement direction, as described below. As shown in FIGS. 24A and 24B, the paper carrying mechanism 2020 includes a paper supplying roller 2021, a carry motor 2022, a carry roller 2023, a platen 2024, and a paper-discharge roller 2025. The paper supplying roller 2021 is a roller for feeding the paper S that has been inserted into a paper insertion opening toward a print-start position, and in this example has a cross-sectional shape that resembles the letter D. The carry motor 2022 serves as a driving source when the paper S is carried in the carrying direction. The carry motor 2022 in this embodiment is formed by a direct-current motor (DC motor). The carry roller 2023 is a roller for carrying the paper S fed by the paper supplying roller 2021 in the carrying direction. An operation of the carry roller 2023 is controlled by the printer-side controller 2060. The paper-discharge roller 2025 is a roller for carrying the paper S on which printing is finished.

Figure 25A:
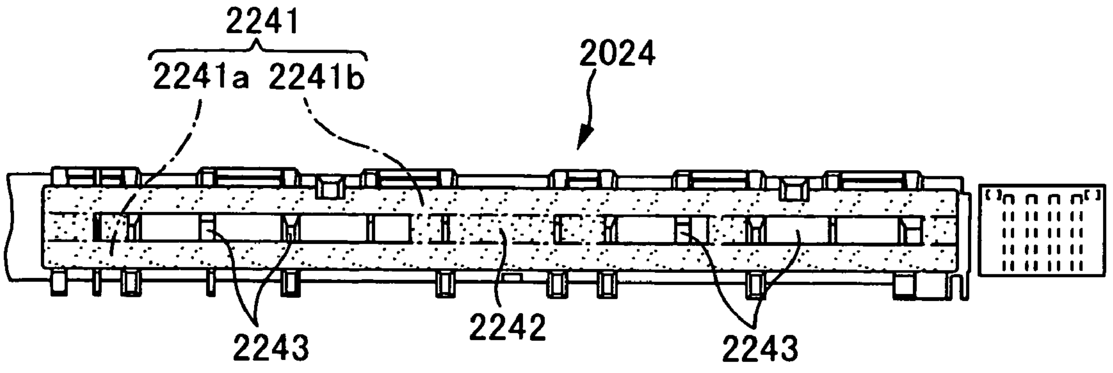
FIG. 25A is a plan view of a platen.
Figure 25B:
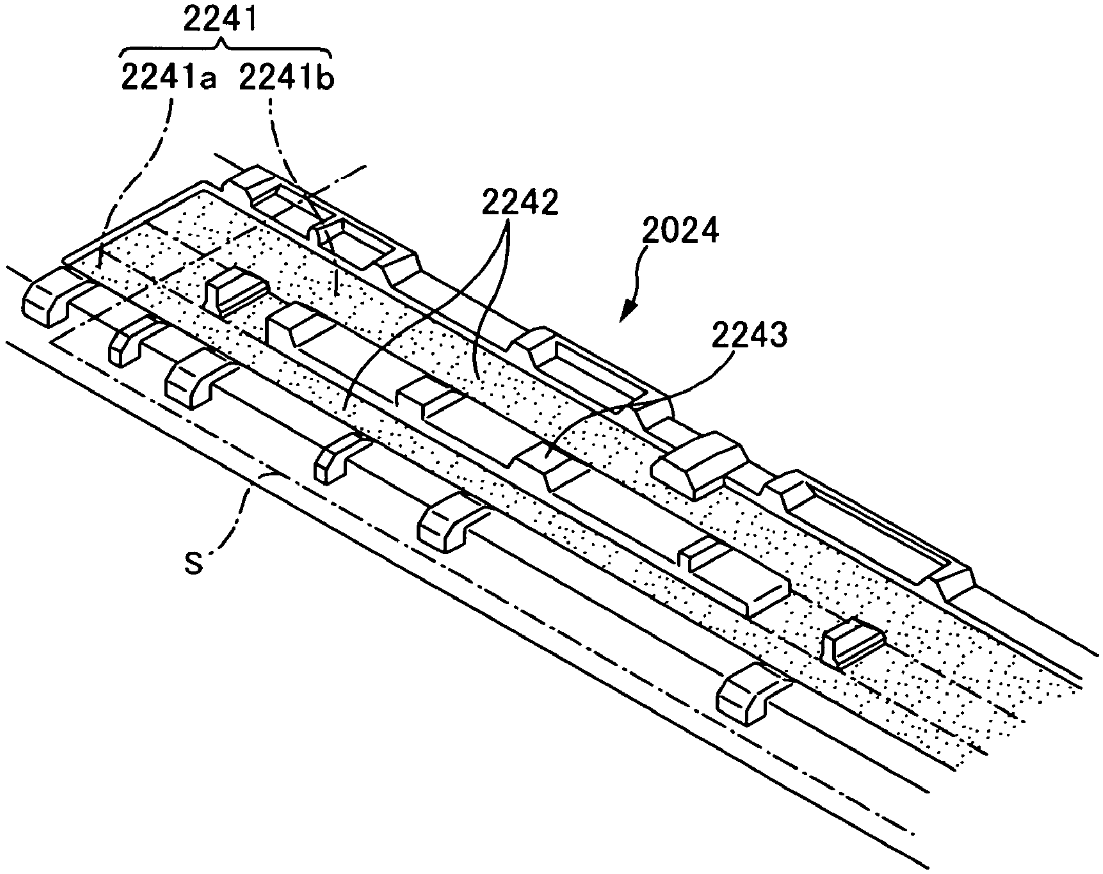
FIG. 25B is an enlarged perspective view of a part of the platen.

The platen 2024 is a member for supporting paper S from its reverse side, while printing is performed on that paper S. Here, FIG. 25A is a plan view of the platen 2024. FIG. 25B is an enlarged perspective view of a part of the platen 2024. In the platen 2024, an ink receiving groove 2241 is provided for receiving the ink that does not land on the paper S. The ink receiving groove 2241 is a groove-like portion that is opened at a surface opposed to the head, and is provided at a position opposed to a nozzle included in the head. Note that, a positional relationship between the ink receiving groove 2241 and the nozzle is described later. The ink receiving groove 2241 is provided with an ink absorbing member 2242 for absorbing ink. The ink absorbing member 2242 is formed by a member that can absorb liquid, such as a sponge. The platen 2024 is provided with a plurality of projections 243 in order to prevent the ink absorbing member 2242 from coming into direct contact with the paper S. The projections 243 projects upward (toward the head) from a surface of the ink absorbing member 2242 and is in contact with the reverse side of the paper S at its top end surface.

<Carriage Movement Mechanism>

The carriage movement mechanism 2030 is for moving a carriage CR to which the head unit 2040 is attached in the carriage movement direction. The carriage movement direction includes the direction of movement from one side to the other side and the direction of movement from that other side to the one side. In addition, the head unit 2040 has a head 2041 that has nozzle rows (Nk to Ny) formed by a plurality of nozzles Nz (refer to FIGS. 26 and 27). Thus, the carriage movement direction corresponds to a movement direction (a predetermined direction) of the nozzle rows in which the nozzle rows move. Therefore, the carriage movement mechanism 2030 corresponds to a nozzle row movement mechanism for moving the nozzle rows in the predetermined direction.

The carriage movement mechanism 2030 includes a carriage motor 2031, a guide shaft 2032, a timing belt 2033, a driving pulley 2034, and a driven pulley 2035. The carriage motor 2031 corresponds to a driving source for moving the carriage CR. An operation of the carriage motor 2031 is controlled by the printer-side controller 2060. The driving pulley 2034 is attached to a rotation shaft of the carriage motor 2031. The driving pulley 2034 is arranged at one end in the carriage movement direction. The driven pulley 2035 is arranged at the other end side in the carriage movement direction, which is opposite to the driving pulley 2034. The timing belt 2033 is connected to the carriage CR and is extended between the driving pulley 2034 and the driven pulley 2035. The guide shaft 2032 supports the carriage CR in a movable manner. The guide shaft 2032 is attached to extend along the carriage movement direction. Thus, when the carriage motor 2031 operates, the carriage CR moves in the carriage movement direction along the guide shaft 2032.

<Head Unit>

The head unit 2040 is used for making ink be ejected toward paper S. The head unit 2040 is attached to the carriage CR. The head 2041 included in the head unit 2040 is attached at a position opposed to the platen 2024. A head control section 2042 included in the head unit 2040 is provided inside a case.

Figure 26:
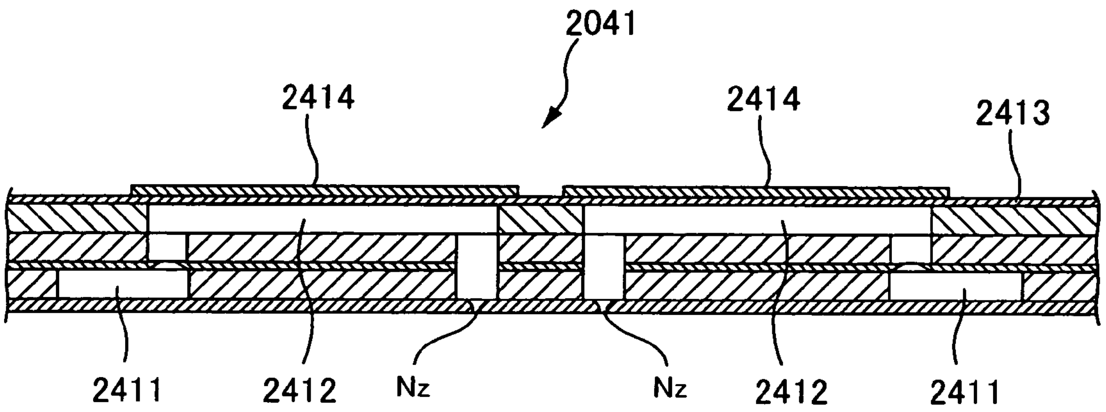
FIG. 26 is a cross-sectional view for describing a structure of a head.
Figure 27:
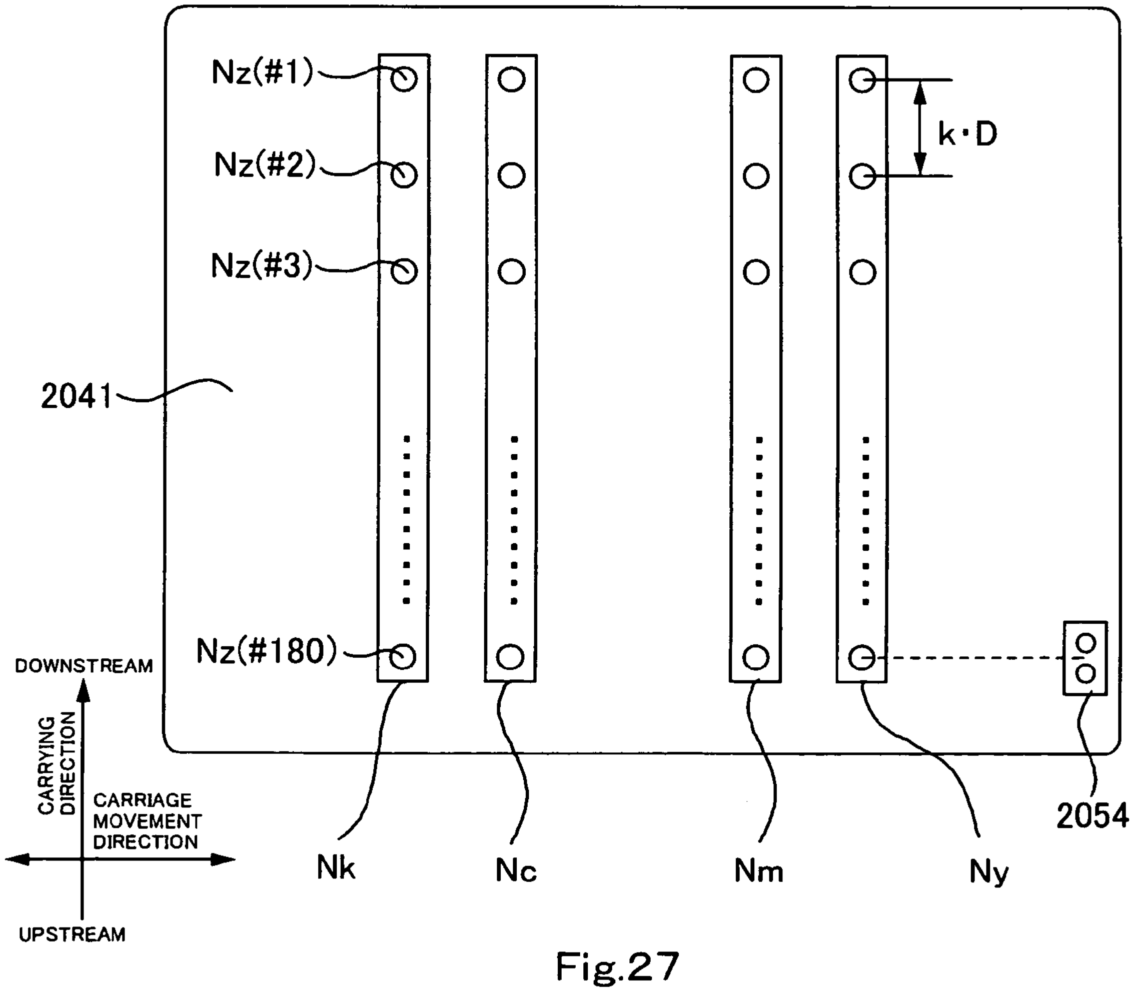
FIG. 27 is a diagram for describing nozzle arrangements in the head.

Next, the structure of the head 2041 is described. Here, FIG. 26 is a cross-sectional diagram for explaining the structure of the head 2041. FIG. 27 is a diagram for explaining an arrangement of nozzles Nz included in the head 2041. The exemplified head 2041 includes a series of ink passages from an ink storage room 2411 to the nozzle Nz via a pressure chamber 2412. The ink passages are provided with the number of ink passages corresponding to the number of nozzles Nz. A piezo element 2414 is provided on a diaphragm 2413 that sections a part of the pressure chamber 2412. The piezo element 2414 is arranged on a surface of the diaphragm 2413 opposite to the pressure chamber 2412 and deforms the diaphragm 2413 in accordance with a potential difference. Since the ink passage is filled with ink, the nozzle Nz corresponding to that ink passage can eject ink because of the deformation of the diaphragm 2413. The piezo element 2414 corresponds to an element that can perform an operation for making the ink be ejected.

In the head 2041, the nozzles Nz are arranged at a predetermined pitch in the carrying direction of paper S, thus forming the nozzle arrangement. The formation pitch of the nozzles Nz is represented by k·D where D is a smallest dot pitch in the carrying direction, in other words, an interval between dots formed on the paper S when the resolution is highest. Moreover, k is a coefficient indicating a relationship between the smallest dot pitch D and the nozzle pitch, and is determined to be an integer of 1 or more. For example, in the case where the nozzle pitch is 180 dpi (1/180 inches) and the dot pitch in the carrying direction is 720 dpi (1/720 inches), the coefficient k is 4. In the shown example, the nozzles Nz in each nozzle row are assigned numbers in such a manner that a nozzle number becomes smaller downstream (#1 to #180). That is, the nozzle Nz (#1) is positioned downstream of the nozzle Nz (#180) in the carrying direction, in other words, on a side close to a leading edge of paper S. A plurality of nozzle rows are provided at different positions in the carriage movement direction (nozzle row movement direction). Moreover, in the head 2041, a type of ejected ink can be determined for each nozzle arrangement. This head 2041 includes a first nozzle row Nk that ejects a black ink, a second nozzle row Nc that ejects a cyan ink, a third nozzle row Nm that ejects a magenta ink, and a fourth nozzle row Ny that ejects a yellow ink, in that order from the left in FIG. 27.

The aforementioned ink receiving groove 2241 is provided in an entire range in which the carriage CR can move on a downstream side and an upstream side in the carrying direction. In the ink receiving groove 2241, a portion positioned on a downstream side in the carrying direction faces the nozzle Nz (#1) to the nozzle Nz (#35), and a portion positioned on an upstream side in the carrying direction faces the nozzle Nz (#145) to the nozzle Nz (#180). Thus, the ink ejected from the nozzle Nz (#1) to the nozzle Nz (#35), and from the nozzle Nz (#145) to the nozzle Nz (#180) lands on the ink absorbing member 2242 and is absorbed, when it does not land on paper S. As a result, a trouble that the inside of the printer 2001 becomes dirty can be prevented.

In the following description, for the sake of convenience, the downstream portion of the ink receiving groove 2241 in the carrying direction may be called as a downstream ink receiving groove 2241*a* and the upstream portion in the carrying direction may be called as an upstream ink receiving groove 2241*b*. The upstream ink receiving groove 2241*b* corresponds to an ink receiving section for receiving the ink that does not land on the paper S when printing is performed at a trailing edge portion of the paper S. The ink receiving groove 2241 is also provided at a position corresponding to a side edge of paper S having a standardized size. For example, the ink receiving groove 2241 is provided along the carrying direction at each of the positions corresponding to a side edge of A4 paper S, B5 paper S, and paper S of a postcard size. Moreover, the nozzle Nz (#1) to the nozzle Nz (#35) that face the downstream ink receiving groove 2241*a* form a nozzle group that is used when printing at a leading edge portion (that may be called as an upper edge portion) of the paper S when borderless printing is performed. Hereinafter, those nozzles Nz may be generally called as a nozzle group for a leading edge process. Similarly, the nozzle Nz (#145) to the nozzle Nz (#180) facing the upstream ink receiving groove 2241*b* are a nozzle group used when printing a trailing edge portion (also referred to as a lower edge portion) of the paper S when borderless printing is performed. Hereinafter, those nozzles Nz may be generally called as a nozzle group for a trailing edge position process.

<Detector Group>

The detector group 2050 is for monitoring a state of the printer 2001. As shown in FIGS. 24A and 24B, the detector group 2050 includes a linear encoder 2051, a rotary encoder 2052, a paper detector 2053, and a paper-width detector 2054. The linear encoder 2051 is for detecting a position of the carriage CR in the carriage movement direction. The rotary encoder 2052 is for detecting a rotation amount of the carry roller 2023. The paper detector 2053 is for detecting paper S to be printed. The paper-width detector 2054 is for detecting a width of the paper S to be print.

In this embodiment, the paper detector 2053 is formed by an optical sensor having a light-emitting element and a light-receiving element. In the paper detector 2053, the amount of light received by the light-receiving element is varied based on whether paper S is present or absent. For example, in the case where the paper S is present, the light-receiving element receives light reflected from the paper S. When the paper S is not present, the light-receiving element does not receive reflected light. In other words, a detection signal from the paper detector 2053 has a level that changes at timings at which the leading edge or the trailing edge of paper S pass through the paper detector 2053. Therefore, the paper detector 2053 corresponds to a sensor for detecting the leading edge and the trailing edge of the paper S. The printer-side controller 2060 can know the timings at which the leading edge or the trailing edge of the paper S pass by monitoring the level of the detection signal from the paper detector 2053. The paper detector 2053 may be arranged in such a manner that, when the paper S is present, light is blocked by the paper S and no light is received by the light-receiving element. The paper detector 2053 is arranged upstream of the head 2041 (nozzle row). Thus, the printer-side controller 2060 can recognize the positions of the leading edge and the trailing edge of the paper S before printing.

<Printer-Side Controller>

As described above, the printer-side controller 2060 performs control of the printer 2001. For example, the printer-side controller 2060 controls carrying of the paper S by controlling the rotation amount of a carry motor 2022. Moreover, the printer-side controller 2060 controls movement of the carriage CR by controlling rotation of the carriage motor 2031. In other words, the printer-side controller 2060 makes an operation for carrying the paper S by a predetermined carrying amount and an operation for intermittently ejecting ink while moving the carriage CR (the head 2041) be alternately performed, and thus prints an image on the paper S. As shown in FIG. 23, the printer-side controller 2060 has an interface section 2061, a CPU 2062, a memory 2063, and a control unit 2064. The interface section 2061 sends and receives data to and from the computer 2110 that is an external apparatus. The CPU 2062 is an arithmetic processing unit for generally controlling the printer 2001. The memory 2063 is used for securing an area in which a program for the CPU 2062 is stored, a work area, and the like, and is formed by a storage element such as a RAM, an EEPROM, or a ROM. The CPU 2062 controls various units to be controlled according to the computer program stored in the memory 2063. For example, the CPU 2062 controls the paper carrying mechanism 2020 and the carriage movement mechanism 2030 via the control unit 2064. In other words, the CPU 2062 outputs control signals to the carry motor 2022 and the carriage motor 2031. Further, the CPU 2062 outputs a head control signals for controlling an operation of the head 2041 to the head controller 2042, and outputs waveform information for making a driving signals COM be generated to the driving signal generation circuit 2070.

<Driving Signal Generation Circuit>

The driving signal generation circuit 2070 generates the driving signal COM that is applied to the piezo elements 2414, based on the waveform information output from the printer-side controller 2060. Here, FIG. 28 is a diagram for explaining the driving signal COM and application control of the driving signal COM. The exemplified driving signal COM contains four waveform portions in one repeating period. Each waveform portion includes one drive pulse. In other words, a first waveform portion SS1 contains a first drive pulse PS1, and a second waveform portion SS2 contains a second drive pulse PS2. Further, a third waveform portion SS3 contains a third drive pulse PS3, and a fourth waveform portion SS4 contains a fourth drive pulse PS4. The first drive pulse PS1, the third drive pulse PS3, and the fourth drive pulse PS4 are the same in shape. When one drive pulse of those drive pulses is applied to a piezo element 2414, a nozzle Nz corresponding to that piezo element 2414 ejects a predetermined amount (for example, 7 pl) of ink. Further, when two drive pulses are applied to the piezo elements 2414, twice the above amount of ink is ejected. That is, the amount of ink ejected increases as the number of driving pulses that are applied increases. On the other hand, the second drive pulse PS2 is a drive pulse used for a case where no ink is ejected. When the second drive pulse PS2 is applied to the piezo elements 2414, meniscus (free surface of ink exposed in the nozzle Nz) vibrates to such a degree that no ink is ejected. This vibration agitates ink near the nozzle, thus preventing the ink from becoming thicker.

The head control section 2042 determines the waveform portion to be applied to the piezo element 2414, based on pixel data sent as print data. Describing the above simply, in the case where the pixel data is data [00] corresponding to a pixel in which no dot is formed, the head control section 2042 only applies the second waveform portion SS2 to the piezo element 2414. Further, in the case where the pixel data is data [01] indicating formation of a small-sized dot, the head control section 2042 only applies the third waveform portion SS3 to the piezo elements 2414. Similarly, the head control section 2042 applies the third waveform portion SS3 and the fourth waveform portion SS4 to the piezo elements 2414 in the case where the pixel data is data [10] indicating formation of a medium-sized dot, and applies the first waveform portion SS1, the third waveform portion SS3, and the fourth waveform portion SS4 to the piezo element 2414 in the case where the pixel data is data [11] indicating formation of a large-sized dot. By performing the above control, the printer 2001 realizes four gradations in one pixel.

Printing Operation

<Computer-Side Operation>

Figure 29:
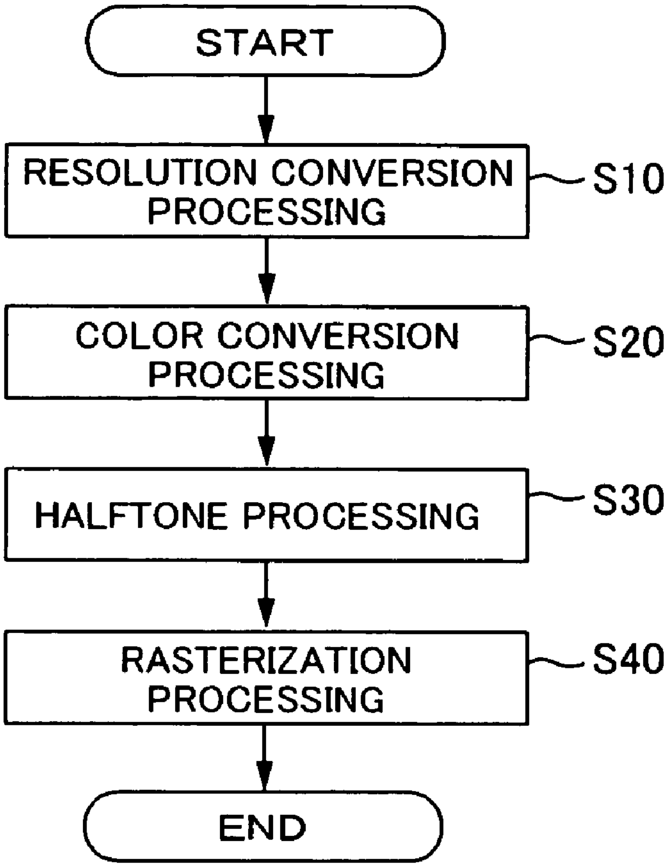
FIG. 29 is a flowchart for explaining a computer-side operation during a period of performing printing operation.

First, an operation on the computer 2110 side is described. FIG. 29 is a flowchart explaining the operation on the computer 2110 side during a period in which a printing operation is in progress. The operation on the computer 2110 side is performed by the host-side controller 2111 based on the printer driver. Thus, the printer driver includes a code for performing each operation.

In this operation, the host-side controller 2111 sequentially performs a resolution conversion processing (Step S10), a color conversion processing (Step S20), a halftone processing (Step S30), and a rasterization processing (Step S40). In addition, these processings are performed in a state that a user connects the printer 2001 to the computer 2110 to be communicatable therewith and realizes the printing system 2100 described in FIG. 22. More specifically, those processes are performed in a state where necessary information such as print image quality and a paper size has been input, and on condition that an operation for performing printing is performed from a user interface screen in the printer driver. The respective processes are described below.

Resolution conversion processing (S10): The resolution conversion is a process that converts image data (text data, image data, or the like) output from an application program into resolution (that is a dot interval when printing is performed, and may be called as printing resolution) when an image is printed on paper S. For example, in the case where the printing resolution is specified to be 720×720 dpi, the host-side controller 2111 converts the image data received from the application program into image data having a resolution of 720×720 dpi. As a method for performing the above conversion, interpolating or skipping of image data are known. It should be noted that, each pixel data in the image data has a multi-level (256-level, for example) gradation value represented using an RGB color space. Hereinafter, the pixel data having the RGB gradation value is called as RGB pixel data and image data formed by these RGB pixel data is called as RGB image data.

Color conversion processing (S20): The color conversion processing is a processing that converts RGB pixel data for each pixel in the aforementioned RGB image data into data having a multilevel (256-level, for example) gradation value represented in the CMYK color space. CMYK are ink colors in the printer 2001. Namely, C means cyan, M means magenta, Y means yellow, and K means black, respectively. Hereinafter, the pixel data having the CMYK gradation value is called as CMYK pixel data, and image data formed by these CMYK pixel data is called as CMYK image data. The color conversion processing is achieved by referring to a table in which RGB gradation value corresponds to a CMYK gradation value.

Halftone processing (S30): The halftone processing is a processing that converts the CMYK pixel data having a multilevel gradation value into CMYK pixel data having a gradation value having few levels that can be realized by the printer 2001. For example, the halftone processing converts CMYK pixel data representing a 256-level gradation value into 2-bit CMYK pixel data representing a 4-level gradation value. As described before, the 2-bit CMYK pixel data is data [00] corresponding to a pixel in which no dot is formed, data [01] corresponding to a small-sized dot, data [10] corresponding to a medium-sized dot, and data [11] corresponding to a large-sized dot. Such halftone processing uses a dither method, for example, and creates 2-bit CMYK pixel data that allows the printer 2001 to form dots in a distributed manner. Further, the method used in the halftone processing is not limited to the dither method, but may be a y correction, an error diffusion method, and the like.

Rasterization processing (S40): The rasterization processing is a processing that changes a data order of CMYK image data processed in the halftone processing into an order of data transfer to the printer 2001. Data processed in the rasterization processing is output to the printer 2001 as the aforementioned print data. Every time a defined amount of print data is obtained, the host-side controller 2111 outputs the obtained print data to the printer 2001. In this embodiment, every time print data for one pass is obtained, the host-side controller 2111 outputs the print data. Note that, a pass means an operation for moving the carriage CR in the carriage movement direction once.

<Printer-Side Operation>

Figure 30:
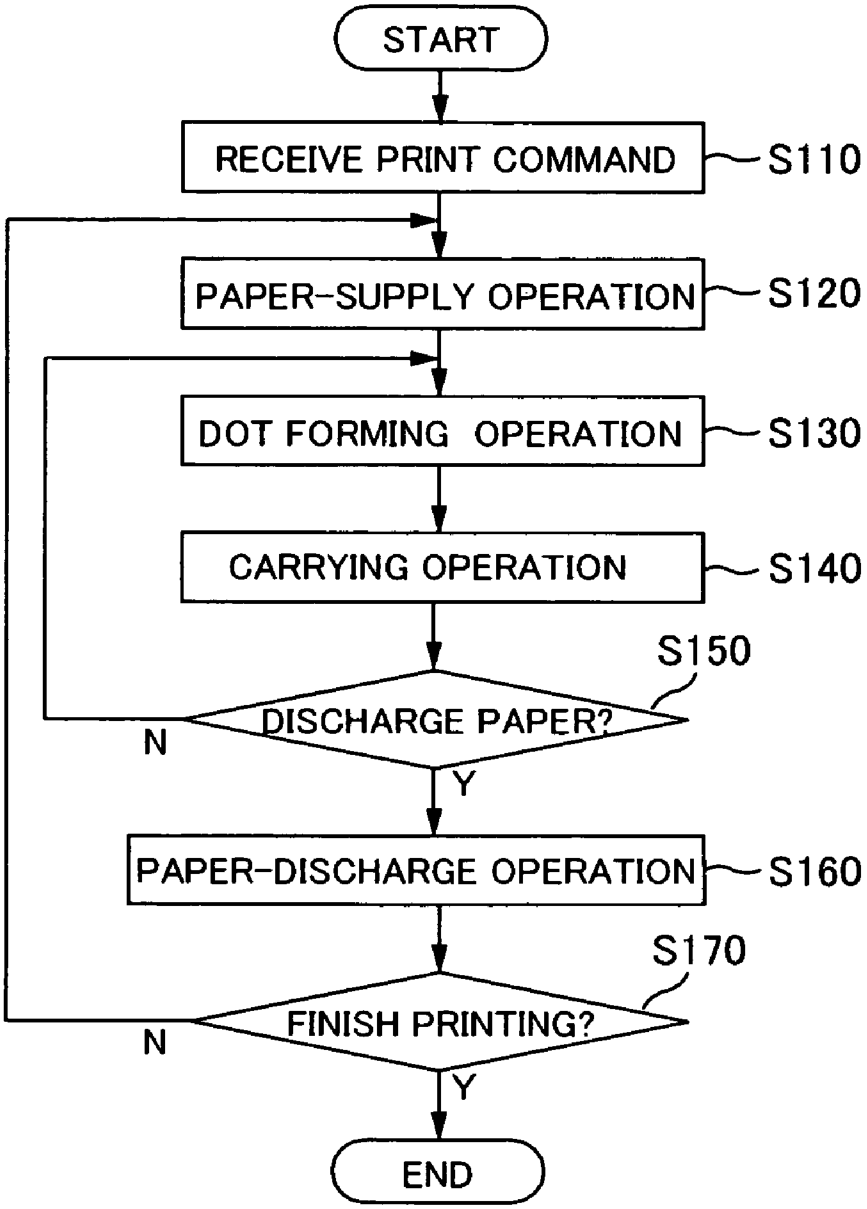
FIG. 30 is a flowchart for explaining an operation of the printer at printing.

Next, an operation on the printer 2001 side is described. Here, FIG. 30 is a flowchart explaining an operation of the printer 2001 during printing. Each operation described below is performed by the printer-side controller 2060 controlling the respective units to be controlled in accordance with a computer program stored in the memory 2063. These computer program includes a code for making each operation be executed.

Receive print command (S110): The printer-side controller 2060 receives a print command from the computer 2110 via the interface section 2061. The print command is included in a header of the print data transmitted from the computer 2110. Then, the controller analyzes the contents of the various types of commands included in the received print data, and executes a paper supplying operation, a carrying operation, a dot forming operation, and so forth that are described below.

Paper supplying operation (S120): When receiving the print command, the printer-side controller 2060 performs the paper supplying operation. The paper supplying operation is a process for moving paper S to be printed and positioning the paper S at a print start position (so-called as indexing position). More specifically, the printer-side controller 2060 rotates the paper supplying roller 2021, and feeds the paper S to be printed up to the carry roller 2023. Subsequently, the printer-side controller 2060 rotates the carry roller 2023 so as to position the paper S fed from the paper supplying roller 2021 at the print start position. Note that, when the paper S is positioned at the print start position, at least a part of the nozzles Nz of the head 2041 is opposed to the paper S.

Dot forming operation (S130): Next, the printer-side controller 2060 performs the dot forming operation. The dot forming operation is an operation for making the nozzle Nz that moves along a predetermined direction (more specifically, the carriage movement direction) eject ink intermittently so as to form dots on the paper S. The printer-side controller 2060 drives the carriage motor 2031, and thus makes the carriage CR move in the carriage movement direction. Further, the printer-side controller 2060 makes the nozzle Nz eject ink based on print data while the carriage CR is moved. Further, a dot is formed on the paper when ink ejected from the nozzle Nz lands on the paper. In other words, the dot forming operation forms a raster line formed by a plurality of dots arranged along the movement direction of nozzle Nz on the paper.

Carrying operation (S140): Next, the printer-side controller 2060 performs the carrying operation. The carrying operation is a process for moving paper S in the carrying direction by a predetermined carrying amount. The printer-side controller 2060 drives the carry motor 2022 and makes the carry roller 2023 rotate, thus carrying the paper S in the carrying direction. Due to this carrying operation, the head 2041 can form a dot at a position different from the position (position in the carrying direction) of dot formed in the preceding dot forming operation. Note that the predetermined carrying amount for a leading edge and a trailing edge portion of the paper S is different from that for an intermediate portion. That is, the carrying amount for the leading edge and the trailing edge portion of the paper S is smaller than that for the intermediate portion. Moreover, the printer-side controller 2060 monitors whether or not the trailing edge of the paper S passes through the paper detector 2053 based on the detection signal from the paper detector 2053 in this carrying operation. Note that, the predetermined carrying amount and the detection of the trailing edge of the paper S are described later.

Determination of paper discharge (S150): Next, the printer-side controller 2060 determines whether or not to discharge the paper S being printed. The paper is not discharged if there remains data to print on the paper S being printed at the time of this determination. The printer-side controller 2060 repeats in alternation the dot forming operation and the carrying operation until there is no more data to be printed, or until the position of the trailing edge of the paper S goes over the nozzle group for trailing edge process. As a result, an image formed by a plurality of dots (raster lines) is gradually printed on the paper.

Paper-discharge operation (S160): When there is no data to be printed on the paper S being printed, the printer-side controller 2060 performs a paper-discharge operation and discharges the printed paper S. In other words, the printer-side controller 2060 rotates the paper discharge roller 2025, thus discharging the paper S that has been printed. It should be noted that the determination of whether or not to perform the paper discharge can be determined based on a paper discharge command included in the print data.

Determination of finish of printing (S170): Next, the printer-side controller 2060 determines whether or not to continue printing. If the next paper S is to be printed, the paper-supply operation for the next paper S is performed. If the next paper S is not to be printed, then the printing operation is finished.

Printing Method

Figure 31:
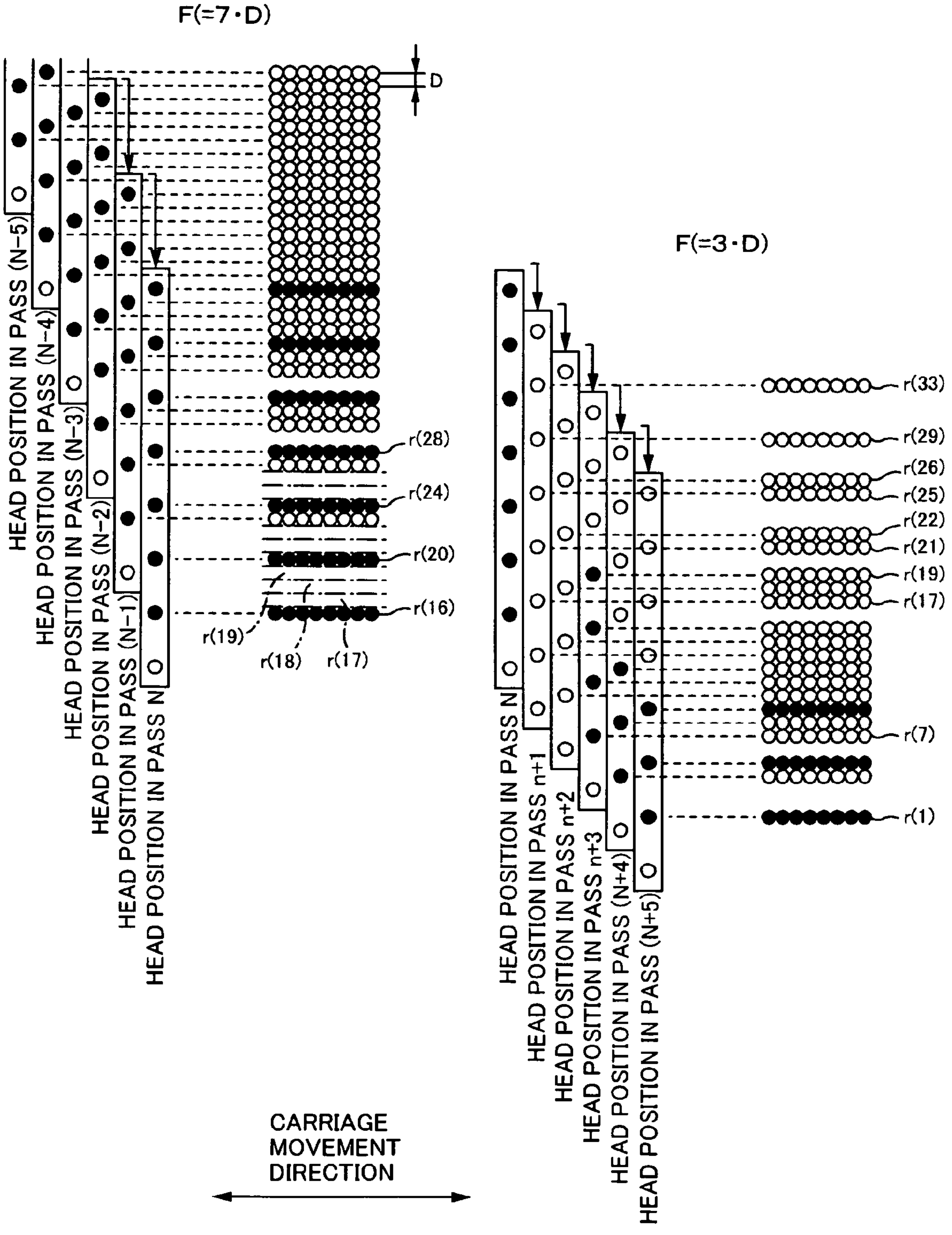
FIG. 31 is an explanatory diagram of an interlace method.

The printer 2001 of this embodiment that has the aforementioned structure performs printing by an interlace method. The use of the interlace method can distribute variations between nozzles Nz such as ink-ejection characteristics on a printed image so as to make the variations unnoticeable. Here, FIG. 31 is a diagram explaining the interlace method and shows an example in which a carrying amount of paper S is reduced from a certain pass. Although, for convenience of explanation, a nozzle row that is shown instead of the head 2041 moves with respect to the paper S, actually the paper S is moved in the carrying direction. In other words, FIG. 31 merely shows a relative positional relationship between the nozzle row and the paper S. Moreover, the respective raster lines are numbered for convenience of description. More specifically, a raster line formed at a closest position to the trailing edge of the paper S in pass n+5 is shown as r(1). In addition, in the figure, a nozzle Nz shown with a black circle is a nozzle Nz that actually ejects ink, and a nozzle Nz shown with an empty circle is a nozzle Nz that does not eject ink.

In the exemplified interlace method, every time the paper S is carried by a constant carrying amount in the carrying direction, each nozzle Nz forms a raster line directly above a raster line formed in an immediately preceding pass. In order to form each raster line by the constant carrying amount, it is necessary that the number Nn (an integer) of nozzles that actually eject ink and the coefficient k are coprime, and the carrying amount F is set to Nn·D.

In the example of FIG. 31, the nozzle row has eight nozzles Nz aligned in the carrying direction. However, seven nozzles Nz are used for printing by the interlace method in order to form each raster line by the constant carrying amount F. Moreover, since seven nozzles Nz are used, the paper S is carried by a carrying amount of 7·D. As a result, dots are formed on the paper S at a dot interval of 720 dpi (=D) by using the nozzle row with a nozzle pitch of 180 dpi (4·D), for example, and printing using seven nozzles Nz is performed until pass n. In pass n+1 and the following passes, printing is performed by a carrying amount of 3·D. Switching of the carrying amount in that manner is performed in the case where printing in the intermediate portion of the paper S makes the transition to printing at the trailing edge portion, for example. This is because printing at the trailing edge uses a nozzle Nz that faces the upstream ink receiving groove 2241*b*, in order to prevent ink landing on the platen 2024. In this case, the carrying amount for printing at the trailing edge is determined in accordance with the number of the nozzles Nz facing the ink receiving section. This is because the nozzle Nz facing the ink receiving section is effectively used so as to efficiently perform printing. As a result, the carrying amount for processing the trailing edge can be optimized.

In the case where the carrying amount is 3·D, if three nozzles Nz are used, it is usually possible to fill each raster line by the carrying amount kept constant. However, the number of the nozzles Nz to be used is gradually reduced in this example, in order to form a raster line that is not formed by printing using seven nozzles Nz in a complementary manner. In pass n, a raster line is formed every four lines, for example, the raster lines r(16), r(20), and r(24). As described above, the interlace method forms a raster line directly above a raster line that is formed in the immediately preceding pass. Thus, in pass n, the raster lines r(16) to r(19), r(21), r(22), r(25), r(26), r(29), and r(33) are left unformed. In order to form those raster lines, printing using six nozzles Nz is performed in pass n+1, printing using five nozzles Nz is performed in pass n+2, and printing using four nozzles Nz is performed in pass n+3. In pass n+4 and the following passes, printing using three nozzles Nz is performed.

As described above, it is found that, in the case where the printing operation by the carrying amount of 7·D is switched to the printing operation by the carrying amount of 3·D, the printing operation by the carrying amount of 3·D needs to be performed for a plurality of passes. For example, in order to form all raster lines positioned on a leading edge side of paper S than the raster line r(16), the printing operation is needed to be performed until pass n+3. Similarly, in order to form all raster lines positioned on a leading edge side of paper S than the raster line r(7), the printing operation needs to be performed until pass n+5.

<Summary of Printing Operation>

The printer 2001 performs printing at both ends of paper in the carrying direction by the carrying amount smaller than that for printing in an intermediate portion. In the case the carrying amount is switched at a trailing edge portion of the paper S, a timing at which the carrying amount suitable for printing in the intermediate portion (that corresponds to the first carrying amount, and may be called as a carrying amount for a normal process, hereinafter) is switched to the carrying amount suitable for printing at the trailing edge (that corresponds to a second carrying amount, and may be called as a carrying amount for processing a trailing edge, hereinafter) is determined based on the detection result from the paper detector 2053. In this manner, the position of the trailing edge of the paper S is obtained and the timing of switching the carrying amount is determined based on the obtained position of the trailing edge of the paper S. Thus, even if the size of the paper S on which printing is to be performed in the carrying direction is different from a specified size, printing can be performed in an appropriate manner. For example, a trouble that printing is finished with an unprinted line left, or a trouble that an excessively wider region is printed by the carrying amount for processing the trailing edge can be prevented. Following is a detailed description of the printing operation.

<Switching of Carrying Amount>

Figure 32A:
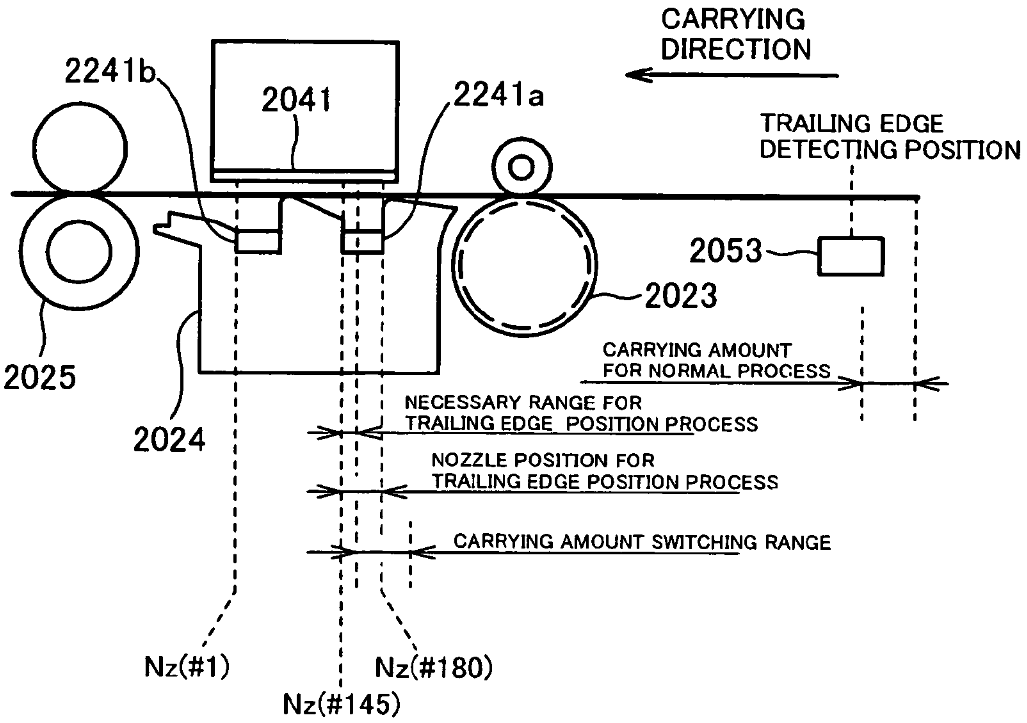
FIG. 32A is a conceptual diagram for explaining switching control of a carrying amount.
Figure 32B:
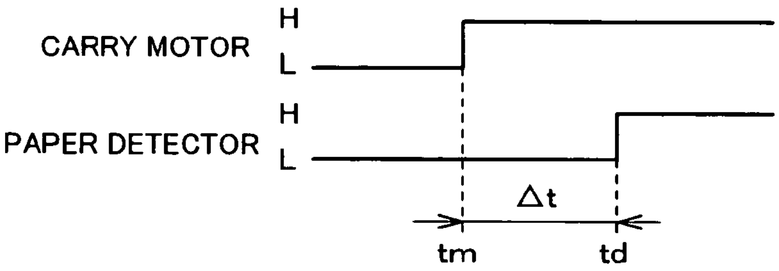
FIG. 32B is a timing chart explaining a relationship between a control signal to a carry motor and a detection signal from a paper detector.
Figure 32C:
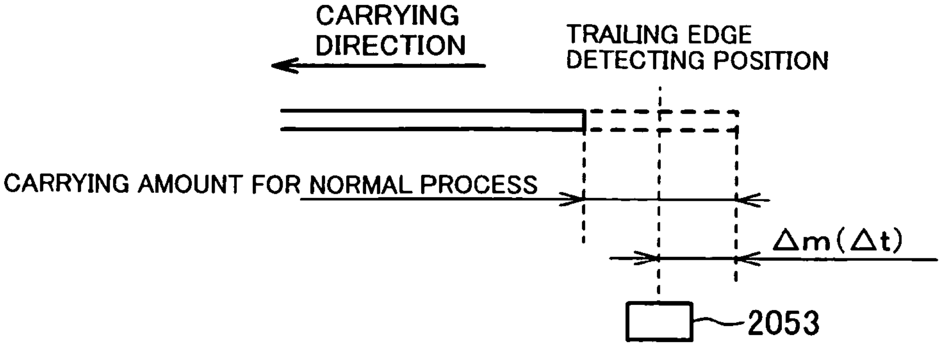
FIG. 32C is a conceptual diagram explaining a position of a trailing edge of an obtained paper.
Figure 33:
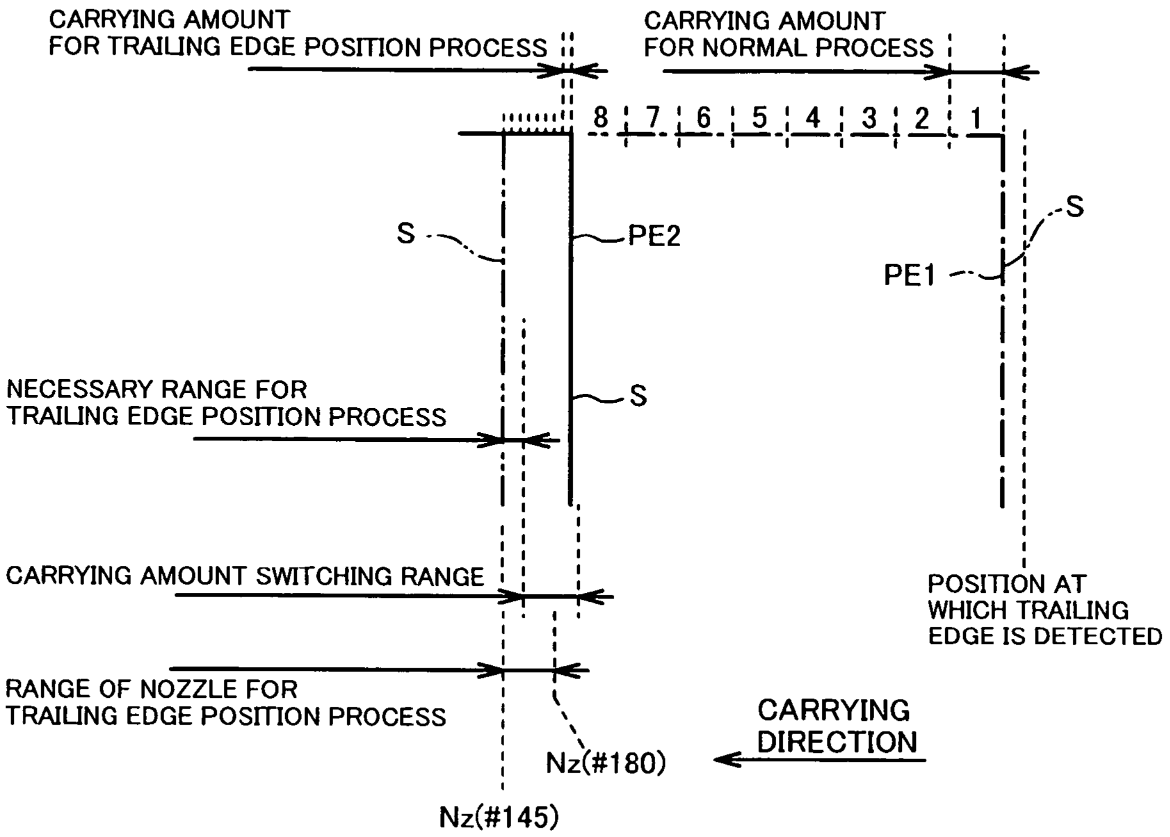
FIG. 33 is a conceptual diagram for explaining a specific example of an operation for switching the carrying amount.

First, the switching of the carrying amount is described. Here, FIG. 32A is a conceptual diagram for explaining control for switching of the carrying amount. FIG. 32B is a timing chart explaining a relationship between a control signal for the carry motor 2022 and the detection signal from the paper detector 2053. FIG. 32C is a conceptual diagram that explains the position of the trailing edge of the paper S that is obtained. FIG. 33 is a conceptual diagram for describing a specific example of an operation for switching the carrying amount. In the printer 2001, the printer-side controller 2060 obtains the position of the trailing edge of the paper S based on the detection result of the paper detector 2053, and then, determines the timing of switching the carrying amount from the obtained position of the trailing edge. The switching timing is determined as the number of passes until the trailing edge of the paper S reaches a carrying amount switching position, in the case where the paper S is carried by the carrying amount for a normal process.

Here, the carrying amount switching position is described. In order to determine the carrying amount switching position, it is necessary to consider the following conditions. A first condition is that the carrying amount switching position is determined to be upstream of the most-downstream nozzle Nz (corresponding to the nozzle Nz (#145)) in the nozzle group for processing the trailing edge in the carrying direction. If the carrying amount switching position is determined to be positioned downstream of the most-downstream nozzle Nz in the carrying direction, the ink ejected from the nozzle Nz goes out of the downstream ink receiving groove 2241*a* and adheres to the platen 2024. A second condition is that a printing range in which printing by the carrying amount for processing the trailing edge is performed (hereinafter referred to as a necessary range for a trailing edge process) can be secured. As described in the example of FIG. 31, in order to perform printing without leaving any space at the trailing edge portion of the paper S by the interlace method, printing by the carrying amount for the trailing edge process is needed to be performed for a plurality of passes, after the carrying amount for the normal process is switched to the carrying amount for the trailing edge process. Thus, the carrying amount switching position is determined to be such position that at least printing range corresponding to a plurality of passes (the necessary range for the trailing edge process) can be secured. A third condition is that the necessary range for the trailing edge process is secured even if the paper is carried by the carrying amount for the normal process.

The carrying amount switching position is determined in the printer 2001, considering the above conditions. More specifically, as shown in FIG. 32A, the most downstream nozzle Nz in the nozzle group for processing the trailing edge is assumed to be a base point. A position upstream of the base point in the carrying direction away from the base point by the necessary range for the trailing edge process is determined as a most-downstream carrying amount switching position. Then, a position positioned upstream from the most-downstream carrying amount switching position in the carrying direction by the carrying amount for the normal process is determined as a most-upstream carrying amount switching position. Thus, a range from the most-downstream carrying amount switching position to the most-upstream carrying amount switching position is determined as the carrying amount switching position. This range may be referred to as a carrying amount switching range in the following description.

Next, an operation for obtaining the position of the trailing edge of the paper S is described. As described above, the paper S is carried every carrying amount for the normal process in the printing operation in the intermediate portion of the paper S. Thus, if the detection signal from the paper detector 2053 is merely monitored, the obtained position of the trailing edge of the paper S has a width equal to the carrying amount for the normal process. For this reason, this embodiment focuses on the fact that the carry motor 2022 is a direct-current motor. In this embodiment, the position of the trailing edge of the paper S is detected based on an output timing of the control signal to the carry motor 2022 and a timing of a level change in the detection signal from the paper detector 2053. As shown in FIG. 32B, when the control signal to the carry motor 2022 changes from L level indicating stop to H level indicating an operation, the carry motor 2022 carries the paper S.

Here, since the carry motor 2022 is a direct-current motor, it rotates with a number of revolutions in accordance with a voltage value of H level. Thus, the carrying amount of the paper S can be determined from a time passed after the control signal to the carry motor 2022 is changed to H level. Moreover, the carrying amount of the paper S in each carrying operation is determined in advance. That is, during the printing operation for the intermediate portion of the paper S, the paper S is carried by each carrying amount for the normal process. Therefore, the position of the trailing edge of the paper S can be obtained based on a timing td at which the detection signal from the paper detector 2053 changes from L level indicating that the paper S is present into H level indicating that no paper S is present. More specifically, the carrying amount Δm until the trailing edge of the paper S passes through the paper detector 2053 is obtained, from a difference Δt between a timing tm at which the control signal to the carry motor 2022 is changed to H level and the timing td at which the detection signal from the paper detector 2053 changes to H level. Then, as shown in FIG. 32C, the position of the trailing edge of the paper S at a time at which the carrying operation is finished is obtained from a difference between the carrying amount Δm and the carrying amount for the normal process. Due to the above structure, the position of the trailing edge of the paper S can be obtained with high precision, without adding any special structure.

Moreover, the printer-side controller 2060 can obtain the position of the trailing edge of the paper S for each pass based on the carrying amount for the normal process. Thus, the printer-side controller 2060 can also obtain the number of passes after the trailing edge of the paper S passes through the paper detector 2053 until the trailing edge of the paper S reaches the carrying amount switching range. In describing with reference to the example of FIG. 33, the printer-side controller 2060 can obtain the number of passes (i.e., the carrying amount) that is required for moving of the trailing edge of the paper S from a position PE1 immediately after the trailing edge of the paper S passes through the paper detector 2053 to a position PE2 at which the trailing edge of the paper S reaches the carrying amount switching range, immediately after the trailing edge of the paper S passes through the paper detector 2053.

<Specific Example of the Carrying Amount Switching Operation>

Next, a specific example of the carrying amount switching operation is described, referring to FIG. 33. Note that, the following operation is performed by the printer-side controller 2060 in accordance with the computer program stored in the memory 2063. Thus, this computer program contains a code for making the following operation be performed.

At the time of printing an intermediate portion of paper S, the printer-side controller 2060 prints an image on the paper S and carries the paper S by the carrying amount for the normal process (first carrying amount). Here, the printer-side controller 2060 monitors the detection signal from the paper detector 2053 every time the carrying operation (S140, see FIG. 30) is performed. Then, when a level of the detection signal from the paper detector 2053 changes from a level indicating that there is paper (e.g., L level) to a level indicating that there is no paper (e.g., H level), the printer-side controller 2060 obtains the position of the trailing edge of the paper S. As described above, the printer-side controller 2060 obtains the trailing edge stop position PE1 at which the trailing edge of the paper S is stopped immediately after the trailing edge passes through the paper detector 2053, based on the timing of the level change in the control signal to the carry motor 2022 and the timing of the level change in the detection signal from the paper detector 2053 (timing at which the trailing edge of the paper S passes through the paper detector 2053).

Further, the printer-side controller 2060 obtains the number of passes required for moving the trailing edge of the paper S to the carrying amount switching range, based on the stop position PE1 and the carrying amount for the normal process. In this example, the stop position PE2 after eight passes is within the carrying amount switching range. Therefore, 8 passes are obtained as the number of the required passes. Then, the number of the required passes defines the timing at which the carrying amount for the normal process is switched into the carrying amount for the trailing edge process (second carrying amount). Further, information on the number of the required passes is output to the computer 2110. In accordance with this, the computer 2110 changes the carrying amount of the paper S or a nozzle Nz to be used after the corresponding number of passes in the aforementioned rasterization processing (S40). That is, the computer 2110 determines a sorting order of CMYK image data on which the halftone processing (S30) is performed, so as to conform to the carrying amount for the trailing edge process.

Then, printing by the carrying amount for the normal process is repeatedly performed until printing of the defined number of passes are performed, i.e., until the position of the trailing edge of the paper S reaches a position within the carrying amount switching range. Then, when printing for the defined number of passes has been performed, it is determined as a timing for switching and the carrying amount of the paper S is changed from the carrying amount for the normal process into the carrying amount for the trailing edge process. That is, the computer 2110 outputs print data corresponding to the carrying amount for the trailing edge position process to the printer 2001. When receiving the print data, the printer 2001 switches the carrying amount for the normal process into the carrying amount for the trailing edge process, and performs printing for the trailing edge portion of the paper S.

In printing at the trailing edge portion, the printer-side controller 2060 obtains the position of the trailing edge of the paper S. In this printing, the printer-side controller 2060 monitors whether or not the position of the trailing edge of the paper S goes over the most-downstream nozzle Nz (#145) in the nozzle group for the trailing edge process. When the position of the trailing edge of the paper S goes beyond the most-downstream nozzle Nz (#145), the printer-side controller 2060 finishes the printing operation, performs the paper-discharge operation (S150), and outputs information indicating the finish of the printing operation to the computer 2110. When receiving the information indicating the end of the printing operation, the computer 2110 stops conversion of image data into print data. Then, in the case where there is image data for a next paper S, the computer 2110 converts that image data into print data. In the case where there is no image data for a next paper S, the computer 2110 finishes the conversion process to the print data.

The printer 2001 performing the above control has the following advantage, as compared with a conventional printer 2001. In other words, the timing at which the carrying amount for the normal process is switched to the carrying amount for the trailing edge process is determined in accordance with the detection result of the trailing edge of the paper S by the paper detector 2053, and switching of the carrying amount for the normal process to the carrying amount for the trailing edge process is performed at the thus determined timing. Therefore, even if the size of the paper S on which printing is performed is different from a size of paper S that is specified for control, printing can be performed in an appropriate manner. In other words, switching of the carrying amount to the carrying amount for the trailing edge process can be performed at an appropriate timing for the length of the paper S on which printing is performed. Therefore, printing can be performed in an appropriate manner. For example, a trouble that the number of printing by the carrying amount for the trailing edge process excessively increases can be prevented. Moreover, the carrying amount switching range is determined, by considering the printing range in which the carrying amount for the trailing edge process required. Therefore, the number of printing (the number of passes) can be made appropriate, thus shortening a process time. Furthermore, a trouble that an unprinted line is left in printing by the carrying amount for the trailing edge process can be surely prevented.

Others

The printer 2001 as a printing apparatus is described in the second embodiment. However, the above embodiment is for facilitating understanding of the present invention and is not intended to limit the interpretation of the present invention.

It goes without saying that the present invention may make changes and modifications without departing from the effect of the present invention and its equivalents are included in the present invention. For example, embodiments described below can also be included in the present invention.

<Printing Method>

In the aforementioned embodiment, for convenience of description, the interlace method is described with reference to an example in which a modeled nozzle row (eight nozzles) is used. However, the interlace method is not limited to this example. An actual nozzle row is formed by a large number of nozzles Nz, such as 96 or 180 sets. Thus, there are various methods in the interlace methods. For example, there is a method obtained by combining the interlace mode and the overlapping method in which one raster line is formed by a plurality of nozzles Nz. Such an interlace method also falls within the scope of the present invention.

<Carry Motor>

In the aforementioned embodiment, the carry motor 2022 formed by a direct-current motor is described as an example. However, the carry motor 2022 may be formed by other types of motors. For example, a pulse motor may form the carry motor 2022. In this case, the printer-side controller 2060 can obtain the position of the trailing edge of the paper S, based on the timing at which the trailing edge of the paper S passes through the paper detector 2053 (timing of the level change in the detection signal) and the number of pulses supplied to the carry motor 2022.

<Paper Detector>

In the aforementioned embodiment, the paper detector 2053 including the light-emitting element and the light-receiving element is described as an example. However, the paper detector 2053 may have other structures. For example, the paper detector 2053 may be a mechanical sensor with an arm that rotates by coming into contact with paper S.

What is claimed is:

1. A printing method comprising:

(A) performing a first printing process for alternately repeating a first carrying operation and a dot forming operation, the first carrying operation being an operation for carrying a medium by a first carrying amount in a carrying direction, the dot forming operation being an operation for forming a dot line on the medium by ejecting ink from a plurality of nozzles aligned in the carrying direction, a plurality of the nozzles including a nozzle opposed to a convex portion, of a supporting member, that is in contact with the carried medium and a nozzle opposed to a concave portion, of the supporting member, that is not in contact with the medium;

(B) performing a second printing process for alternately repeating a second carrying operation and the dot forming operation at the time of printing an image on an upstream edge portion of the medium in the carrying direction, the second carrying operation being an operation for carrying the medium by a second carrying amount that is smaller than the first carrying amount; and (C) performing a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion, the third carrying operation being an operation for carrying the medium by a third carrying amount that is larger than the second carrying amount.

2. A printing method according to claim 1, wherein after the edge portion is detected based on a detection result of a sensor for detecting the edge portion, the carrying operation for carrying the medium in the carrying direction and the dot forming operation are repeated a predetermined number of times and a printing process is finished.

3. A printing method according to claim 2, wherein the third carrying operation is performed after the certain dot forming operation in the case the nozzle opposed to the convex portion after the third carrying operation is positioned away from the lower edge's most-downstream position downstream in the carrying direction by more than a total carrying amount from when the edge portion is detected to when the printing process is finished.

4. A printing method according to claim 2, wherein the sensor is a sensor for detecting the presence or absence of the medium, and detects that the edge portion is positioned downstream in the carrying direction than the sensor when the sensor is unable to detect the presence of the medium based on the detection result of the sensor in the dot forming operation.

5. A printing method according to claim 2, wherein a dot line to be formed downstream in the carrying direction than a position of the sensor at the time the sensor detects the edge portion is formed by the predetermined number of times of the dot forming operation.

6. A printing method according to claim 2, wherein the sensor is provided at the same position as the most-upstream nozzle with respect to the carrying direction.

7. A printing method according to claim 1, wherein a dot line to be formed between a lower edge's most-upstream position that is a position of the edge portion when the medium is carried to a most upstream side in the carrying direction, and the lower edge's most-downstream position is formed without using the nozzle opposed to the convex portion.

8. A printing method according to claim 1, wherein the third carrying amount is equal to the first carrying amount.

9. A printing method according to claim 1, wherein a fourth carrying operation for carrying the medium by a fourth carrying amount that is larger than the second carrying amount is performed after the third carrying operation and before the second carrying operation.

10. A printing method according to claim 9, wherein the third carrying amount is equal to the fourth carrying amount.

11. A printing method according to claim 9, wherein the third carrying amount is larger than the fourth carrying amount.

12. A printing method according to claim 1, wherein when it is assumed that an interval of the dot lines formed on the medium is D, a nozzle interval is k×D, the first carrying amount is n1×D, and the second carrying amount is n2×D, a remainder obtained by dividing n1 by k is equal to a remainder obtained by dividing n2 by k.

13. A printing method according to claim 12, wherein, when it is assumed that the third carrying amount is n3×D, a remainder obtained by dividing n3 by k is equal to the remainder obtained by dividing n1 by k.

14. A printing system comprising:

(A) a supporting member having a convex portion that contacts a medium to be carried in a carrying direction and a concave portion that does not contact the medium;

(B) a plurality of nozzles aligned in the carrying direction, and including a nozzle opposed to the convex portion and a nozzle opposed to the concave portion; and (C) a controller for performing a first printing process for alternately repeating a first carrying operation for carrying the medium by a first carrying amount and a dot forming operation for forming a dot line on the medium by ejecting ink from the nozzles, and for performing a second printing process for alternately repeating a second carrying operation for carrying the medium by a second carrying amount smaller than the first carrying amount and the dot forming operation at the time of printing an image on an upstream edge portion of the medium in the carrying direction, wherein the controller performs a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation for carrying the medium by a third carrying amount larger than the second carrying amount and the dot forming operation are performed after the second dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion.

15. A storage medium storing a program, the program comprising:

(A) a code for making a printer perform a first printing process for alternately repeating a first carrying operation and a dot forming operation, the first carrying operation being an operation for carrying a medium by a first carrying amount in a carrying direction, the dot forming operation being an operation for forming a dot line on the medium by ejecting ink from a plurality of nozzles aligned in the carrying direction, a plurality of the nozzles including a nozzle opposed to a convex portion, of a supporting member, that is in contact with the carried medium and a nozzle opposed to a concave portion, of the supporting member, that is not in contact with the medium;

(B) a code for making the printer perform a second printing process for alternately repeating a second carrying operation and the dot forming operation at the time of printing an image on an upstream edge portion of the medium in the carrying direction, the second carrying operation being an operation for carrying the medium by a second carrying amount smaller than the first carrying amount; and (C) a code for making the printer perform a third carrying operation after a certain dot forming operation in the case where if the first carrying operation is performed after the certain dot forming operation, a most-upstream nozzle positioned most upstream in the carrying direction of a plurality of the nozzles is positioned more upstream in the carrying direction than a lower edge's most-downstream position that is a position of the edge portion of the medium at the time the medium is carried to a most downstream side in the carrying direction, and if the third carrying operation and the dot forming operation are performed after the certain dot forming operation, and the second printing process is performed thereafter, a dot line to be formed more upstream than the lower edge's most-downstream position of the medium that is carried so that the edge portion is positioned more upstream in the carrying direction than the lower edge's most-downstream position can be formed without using the nozzle opposed to the convex portion, the third carrying operation being an operation for carrying the medium by a third carrying amount that is larger than the second carrying amount.

* * * * *